United States Patent [19]

Morgan

[11] Patent Number: 5,148,520
[45] Date of Patent: Sep. 15, 1992

[54] DETERMINING THE LOCATIONS OF THE CONTENTS OF BORDERED AREAS OF A GENERIC FORM

[75] Inventor: Michael W. Morgan, Camarillo, Calif.

[73] Assignee: ChipSoft CA, Corp., San Diego, Calif.

[21] Appl. No.: 586,546

[22] Filed: Sep. 21, 1990

Related U.S. Application Data

[62] Division of Ser. No. 292,611, Dec. 30, 1988.

[51] Int. Cl.⁵ ............................................ G06F 15/72
[52] U.S. Cl. ..................................... 395/148; 395/160
[58] Field of Search ....................... 364/518, 521, 523; 382/44–48; 340/716, 721, 723; 395/144–149, 160, 161

[56] References Cited

U.S. PATENT DOCUMENTS

| | | | |
|---|---|---|---|
| 4,736,308 | 7/1985 | Heckel | 364/518 |
| 4,763,356 | 8/1988 | Day, Jr. et al. | 364/900 |
| 4,788,538 | 4/1987 | Klein et al. | 340/747 |
| 4,823,108 | 3/1988 | Pope | 340/721 |
| 4,962,465 | 12/1988 | Saito et al. | 364/518 |

FOREIGN PATENT DOCUMENTS

| | | |
|---|---|---|
| 0255259 | 2/1988 | European Pat. Off. |
| 0325417 | 7/1989 | European Pat. Off. |

OTHER PUBLICATIONS

"Custom Forms From Softview," *Calfornia Computer* (Nov. 1988).
"Forms Sofware: Next Hot Category?" *PC Magazine* (Sep. 1988)
*Macintosh Buyer's Guid* (Fall, 1989).
"Forms Software Takes Shape," *Mac Week* (Jan., 1989).
"Forms Software Takes Shape," *Infoworld (Jun., 1989).*
"Good News for Paper Pushers," *Forbes* (Jan., 1990).
"In Good Form," *MacUser* (Jan., 1990).
"Forms Processing Moves Into the Macintosh Arena," *Infoworld* (Jan., 1990).
"Forming Opinions," *Mac World* (Feb., 1990).
"Forms Software Eases Creation Process," *PC Week* (Feb., 1990).

*Primary Examiner*—Heather R. Herndon
*Attorney, Agent, or Firm*—Irell & Manella

[57] ABSTRACT

An apparatus and method for incorporating a topological two-dimensional partitioning procedure for dynamically creating, revising, storing, displaying and printing generic forms. The generic form contains a plurality of bordered areas. Each of the bordered areas may be included within a larger bordered area, and each of the bordered areas may contain a plurality of nonoverlapping smaller bordered areas, text or graphics. The text includes none, one or more lines of characters and the smaller bordered areas are arranged either vertically or horizontally with relation to each other. The invention includes a strategy for determining the location of the contents of the boardered areas.

58 Claims, 35 Drawing Sheets

A) changing an element without Graphics Intelligence

B) Graphics Intelligence, without horizontal constraints

C) Graphics Intelligence, with horizontal constraints

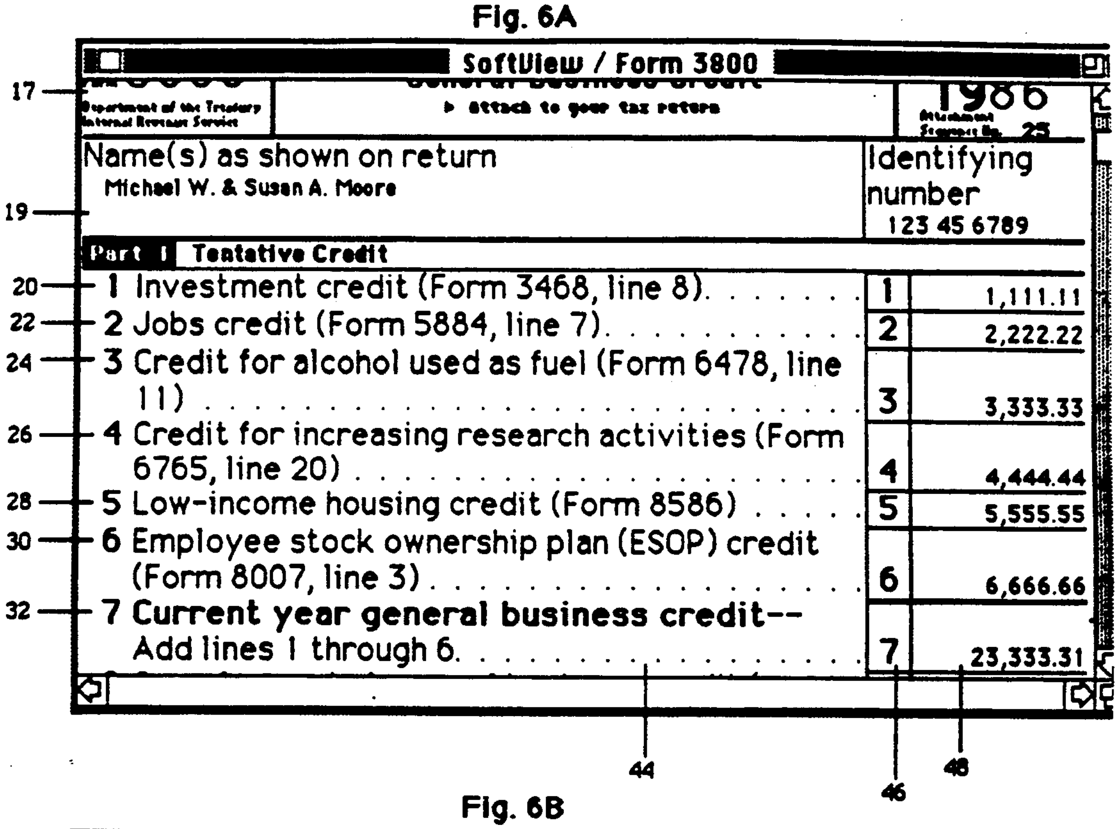

Fig. 6A

```
┌─────────────────────────────────────────────────┐
│ □          SoftView / Form 3800              ⇧ │
├─────────────────────────────────────────────────┤
17─┤ Department of the Treasury  ▶ attach to your tax return        1986 │
   │ Internal Revenue Service                      Attachment Sequence No. 25 │
   │ Name(s) as shown on return          │Identifying│
   │   Michael W. & Susan A. Moore       │number    │
19─┤                                     │123 45 6789│
   │ Part I  Tentative Credit                      │
20─┤ 1 Investment credit (Form 3468, line 8)....│1│ 1,111.11 │
22─┤ 2 Jobs credit (Form 5884, line 7).........│2│ 2,222.22 │
24─┤ 3 Credit for alcohol used as fuel (Form 6478, line│
   │    11)....................................│3│ 3,333.33 │
26─┤ 4 Credit for increasing research activities (Form │
   │    6765, line 20)..........................│4│ 4,444.44 │
28─┤ 5 Low-income housing credit (Form 8586)....│5│ 5,555.55 │
30─┤ 6 Employee stock ownership plan (ESOP) credit │
   │    (Form 8007, line 3).....................│6│ 6,666.66 │
32─┤ 7 Current year general business credit--    │
   │    Add lines 1 through 6...................│7│ 23,333.31│
   └─────────────────────────────────────────────────┘
                        44        46  48
```

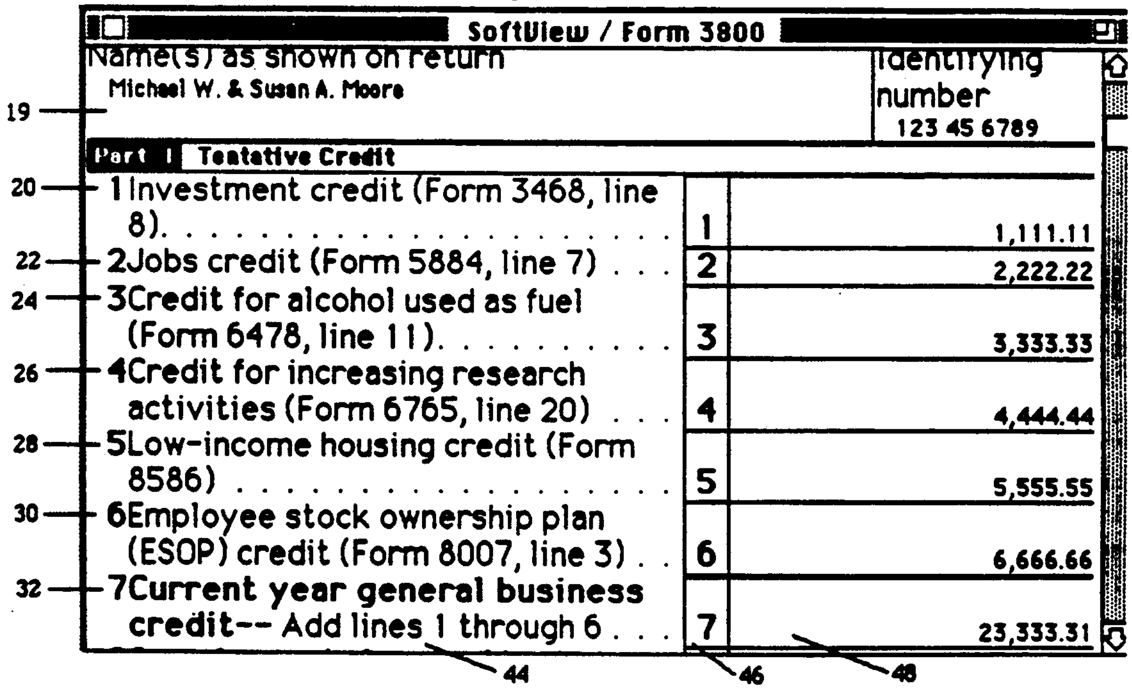

Fig. 6B

```
┌─────────────────────────────────────────────────┐
│ □          SoftView / Form 3800              ⇧ │
├─────────────────────────────────────────────────┤
   │ Name(s) as shown on return     │Identifying│
   │  Michael W. & Susan A. Moore   │number    │
19─┤                                │123 45 6789│
   │ Part I  Tentative Credit                    │
20─┤ 1 Investment credit (Form 3468, line │
   │    8)..........................│1│ 1,111.11 │
22─┤ 2 Jobs credit (Form 5884, line 7)...│2│ 2,222.22 │
24─┤ 3 Credit for alcohol used as fuel  │
   │    (Form 6478, line 11).........│3│ 3,333.33 │
26─┤ 4 Credit for increasing research  │
   │    activities (Form 6765, line 20)..│4│ 4,444.44 │
28─┤ 5 Low-income housing credit (Form  │
   │    8586)........................│5│ 5,555.55 │
30─┤ 6 Employee stock ownership plan   │
   │    (ESOP) credit (Form 8007, line 3)..│6│ 6,666.66 │
32─┤ 7 Current year general business   │
   │    credit-- Add lines 1 through 6...│7│ 23,333.31│
   └─────────────────────────────────────────────────┘
                    44       46    48
```

Fig. 7A

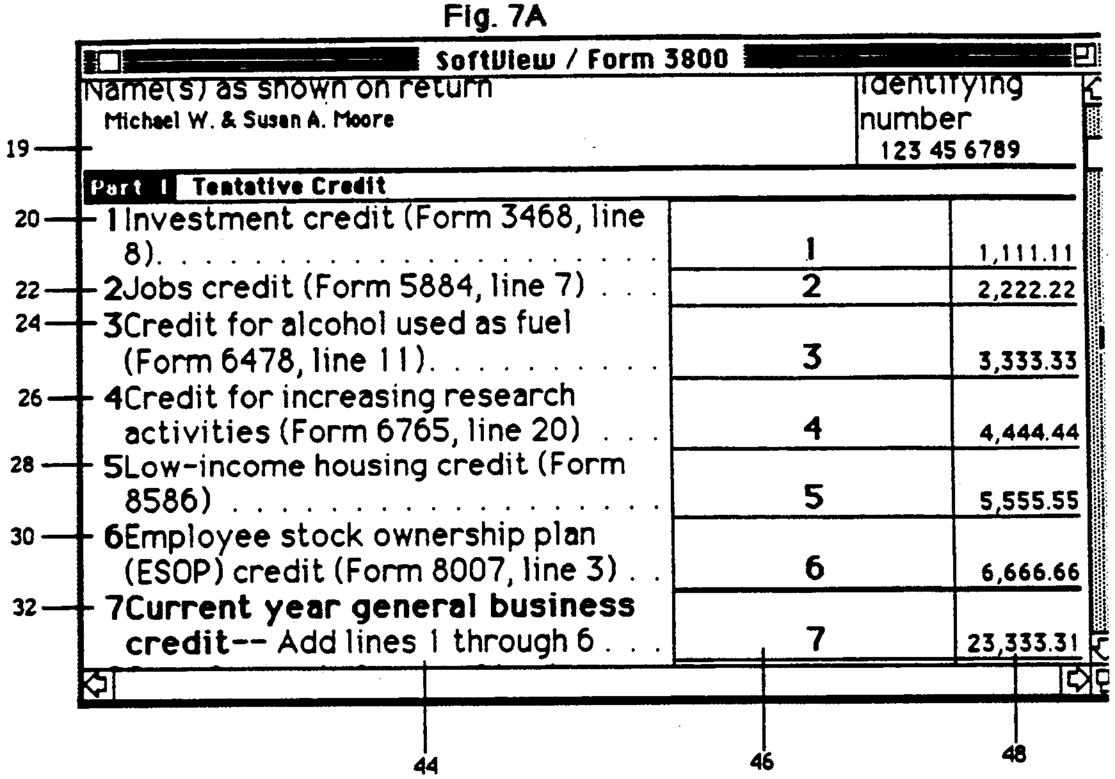

Fig. 7B

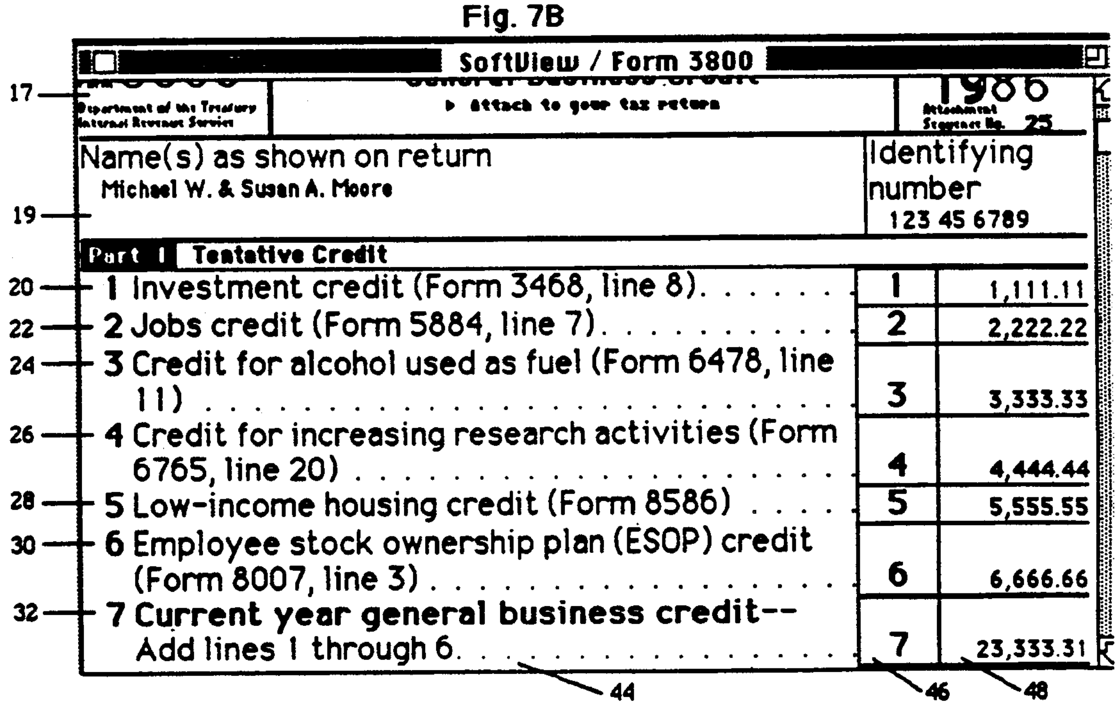

| | SoftView / Form 3800 | | |
|---|---|---|---|
| Name(s) as shown on return<br>Michael W. & Susan A. Moore | | Identifying<br>number<br>123 45 6789 | |
| **Part I Tentative Credit** | | | |
| 1 Investment credit (Form 3468, line 8)........ | 1 | 1,111.11 |
| 2 Jobs credit (Form 5884, line 7)... | 2 | 2,222.22 |
| 3 Credit for alcohol used as fuel (Form 6478, line 11).......... | 3 | 3,333.33 |
| 4 Credit for increasing research activities (Form 6765, line 20)... | 4 | 4,444.44 |
| 5 Low-income housing credit (Form 8586)........ | 5 | 5,555.55 |
| 6 Employee stock ownership plan (ESOP) credit (Form 8007, line 3).. | 6 | 6,666.66 |
| 7 Current year general business credit-- Add lines 1 through 6... | 7 | 23,333.31 |

| | SoftView / Form 3800 | | |
|---|---|---|---|
| Department of the Treasury<br>Internal Revenue Service | ▶ Attach to your tax return | 1986<br>Attachment<br>Sequence No. 25 | |
| Name(s) as shown on return<br>Michael W. & Susan A. Moore | | Identifying<br>number<br>123 45 6789 | |
| **Part I Tentative Credit** | | | |
| 1 Investment credit (Form 3468, line 8)........ | 1 | 1,111.11 |
| 2 Jobs credit (Form 5884, line 7).......... | 2 | 2,222.22 |
| 3 Credit for alcohol used as fuel (Form 6478, line 11)........... | 3 | 3,333.33 |
| 4 Credit for increasing research activities (Form 6765, line 20)...... | 4 | 4,444.44 |
| 5 Low-income housing credit (Form 8586)..... | 5 | 5,555.55 |
| 6 Employee stock ownership plan (ESOP) credit (Form 8007, line 3)............. | 6 | 6,666.66 |
| 7 Current year general business credit-- Add lines 1 through 6........... | 7 | 23,333.31 |

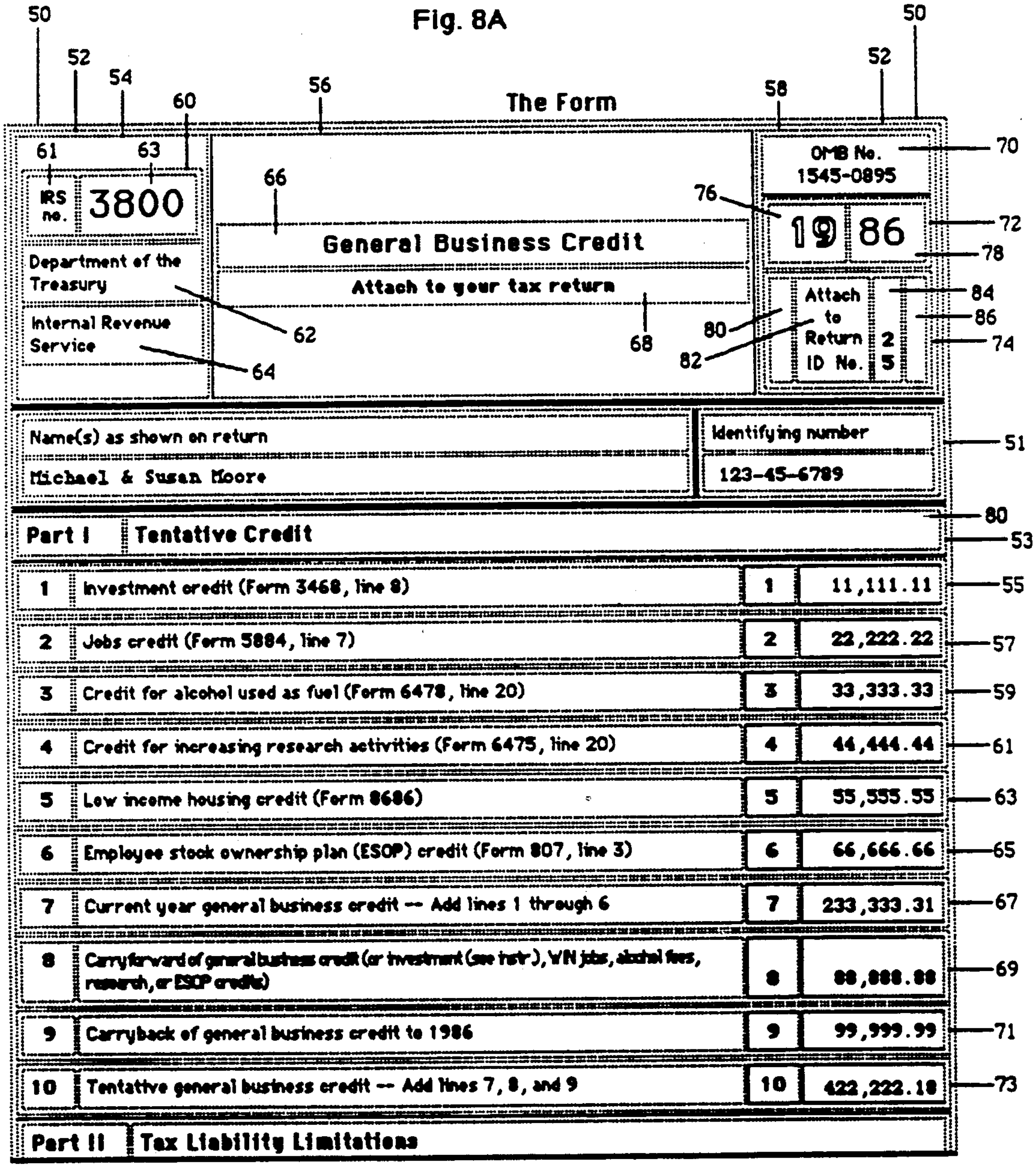

Fig. 8A

The Form

| IRS no. | 3800 | | General Business Credit | | OMB No. 1545-0895 |
| --- | --- | --- | --- | --- | --- |
| Department of the Treasury | | | Attach to your tax return | | 19 86 |
| Internal Revenue Service | | | | | Attach to Return ID No. 2 5 |

| Name(s) as shown on return | Identifying number |
| --- | --- |
| Michael & Susan Moore | 123-45-6789 |

Part I  Tentative Credit

| | | | |
| --- | --- | --- | --- |
| 1 | Investment credit (Form 3468, line 8) | 1 | 11,111.11 |
| 2 | Jobs credit (Form 5884, line 7) | 2 | 22,222.22 |
| 3 | Credit for alcohol used as fuel (Form 6478, line 20) | 3 | 33,333.33 |
| 4 | Credit for increasing research activities (Form 6475, line 20) | 4 | 44,444.44 |
| 5 | Low income housing credit (Form 8686) | 5 | 55,555.55 |
| 6 | Employee stock ownership plan (ESOP) credit (Form 807, line 3) | 6 | 66,666.66 |
| 7 | Current year general business credit -- Add lines 1 through 6 | 7 | 233,333.31 |
| 8 | Carryforward of general business credit (or investment (see instr.), WIN jobs, alcohol fuel, research, or ESOP credits) | 8 | 88,888.88 |
| 9 | Carryback of general business credit to 1986 | 9 | 99,999.99 |
| 10 | Tentative general business credit -- Add lines 7, 8, and 9 | 10 | 422,222.18 |

Part II  Tax Liability Limitations

FIG. 8C

| Bordered Area | Arrangement of Contents Within Bordered Area |
|---|---|
| 52 | Horizontal (54, 56 and 58) |
| 54 | Vertical (60, 62 and 64) |
| 60 | Horizontal (61 and 63) |
| 62 | Text |
| 64 | Text |
| 61 | Text |
| 63 | Text |
| 56 | Vertical (66 and 68) |
| 66 | Text |
| 68 | Text |
| 58 | Vertical (70 and 72) |
| 70 | Text |
| 72 | Horizontal (76 and 78) |
| 76 | Text |
| 78 | Text |
| 74 | Horizontal (80, 82, 84 and 86) |
| 80 | Text |
| 82 | Text |
| 84 | Text |
| 86 | Text |

Fig. 13C

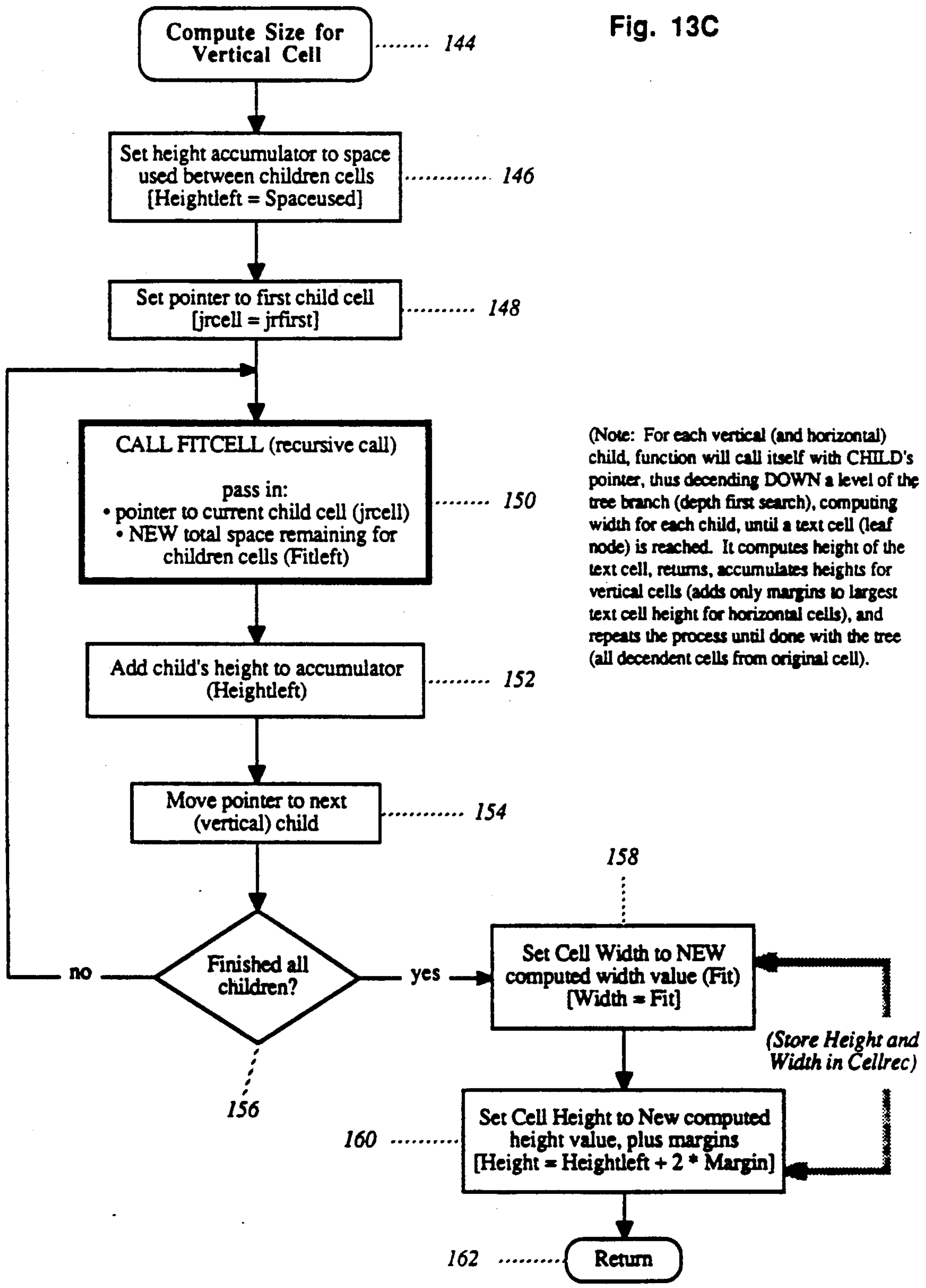

(Note: For each vertical (and horizontal) child, function will call itself with CHILD's pointer, thus decending DOWN a level of the tree branch (depth first search), computing width for each child, until a text cell (leaf node) is reached. It computes height of the text cell, returns, accumulates heights for vertical cells (adds only margins to largest text cell height for horizontal cells), and repeats the process until done with the tree (all decendent cells from original cell).

Fig. 14B

| Bordered Area | | Old Width | New Width | Height | Contents of Bordered Area | Rectangular Coordinates (Left,Top,Right,Bottom) |
|---|---|---|---|---|---|---|
| 199 | 50 | --- | 520 (given) | --- | 52, 51, 53, 55, 57, 59, etc. | (0, 0, 520,-) |
| 200 | 52 | --- | 514 | 146 | 54, 56, 58 | (3, 3, 514, 149) |
| 202 | 54 | 99 | 103 | 110 | 60, 62, 64 | (6, 6, 109, 146) |
| 204 | 60 | --- | 97 | 38 | 61, 63 | (9, 24, 106, 62) |
| 206 | 62 | --- | 97 | 32 | text | (9, 63, 106, 95) |
| 208 | 64 | --- | 97 | 32 | text | (9, 96, 106, 127) |
| 210 | 61 | 21 | 27 | 32 | text | (12, 27, 39, 59) |
| 212 | 63 | 49 | 63 | 32 | text | (40, 27, 103, 59) |
| 214 | 56 | 280 | 300 | 44 | 66, 68 | --- |
| 216 | 58 | 99 | 104 | 140 | 70, 72 | --- |

FIG. 15A

| | POINTER TO CURRENTLY PROCESSED BORDERED AREA | | STACK |
|---|---|---|---|
| 220 | BORDERED AREA 52 | 1) | Bordered Area 52<br>Recursive call at block 150 (Fig. 13C) |
| 222 | BORDERED AREA 54 | 1) | Bordered Area 52<br>Call at block 150 (Fig. 13C) |
| 224 | BORDERED AREA 54 | 1) | Bordered Area 54<br>Call at block 190 (Fig. 13E) |
| | | 2) | Bordered Area 52<br>Call at block 150 (Fig. 13C) |
| 226 | BORDERED AREA 60 | 1) | Bordered Area 54<br>Call at block 190 (Fig. 13E) |
| | | 2) | Bordered Area 52<br>Call at block 150 (Fig. 13C) |
| 228 | BORDERED AREA 60 | 1) | Bordered Area 60<br>Call at block 150 (Fig. 13C) |
| | | 2) | Bordered Area 54<br>Call at block 190 (Fig. 13E) |
| | | 3) | Bordered Area 52<br>Call at block 150 (Fig. 13C) |
| 230 | BORDERED AREA 61 | 1) | Bordered Area 60<br>Call at block 150 (Fig. 13C) |
| | | 2) | Bordered Area 54<br>Call at block 190 (Fig. 13E) |
| | | 3) | Bordered Area 52<br>Call at block 150 (Fig. 13C) |
| 232 | BORDERED AREA 61 | 1) | Bordered Area 61<br>Call at block 190 (Fig. 13E) |
| | | 2) | Bordered Area 60<br>Call at block 150 (Fig. 13C) |
| | | 3) | Bordered Area 54<br>Call at block 190 (Fig. 13E) |
| | | 4) | Bordered Area 52<br>Call at block 150 (Fig. 13C) |

FIG. 15B

| | POINTER TO CURRENTLY PROCESSED BORDERED AREA | | STACK |
|---|---|---|---|
| 234 | BORDERED AREA 61 | 1) | Bordered Area 60<br>Call at block 150 (Fig. 13C) |
| | | 2) | Bordered Area 54<br>Call at block 190 (Fig. 13E) |
| | | 3) | Bordered Area 52<br>Call at block 150 (Fig. 13C) |
| 236 | BORDERED AREA 63 | 1) | Bordered Area 60<br>Call at block 150 (Fig. 13C) |
| | | 2) | Bordered Area 54<br>Call at block 190 (Fig. 13E) |
| | | 3) | Bordered Area 52<br>Call at block 150 (Fig. 13C) |
| 238 | BORDERED AREA 63 | 1) | Bordered Area 63<br>Call at block 190 (Fig. 13E) |
| | | 2) | Bordered Area 60<br>Call at block 150 (Fig. 13C) |
| | | 3) | Bordered Area 54<br>Call at block 190 (Fig. 13E) |
| | | 4) | Bordered Area 52<br>Call at block 150 (Fig. 13C) |
| 240 | BORDERED AREA 63 | 1) | Bordered Area 60<br>Call at block 150 (Fig. 13C) |
| | | 2) | Bordered Area 52<br>Call at block 190 (Fig. 13E) |
| | | 3) | Bordered Area 52<br>Call at block 150 (Fig. 13C) |

FIG. 15C

| | POINTER TO CURRENTLY PROCESSED BORDERED AREA | STACK |
|---|---|---|
| 242 | BORDERED AREA 63 | 1) Bordered Area 54 Call at block 190 (Fig. 13E)<br>2) Bordered Area 52 Call at block 150 (Fig. 13C) |
| 244 | BORDERED AREA 62 | 1) Bordered Area 62 Call at block 150 (Fig. 13C)<br>2) Bordered Area 54 Call at block 190 (Fig. 13E)<br>3) Bordered Area 52 Call at block 150 (Fig. 13C) |
| 246 | BORDERED AREA 62 | 1) Bordered Area 54 Call at block 190 (Fig. 13E)<br>2) Bordered Area 52 Call at block 150 (Fig. 13C) |
| 248 | BORDERED AREA 64 | 1) Bordered Area 64 Call at block 150 (Fig. 13C)<br>2) Bordered Area 54 Call at block 190 (Fig. 13E)<br>3) Bordered Area 52 Call at block 150 (Fig. 13C) |
| 250 | BORDERED AREA 64 | 1) Bordered Area 54 Call at block 190 (Fig. 13E)<br>2) Bordered Area 52 Call at block 150 (Fig. 13C) |
| 252 | BORDERED AREA 64 | 1) Bordered Area 52 Call at block 150 (Fig. 13C) |
| 254 | BORDERED AREA 54 | 1) Bordered Area 52 Call at block 150 (Fig. 13C) |
| 256 | BORDERED AREA 56 | 1) Bordered Area 52 Call at block 150 (Fig. 13C) |

FIG. 17A

| | POINTER TO CURRENTLY PROCESSED BORDERED AREA | STACK |
|---|---|---|
| 346 | BORDERED AREA 52 | |
| 348 | BORDERED AREA 52 | 1) Bordered Area 52<br>Recursive call at block 310 (Fig. 16D) |
| 350 | BORDERED AREA 54 | 1) Bordered Area 52<br>Call at block 310 (Fig. 16D) |
| 352 | BORDERED AREA 54 | 1) Bordered Area 54<br>Call at block 294 (Fig. 16E)<br>2) Bordered Area 52<br>Call at block 310 (Fig. 16D) |
| 354 | BORDERED AREA 60 | 1) Bordered Area 54<br>Call at block 294 (Fig. 16E)<br>2) Bordered Area 52<br>Call at block 310 (Fig. 16D) |
| 356 | BORDERED AREA 60 | 1) Bordered Area 60<br>Call at block 310 (Fig. 16D)<br>2) Bordered Area 54<br>Call at block 294 (Fig. 16E)<br>3) Bordered Area 52<br>Call at block 310 (Fig. 16D) |
| 358 | BORDERED AREA 61 | 1) Bordered Area 60<br>Call at block 310 (Fig. 16D)<br>2) Bordered Area 54<br>Call at block 294 (Fig. 16E)<br>3) Bordered Area 52<br>Call at block 310 (Fig. 16D) |

FIG. 17B

| | POINTER TO CURRENTLY PROCESSED BORDERED AREA | STACK |
|---|---|---|
| 360 | BORDERED AREA 61 | 1) Bordered Area 61<br>Call at block 294 (Fig. 16C)<br>2) Bordered Area 60<br>Call at block 310 (Fig. 16D)<br>3) Bordered Area 54<br>Call at block 294 (Fig. 16E)<br>4) Bordered Area 52<br>Call at block 310 (Fig. 16D) |
| 362 | BORDERED AREA 61 | 1) Bordered Area 60<br>Call at block 310 (Fig. 16D)<br>2) Bordered Area 54<br>Call at block 294 (Fig. 16E)<br>3) Bordered Area 52<br>Call at block 310 (Fig. 16D) |
| 364 | BORDERED AREA 63 | 1) Bordered Area 60<br>Call at block 310 (Fig. 16D)<br>2) Bordered Area 54<br>Call at block 294 (Fig. 16E)<br>3) Bordered Area 52<br>Call at block 310 (Fig. 16D) |
| 366 | BORDERED AREA 63 | 1) Bordered Area 63<br>Call at block 294 (Fig. 16C)<br>2) Bordered Area 60<br>Call at block 310 (Fig. 16D)<br>3) Bordered Area 54<br>Call at block 294 (Fig. 16E)<br>4) Bordered Area 52<br>Call at block 310 (Fig. 16D) |
| 368 | BORDERED AREA NONE | 1) Bordered Area 60<br>Call at block 310 (Fig. 16D)<br>2) Bordered Area 54<br>Call at block 294 (Fig. 16E)<br>3) Bordered Area 52<br>Call at block 310 (Fig. 16D) |

FIG. 17C

| | POINTER TO CURRENTLY PROCESSED BORDERED AREA | STACK |
|---|---|---|
| 370 | BORDERED AREA NONE | 1) Bordered Area 54<br>Call at block 294 (Fig. 16E)<br>2) Bordered Area 52<br>Call at block 310 (Fig. 16D) |
| 372 | BORDERED AREA 62 | 1) Bordered Area 54<br>Call at block 294 (Fig. 16E)<br>2) Bordered Area 52<br>Call at block 310 (Fig. 16D) |
| 374 | BORDERED AREA 62 | 1) Bordered Area 62<br>Call at block 310 (Fig. 16D)<br>2) Bordered Area 54<br>Call at block 294 (Fig. 16E)<br>3) Bordered Area 52<br>Call at block 310 (Fig. 16D) |
| 376 | BORDERED AREA 62 | 1) Bordered Area 54<br>Call at block 294 (Fig. 16E)<br>2) Bordered Area 52<br>Call at block 310 (Fig. 16D) |
| 378 | BORDERED AREA 64 | 1) Bordered Area 54<br>Call at block 294 (Fig. 16E)<br>2) Bordered Area 52<br>Call at block 310 (Fig. 16D) |
| 380 | BORDERED AREA 64 | 1) Bordered Area 64<br>Call at block 310 (Fig. 16D)<br>1) Bordered Area 54<br>Call at block 294 (Fig. 16E)<br>2) Bordered Area 52<br>Call at block 310 (Fig. 16D) |

FIG. 17D

| | POINTER TO CURRENTLY PROCESSED BORDERED AREA | STACK |
|---|---|---|
| 382 | BORDERED AREA 64 | 1) Bordered Area 54<br>Call at block 294 (Fig. 16E)<br>2) Bordered Area 52<br>Call at block 310 (Fig. 16D) |
| 384 | BORDERED AREA NONE | 1) Bordered Area 54<br>Call at block 294 (Fig. 16E)<br>2) Bordered Area 52<br>Call at block 310 (Fig. 16D) |
| 386 | BORDERED AREA NONE | 1) Bordered Area 52<br>Call at block 310 (Fig. 16D) |
| 388 | BORDERED AREA 56 | 1) Bordered Area 52<br>Call at block 310 (Fig. 16D) |

DETERMINING THE LOCATIONS OF THE CONTENTS OF BORDERED AREAS OF A GENERIC FORM

RELATED APPLICATIONS

This application is a divisional application of patent application having Ser. No. 292,611, filed Dec. 30, 1988, which is still pending, the priority of which is claimed and the entire disclosure of which is incorporated herein by reference. This application is filed concurrently with divisional application having Ser. No. 586,286.

FIELD OF THE INVENTION

An apparatus and method are disclosed for incorporating a topological two dimensional partitioning procedure for dynamically creating, revising, storing, printing and displaying generic forms

BACKGROUND OF THE INVENTION

In the past decade a growing interest has evolved for using computers for generating forms. Forms have been and always will represent a communications metaphor that document many different types of transactions Whether transactions happen with or without computers, forms are everywhere Most forms are preprinted, created and supplied by external form suppliers. The Business Forms Management Association estimates that businesses spend between $6 and $8 billion dollars a year to create and print preprinted forms Industry pundits estimate that businesses spend as much as twenty times that amount storing, managing and printing forms.

The process for generating a form is typically a tedious one When the form finally receives final approval and goes on to an outside printer, it gets printed, distributed and hundreds of thousands of copies of the form are inventoried into a paper storage Each time the form undergoes modification, the process of approval and storage starts all over again.

In an effort to economize the process of generating forms, electronic form software has been developed. Such software is another example of the personal computer's rapid displacement of functions previously done on expensive, dedicated, single-purpose types of business equipment, such as electronic publishing and business presentation graphics. Electronic forms are defined as computer-generated forms that incorporate graphics which exist independent of variable data and can be generated on demand. Electronic form software provides individuals with an alternative to using expensive phototypesetting equipment, with the additional benefit of adding speed and accuracy.

Electronic forms represent significant cost savings to businesses. When compared to the costs of designing and completing preprinted forms, electronic forms save businesses money; they require no physical space, they are easily revised (reducing waste of obsolete forms), and they often are printed on cut sheet paper. The costs of using computer-generated forms on cut sheet paper is less than purchasing preprinted forms. The cost of completing forms, estimated to be as much as twenty times the cost of the form, will be reduced by having built-in calculations and logic checking.

Although electronic forms are stored in computers, the user can do many things with electronic forms that are now done on preprinted forms; they can be filled in, approved, filed, and printed. The current packages, however, are limited in their application because these packages are really just typing programs for enabling a user to efficiently fill in and have neatly typed up a form.

Another type of form package enables a designer to design a form on screen and save it for reuse, or to scan in an existing paper form, which is then displayed on screen for completion. The advantage of these form packages is the ability to produce the electronic form to the exact specifications of the preprinted form, easing the user transition to the electronic form by providing the same "look" to the electronic form. Many of these form packages result in intelligent forms or smart forms. Intelligent forms generally imply forms that are interactive in numerical intelligence. In contrast to "dead forms", these forms will accept user entries, compute values and may even link values or amounts to other forms. The sophistication of the user entry acceptance (i.e. formatting, error checking, etc.) and the sophistication of computation and linking may vary considerably across different form packages.

A significant design issue in form generation with regard to these existing packages is the level of flexibility that the package has in editing or revising the form after a layout has been created. Stated differently, even if a form package has tackled the complex issues of computations, linking, interfacing with the database, etc., the ability of the package to edit or revise the layout of the form is a pressing issue in determining the value of an electronic form generation package. The issue boils down to whether a form once created can be easily changed, for example, by deleting a field, making a field smaller, making a field larger, moving a field, all while the rest of the form automatically adjusts to accommodate the change.

To date, no package has incorporated a concept of "graphics intelligence" to enable a system to dynamically adjust and accommodate for changes in the form. Graphics intelligence is a type of intelligence in form creation which enables all of the elements within a form to TM understand TM their positional relationships vis-a-vis each other. Hence, changes made to element size, text font, text size, placement, shape, etc., may cause other portions of the form to readjust, stretch, move over, or realign to positionally accommodate the change while maintaining the overall integrity or "basic look" of the form. By contrast, in existing form packages, when certain changes in layout are made, subsequent manual adjustments of other individual elements in the form may be required to fit the new design. Without incorporating graphics intelligence, such changes to the graphic layout of the form require a designer to redraw portions of the form and in some circumstances to redraw the entire form.

SUMMARY OF THE INVENTION

The present invention provides a method and apparatus that reduces or eliminates the disadvantages of prior methods for changing the graphic layout of a form referred to above.

Briefly the present invention includes an apparatus and method for incorporating a topological two dimensional partitioning procedure for using a computer for dynamically creating, revising, storing, display - and printing generic forms. For the first time, changes to the graphical layout of a form, particularly a complex form, do not necessarily require designer intervention in order to redraw portions of the form and, in some circumstances, the entire form. Particularly, the present invention provides a method and apparatus for maintaining the integrity of the form (i.e. information integrity and structural integrity) by readjusting, stretching, realigning, etc. bordered areas within the form in order to accommodate changes made to bordered area-size, text font, text size, placement, shape, etc.

The preferred embodiment of the invention includes an apparatus and method for dynamically altering a generic form in a computer The form can be characterized as a two-dimensional space partitioned into a plurality of bordered areas. One or more bordered areas include text. The text includes none, one or more lines of characters and each character of the text has adjustable font attributes. The adjustable font attributes include font type, font style, and font size. The method of the preferred embodiment for dynamically altering the form occurs in the following two steps.

First, for one or more bordered areas of the form, the size of the one or more bordered areas is altered by changing the adjustable height and/or the adjustable width of the one or more bordered areas so that the adjusted one or more bordered areas overlap one or more other bordered areas of the form. For the bordered areas having one or more lines of text, the font attributes of the text may also be changed so that the text overlaps into one or more other bordered areas of the form.

Second, for one or more bordered areas of the form, the adjustable height and/or the adjustable width and/or the adjustable font attributes of the text are dynamically altered (i.e. increased or decreased) in order to ensure that overlapping does not occur.

In the preferred embodiment the step of dynamically altering the adjustable height and/or the adjustable width and/or the adjustable font attributes includes the step of aligning the borders of at least two of the bordered areas so that the borders maintain alignment regardless of what happens as a result of the step of dynamic altering. This step typically includes aligning the borders of the at least two bordered areas in a vertical direction or a horizontal direction.

The present invention also includes another embodiment for representing a generic form in a computer The form comprises a plurality of bordered areas. The bordered area is considered to be the fundamental structural unit within the form and it contains other smaller bordered areas, text or graphics. The text consists of one or more characters, and the graphics includes any two dimensional drawings (i.e. lines, arrows, circles, polygons, fills, pictures, etc.). For purposes of describing the preferred embodiment of the present invention, bordered areas shall be limited to containing text or other bordered areas, but it should not be limited thereto Each of the bordered areas may also be included within a larger bordered area. Each of the bordered areas of the form is associated with a record which defines the characteristics of the associated bordered area. The method for representing a generic form comprises the following two steps. For each of the associated records of the bordered areas of the form, the first step includes indicating the larger bordered area, if any, which contains the bordered area, and the second step includes indicating the plurality of smaller bordered areas, if any, which are included within the bordered area.

Furthermore, the method may also include the step of indicating within the associated record of the bordered area whether the included smaller bordered areas are arranged horizontally or vertically. The orientation of the bordered areas is important for enabling the preferred embodiment to properly accommodate changes in the size of each bordered area.

The preferred embodiment also includes a method and apparatus in a computer for calculating the size of one or more bordered areas within a generic form. The size of each of the bordered areas is represented by a width and a height. Each of the bordered areas may be included in a larger bordered area and each bordered area includes a plurality of smaller nonoverlapping bordered areas or text. Text consists of none, one or more lines of characters. The method for calculating the size of the bordered area occurs in the following steps.

The width of one of the bordered areas (the currently processed bordered area) of the generic form is obtained. Then a determination is made as to whether the bordered area includes a plurality of smaller bordered areas or whether the bordered area includes text. When the bordered area includes text, the next step includes determining the height of the bordered area by determining the cumulative height of the none, one or more lines of characters. When the bordered area includes the plurality of smaller bordered areas, the next step includes determining whether the included smaller bordered areas are arranged within the bordered area horizontally or vertically. When the included smaller bordered areas are arranged horizontally, the next step includes determining the height of each of the included smaller bordered areas, determining which of the determined heights is the maximum height and determining the width of each of the included smaller bordered areas. When the included smaller bordered areas are arranged vertically, the next step includes determining the height of each of the included bordered areas and determining the cumulative height of all of the included bordered areas. The widths of the vertically arranged included smaller border areas are equal to or less than the width obtained for the currently processed bordered area.

The steps for determining the height of each of the included smaller bordered areas further includes the step of performing the steps of the above method one or more times to determine the size of each of smaller included bordered areas. This process continues until all of the bordered areas within the form and their smaller included hardest areas (descendants) have been sized.

Additionally, the preferred embodiment of the invention includes a method and an apparatus in a computer for placing the contents of each bordered area of a generic form. The contents of the bordered area includes a plurality of nonoverlapping smaller bordered areas or none, one or more lines of text. The bordered area has top, bottom, left and right boundary locations and the bordered area may be included within a larger bordered area (if any). The smaller included bordered areas also have top, bottom, left and right boundary locations. The method for determining the location of the contents the bordered area occurs in the following steps.

The locations of the top, bottom, left and right boundaries of the bordered area whose contents need to be located are obtained. Then a determination is made as to whether the bordered area includes the plurality of smaller bordered areas or text. When the bordered area includes text, then a determination is made as to whether the text should be aligned to the top, middle or bottom boundaries of the bordered area. When the bordered area includes smaller bordered areas, then a determination is made as to whether the smaller bordered areas are arranged within the bordered area horizontally or vertically. Assuming that the bordered area contains horizontally arranged smaller bordered areas, the location of the left and right boundaries for each of the included smaller bordered areas are determined. The location of the top boundary for each of the included smaller bordered areas are aligned (adjusted) to the to boundary of the bordered area. The location of the bottom boundary for each of the included smaller bordered areas are aligned to the bottom boundary of the bordered area. When the bordered area contains vertically arranged bordered areas, the location of the top and bottom boundaries for each of the included smaller bordered areas are determined. The location of the left boundary of each of the included smaller bordered areas are aligned to the left boundary of the bordered area, and the location of the right boundary for each of the included smaller bordered areas are aligned to the right boundary of the bordered area.

The displayed form is typically represented by a plurality of pixels which are selectively enabled or disabled on a display. Each pixel identifies an X, Y coordinate address. In the preferred embodiment, each of the bordered areas within the generic form is rectangular in shape and each of the bordered areas is represented by two pairs of X, Y coordinate addresses. One of the pairs of the X, Y coordinate addresses represents the location of one corner of the rectangular bordered area and the other represents the opposite corner of the rectangular bordered area. The method for placing the contents for each bordered area of the generic form, further contains the step of, assigning the locations of the bordered areas of the generic form their X, Y coordinate addresses. In this way, the locations of the top, bottom, left and right boundaries for the bordered areas are defined.

Lastly, the preferred embodiment of the invention also includes an apparatus and method for displaying and printing the generic form according to the locations determined for each of the bordered areas of the generic form.

BRIEF DESCRIPTION OF THE DRAWINGS

FIG. 6A depicts the form as shown in FIGS. 5A and 5B with the font size increased to 15 points resulting in rewrapping of text and the vertical length of the resulting form scrolled off the top and bottom of the screen;

FIG. 6B depicts the form of FIG. 6A with the numbering field moved to the left, forcing text to wrap and the vertical length to readjust in order to accommodate for the reduced horizontal width;

FIG. 7A depicts the form of FIG. 6B with the right border of the numbering field moved to the right, extending the horizontal width of the numbering field and the numbers are recentered;

FIG. 7B depicts the form of FIG. 7A with the left border of the numbering field moved further to the right, causing text to automatically unwrap to fill the additional horizontal space and causing the form to shrink vertically;

FIG. 8A depicts a form similar to FIGS. 5A-7B, which is further divided into rectangular bordered areas;

FIG. 8C is a table representation of the top portion of the form as shown in FIGS. 8A and 8B, indicating whether the bordered area includes smaller bordered areas (or descendants) as text;

FIG. 13B is a flow block diagram of the REAPPORTION CHILDRENS' WIDTH Routine referenced during the COMPUTE SIZE FOR HORIZONTAL CELL Routine (FIG. 13D) for apportioning the total width available among each of the descendants;

FIG. 14B is a table representation of the form shown in FIG. 14A along with old and new widths, heights, rectangular coordinates and the type of contents of each bordered area;

FIGS. 15A, 15B and 15C depict a result table for showing the contents of a stack and the currently processed bordered area according a detailed example of FITCELL Routine Set (FIGS. 13A–F);

FIGS. 17A, 17B, 17C and 17D depict a results table for showing the contents of a stack and a pointer to the currently processed bordered area according a detailed example of the PLACECELL Routine Set (FIG. 16A–F);

TABLE OF CONTENTS TO THE DETAILED DESCRIPTION

Figure 18A:
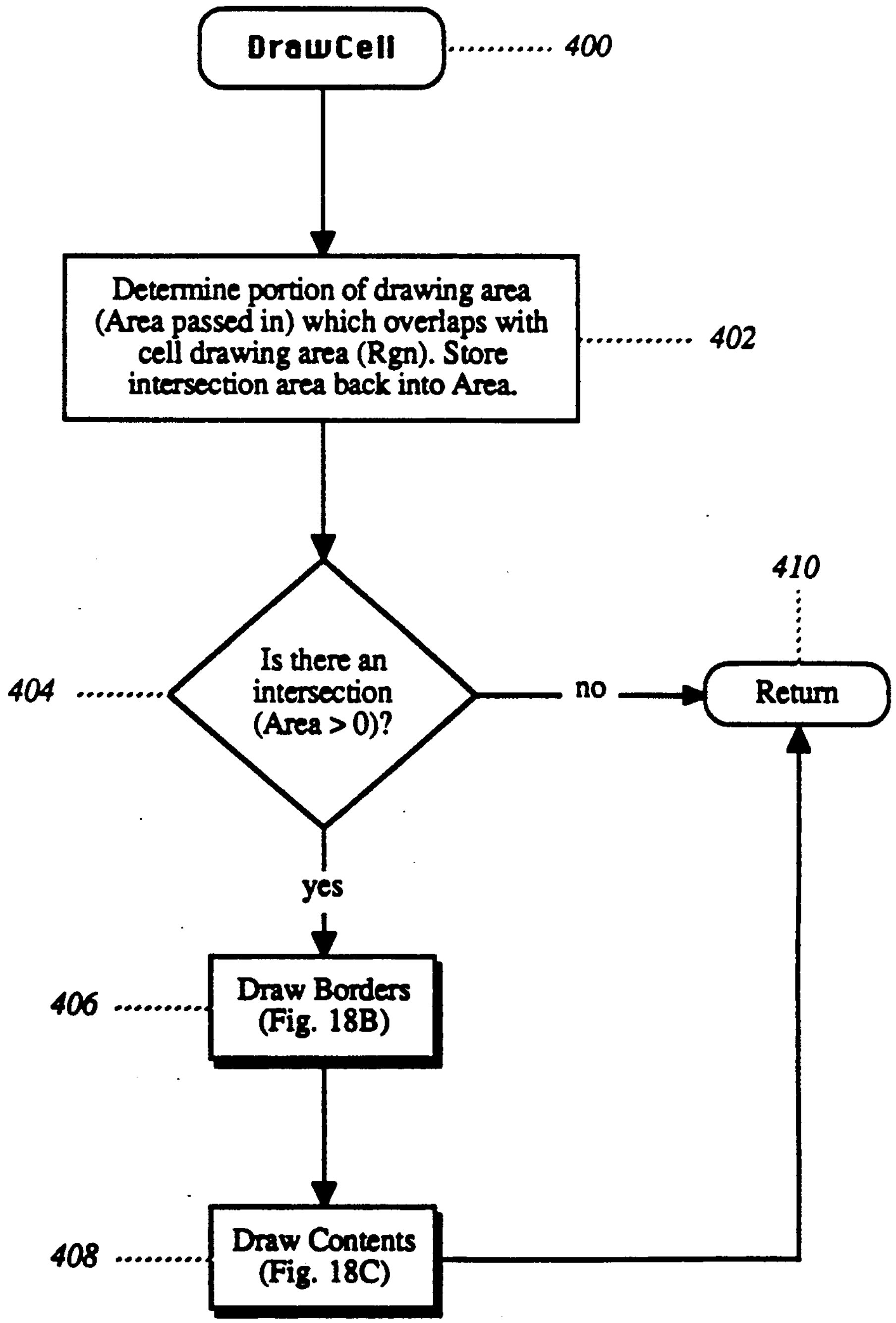
FIG. 18A is a flow block diagram of the DRAWCELL Routine referenced during the DRAWFORM Routine (FIG. 11) for displaying each of the bordered areas of a form, their descendants and text.
Figure 18B:
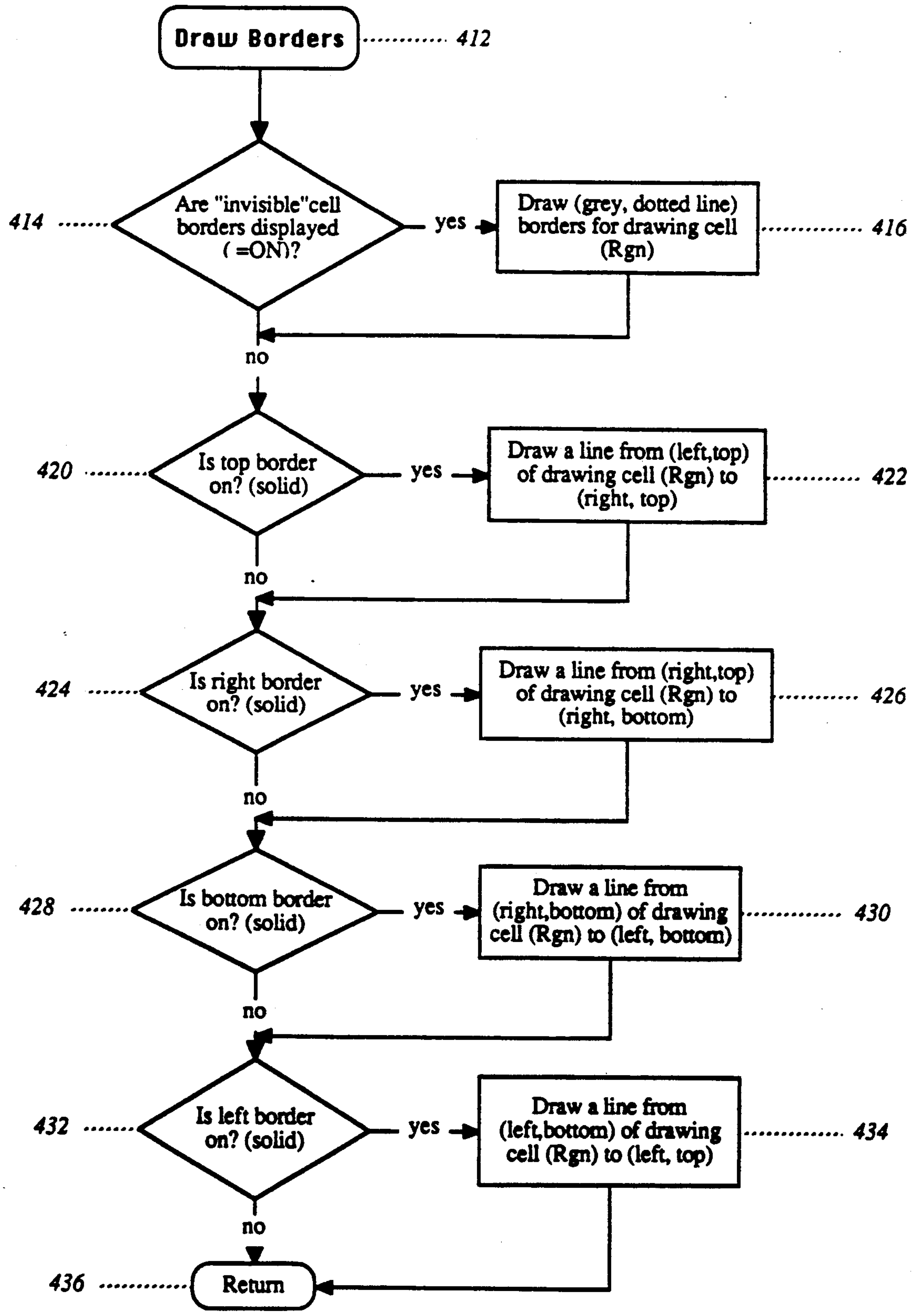
FIG. 18B is a flow block diagram of the DRAW BORDERS Routine referenced during the DRAWCELL Routine (FIG. 18A) for displaying each nonprintable and/or printable border of the currently processed bordered area.
Figure 18C:
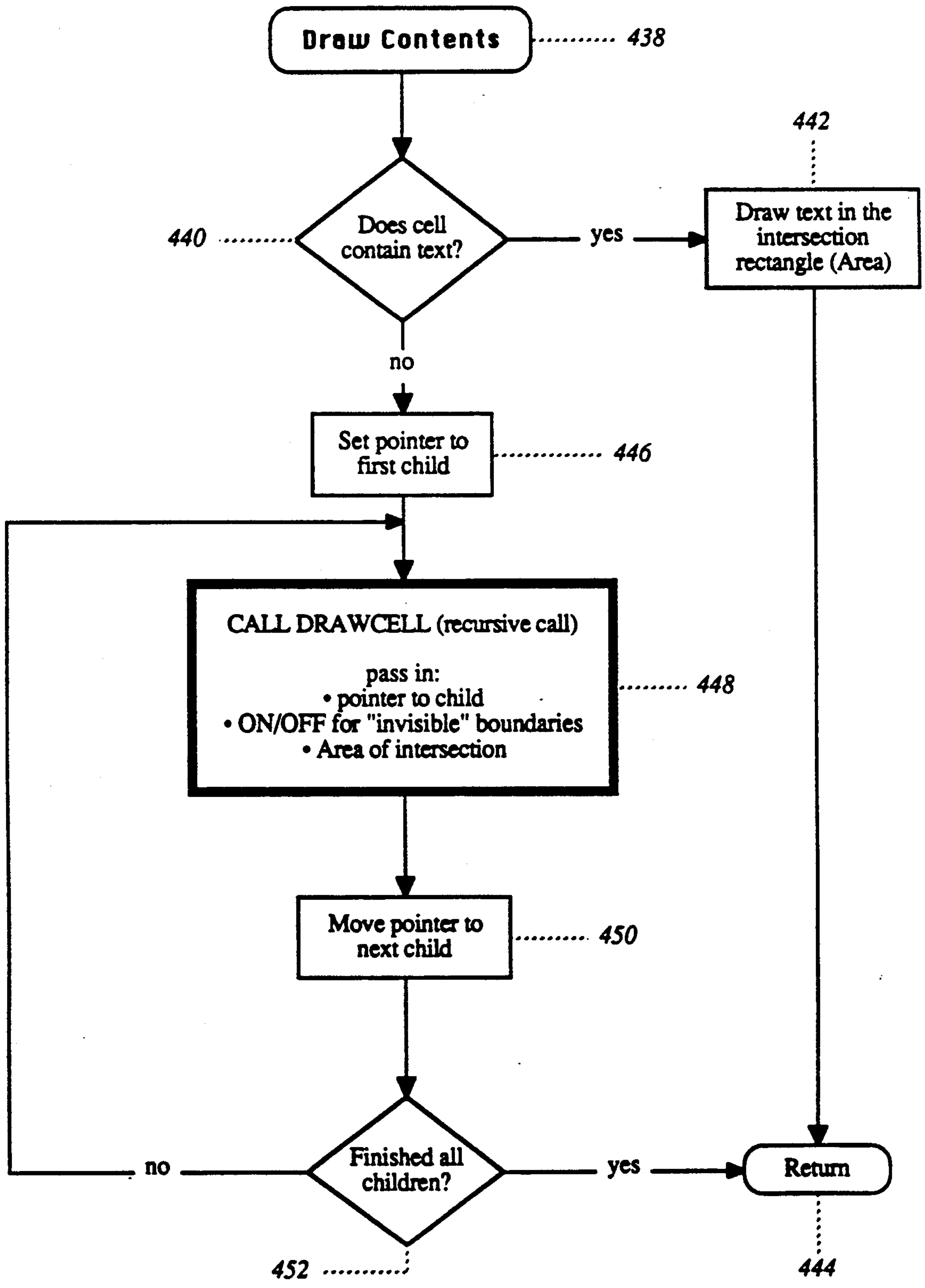
FIG. 18C is a flow block diagram of the DRAW CONTENTS Routine referenced during the DRAWCELL Routine (FIG. 18A) for displaying the contents (i.e. all descendant bordered areas and text) of a particular bordered area.

DETAILED DESCRIPTION
- A) INTRODUCTION
- B) DETAILED DESCRIPTION OF THE PREFERRED EMBODIMENT
  - 1) Introduction to "Graphics Intelligence"
  - 2) Bordered Area Record and Text Record
  - 3) RESIZE/REFORM Routine (FIG. 9)
  - 4) FITFORM Routine (FIG. 10)
  - 5) DRAWFORM Routine (FIG. 11)
  - 6) PLACEFORM Routine (FIG. 12)
  - 7) FITCELL Routine Set (FIGS. 13A–F)
    - a) FITCELL Routine (FIG. 13A)
    - b) COMPUTE CELL FOR TEXT CELL Routine (FIG. 13B)
    - c) COMPUTE SIZE FOR VERTICAL CELL Routine (FIG. 13C)
    - d) COMPUTE SIZE FOR HORIZONTAL CELL Routine (FIG. 13D)
    - e) REAPPORTIONED CHILDRENS' WIDTH Routine (FIG. 13E)
  - 8) DETAILED EXAMPLE of the FITCELL Routine Set (FIGS. 13A–E)
  - 9) PLACECELL Routine Set (FIGS. 16A–F)
    - a) PLACECELL Routine (FIG. 16A)
    - b) PLACE TEXT CELL Routine (FIG. 16B)
    - c) PLACE HORIZONTAL CELL Routine (FIG. 16C)
    - d) PLACE VERTICAL CELL Routine (FIG. 16D)
    - e) DETERMINE VERTICAL ALIGNMENT Routine (FIG. 16E)
    - f) JUSTIFIED Routine (FIG. 16F)
  - 10) DETAILED EXAMPLE OF THE PLACECELL Routine Set (FIGS. 16A–F)
  - 11) DRAWCELL Routine Set (FIGS. 18A–C)
    - a) DRAWCELL Routine (FIG. 18A)
    - b) DRAW BORDERS Routine (FIGS. 18B)
    - c) DRAW CONTENTS Routine (FIG. 18C)

DETAILED DESCRIPTION

A) INTRODUCTION

Figure 1:
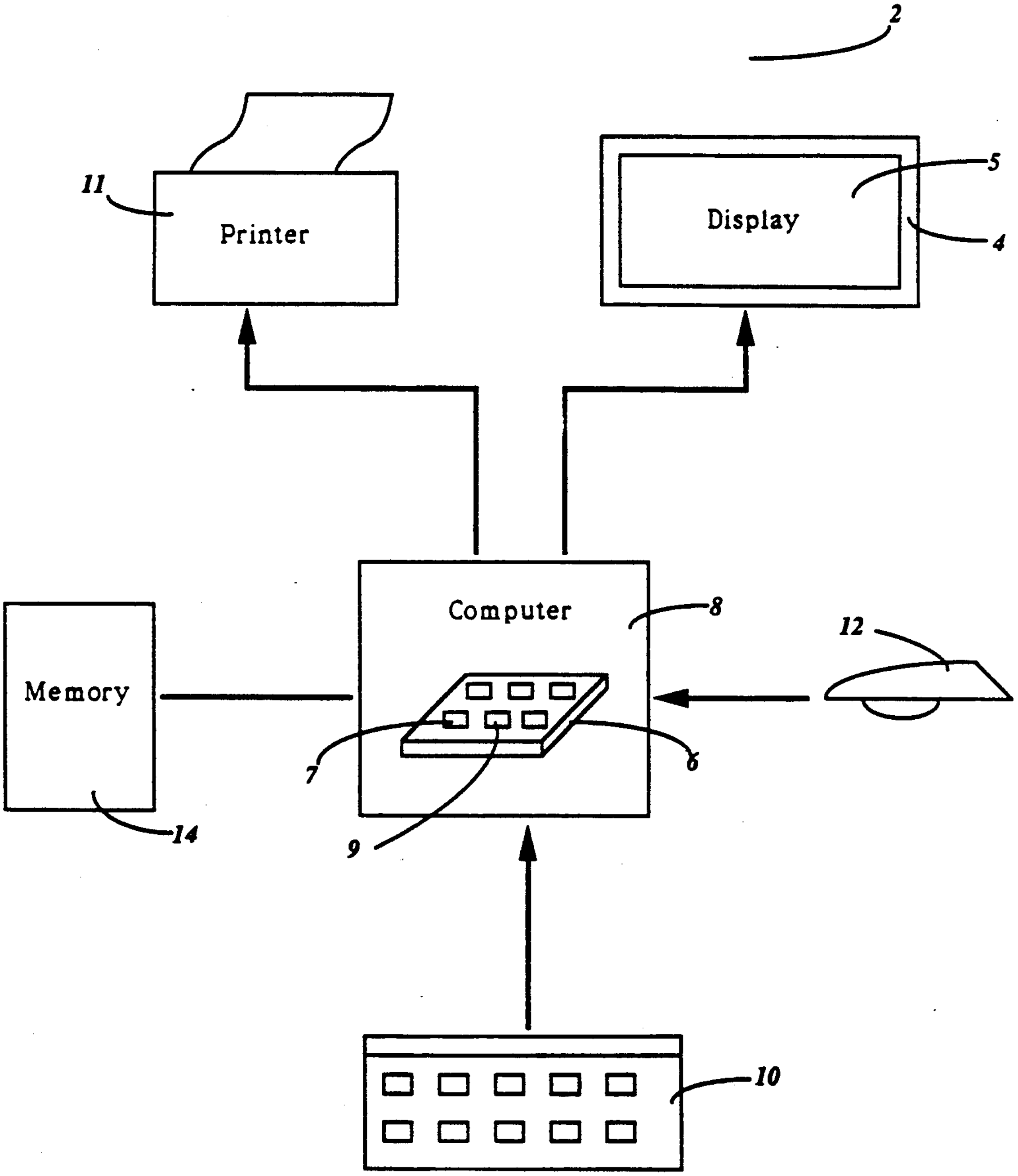
FIG. 1 is a block diagram representation of a computer system 2 for creating, revising, storing, displaying and printing generic forms in accordance with the present invention.

The following description of the present invention is largely in terms of routines and symbolic representations of operations on data (FIG. 9 through FIG. 18D), received by and stored within a computer FIG. 1. These representations are the means used by those skilled in data processing to most effectively convey the nature of their conceptions to others skilled in the art. A routine, as defined in the context of this invention, is a self-consistent sequence of steps leading to a desired result. Such steps are those requiring physical manipulation of physical quantities. These quantities are typically in the form of electromagnetic signals capable of being stored, transformed, combined, compared, and otherwise manipulated. The signals are typically referred to as bits, values, elements, symbols, characters, terms, memory cells, display elements, or the like. It should be kept in mind, however, that all of these and similar terms are to be associated with the appropriate physical quantities and are merely convenient labels applied to such quantities.

Although the routines manipulations performed by the may be associated with mental operations performed by human operators, there is no human operator necessary or, in fact desirable, in any of the operations described herein which form the present invention. Useful machines for performing the operations of the present invention include general purpose digital computers or other similar devices The present invention also relates to an apparatus for performing these operations. This apparatus may be specially constructed for the required purpose or may comprise a general purpose computer (i.e., IBM PC-AT Apple Macintosh, Compac-386, etc.). Howver, it should be noted that the routines presented herein are not necessarily related to any particular computer. Various general purpose machines may be used with the teachings discussed herein, or it may prove more convenient to construct a more specialized apparatus to perform the required method steps of operation.

It should be noted that no particular program language is indicated for performing the various operations described herein. This omission is deliberate, for there are no universally accepted programming languages available for all machines or procedures. Due to the complexity of the present invention, it would be tedious and difficult to follow a computer listing on the same. Therefore, the operations and procedures described herein are illustrated in the accompanying figures which sufficiently depict to one ordinarily skilled in the art the methodology for performing the present invention. It should also be apparent to those skilled in the art that although the present invention may be depicted in the form of routines shown in the figures herein, well known circuits and structures may also be used to implement the present invention in a "hard-wired" form.

FIG. 1 depicts a computer based system 2 for generating generic forms according to the present invention. Computer 8 contains controller board 6 for performing three major operations of the computer. They are, one—input/output operations for communicating information in the properly structured form to and from other parts of the computer 8, two—a central processing unit (CPU) (not shown) for performing all arithmetic operations, and three -- a memory for storing data. The generation of generic forms according to the present invention may be carried out by software programs processed by microprocesssor chips 7 on controller board 6 or in the form of special purpose hard-wired microprocessor chips 9 which would also be located on the controller board 6. When the software programs for generating the generic forms are stored on controller board 6 or when the microprocessor chips having the proper hard-wire logic are implemented via the controller board 6, a platform or card for generating generic forms is created. This card may then interface with any one of a variety of computers presently available on the market.

FIG. 1 also shows two forms of input devices, including keyboard 10 and mouse 12. !t should be understood that the input devices may actually include card readers, magnetic or paper tape readers, or other well-known input devices, including other computers. Computer system 2 also contains a memory device 14 for storing object code, for representing the generic forms. The mouse 12 permits the user to input graphic information to the computer 8 through its input circuitry in a well-known manner. Generally mouse 12 provides cursor control to identify positions of the cursor on a display screen 5 within display mean 4. The display screen 5 is used to display the generic forms being generated by the present invention. The display mean 4 may be any one of several systems well-known to those skilled in the art. Another form of output device for displaying the form is printer 11. There are also many different and well known printers which are suitable for printing forms.

The cathode ray tube (CRT) of the display screen 5 comprises a plurality of pixels or picture elements which are selectively enabled or disabled in order to define desired images on the display screen 5. The pixels form a grid disposed over the CRT and the pixels are identified by a bit map. More particularly, the pixels are organized such that they can be identified according to unique X, Y coordinates in a 2-dimensional array. The O, O coordinate of the bit map has been typically picked to reside in the upper left-hand corner of the CRT. The O, O coordinate also represents the first point of any generic form. The pixel elements of the CRT are enabled and disabled according to the object code stored in memory 14. Although the bit map may be present on the CRT, it is not completely stored in the memory 14; instead a compressed encoded version of the form is stored in memory 14. The compressed encoded version consists of only enough information to produce the form on the CRT.

B) DETAILED DESCRIPTION OF THE PREFERRED EMBODIMENT

1) Introduction to "Graphics Intelligence"

A typical form has many rectangular components filled with text, for example, the familiar I. R. S. 1040 form. The main distinction between forms and word processing documents is that forms have much more structure. Forms are characteristic in that they provide a lot of information in small bordered areas or cells. In the preferred embodiment, the form is characterized as a two dimensional space partitioned into a plurality of cells or bordered areas. The bordered area is the fundamental structural unit within a form. It must be noted that the bordered areas can be of any shape; however, for purposes of simplifying the description of the preferred embodiment, the bordered areas are assumed to be rectangularly shaped. Bordered areas are not entirely independent of one another, rather they correspond to one another by various graphical, spacial or topological relationships. Therefore, changes made to the spacing or relative sizes of the one or more bordered areas within the form may effect portions of the rest of the form. In order to maintain these relationships the entire form may need to be altered or reconfigured when resizing occurs to any one of the bordered areas within the form.

There are several principles which are unique to the processing of forms and unique to the present invention. In order to maintain the integrity of a form (i.e. information integrity, structural integrity, etc.) certain topological relationships of the form must be maintained. The first and most important topological relationship in a form is that the bordered areas do not overlap one another. The bordered areas are considered overlapping one another when: (1) the text of one bordered area overlaps the text of another bordered area, (2) the text of one bordered area overlaps a border of another bordered area or (3) the border of one bordered area overlaps a border of another bordered area. In order to ensure that such overlapping does not occur, the system of the present invention controls one, two or all three variables which dictate the size of a bordered area and the size of the text of the bordered area. The three variables are: (1) horizontal width of the bordered area; (2) vertical length of the bordered area; and (3) font attributes of each character of text in the bordered area. The attributes consist of font style, font size and font type, etc.

More particularly, the nonoverlapping principle as controlled by these three variables (i.e. width, height and font attributes) is illustrated by the following examples. If a bordered area is widened such that the bordered area overlaps one or more adjacent bordered areas, then the adjacent bordered areas' width could be increased in an appropriate amount and the text shifted over in order to avoid such overlapping. Likewise, if the height of a particular bordered area of a form were increased such that the bordered area overlapped into other adjacent bordered areas, then the adjacent bordered areas could have their heights increased in an appropriate amount and text shifted up or down in an appropriate amount in order to avoid such overlapping. Also, if the text of a particular bordered area were to "spill over" the borders of the bordered area such that the text overlapped other adjacent bordered areas, then the font size of the text could be reduced and the text shifted in an appropriate amount to ensure that the text did not spill over the borders of the bordered area. Lastly, to avoid overlapping into the adjacent bordered areas as discussed above, one or more of the variables (i.e. width, height and font size) in any combination could be altered (i.e. increased, decreased or shifted (text) in the appropriate amount) in order to ensure that overlapping does not occur. Also, any such adjustment to avoid overlapping may cause new overlapping in other adjacent bordered areas. This will require further adjustment until all bordered areas do not overlap. Although the preferred embodiment disclosed herein is directed to a specific apparatus and procedure for ensuring that overlapping bordered areas do not occur, it should not be limited thereto, for it is envisioned that a number of different embodiments could be implemented which could all successfully ensure the integrity of the form.

A second important topological relationship for a form is that certain borders of more than one bordered area of the form maintain alignment, either horizontal or vertical vis-a-vis each other, so as to create a contiguous line. For example, a column of bordered areas vertically arranged will require that the left and/or right borders of each bordered area align with one another in order to remain a column. Another example of such alignment would be the outer boundary of the form which is made up of several bordered areas. Additionally, the need for alignment may occur when the bordered areas of the form are arranged as a table, a grid, etc. The requirement to align particular bordered areas adds additional constraints to the way in which the three variables (i.e., width, height, and font, attributes), can be used in order to maintain no overlapping bordered areas within the form.

The procedures for maintaining the topological relationships discussed thus far are hereinafter referred to as "graphics intelligence". Because the concept of graphics intelligence is rather abstract and difficult to grasp in a few sentences, it is best to start with a basic example of how the concept works visually. To provide "snap shots" of graphics intelligence in action, FIGS. 2 through *7b* demonstrate how it may be applied.

Figure 2:
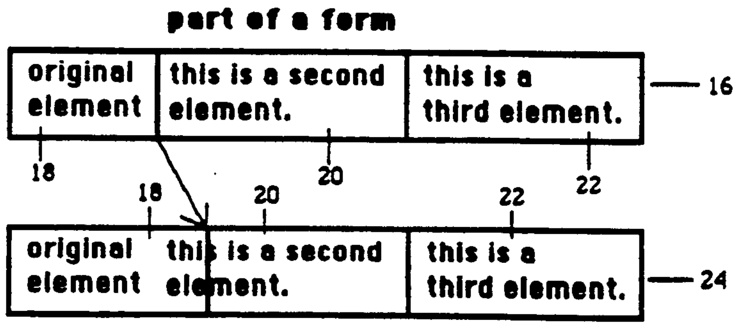
FIG. 2 depicts a bordered area having three elements (portions) and demonstrates reconfirmation without graphics intelligence.

Referring to FIG. 2 a particular bordered area 16 having three elements or smaller bordered areas 18, 20 and 22 is shown. Bordered area 16 may be a row of a larger form not shown. In order to adjust the "sizing" of the first element 18 of the bordered area 16 without using graphical intelligence, the vertical bar separating element 18 from element 20 must first be shifted to the right and the information within element 20 must then be manually reconfigured to fit in the reduced area of element 20. Bordered area 24 (FIG. 2) shows the result of shifting to the right the vertical separator between elements 18 and 20.

Figure 3:
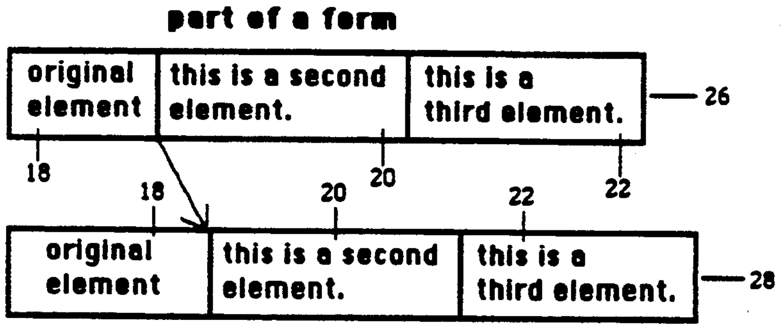
FIG. 3 depicts the same bordered area having three elements as shown in FIG. 2 and demonstrates reconfiguration with graphics intelligence and without horizontal constraints.
Figure 4:
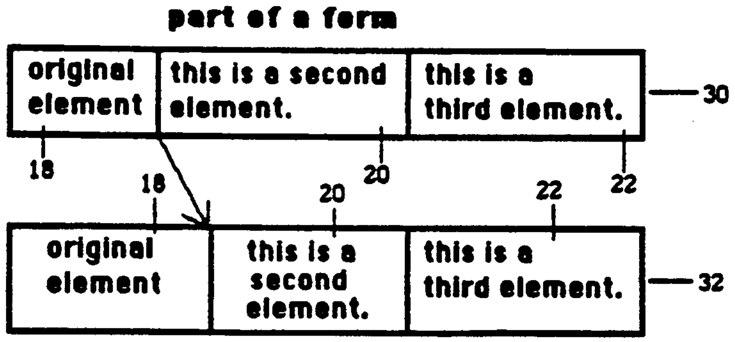
FIG. 4 depicts the bordered area having three elements as shown in both FIG. 2 and FIG. 3 and demonstrates reconfiguration with graphics intelligence and with horizontal constraints.

If graphics intelligence were applied and there were no constraints on the horizontal width of bordered area 16, then FIG. 3 shows the resulting bordered area 28. The width of bordered area 18 expanded horizontally and the widths of bordered areas 20 and 22 remain the same but are physically shifted over to the right of the newly positioned separator. In many situations however, horizontal constraints are placed on the form which forces the total horizontal width of the bordered area 16 to remain constant. FIG. 4 represents a result of shifting to the right the vertical separator between elements 18 and 20, yet maintaining the total horizontal width of bordered area 16 constant. Note, to accommodate the horizontal width constraint, the bordered area 32 had to stretch vertically downward. In addition, the text in second element 20 rewrapped in order to accommodate the smaller horizontal width within element 20. Although this example only demonstrates changes to bordered area 16, if bordered area 16 were part of a larger form then the orientation of the rest of the form could be affected as well.

Figure 5A:
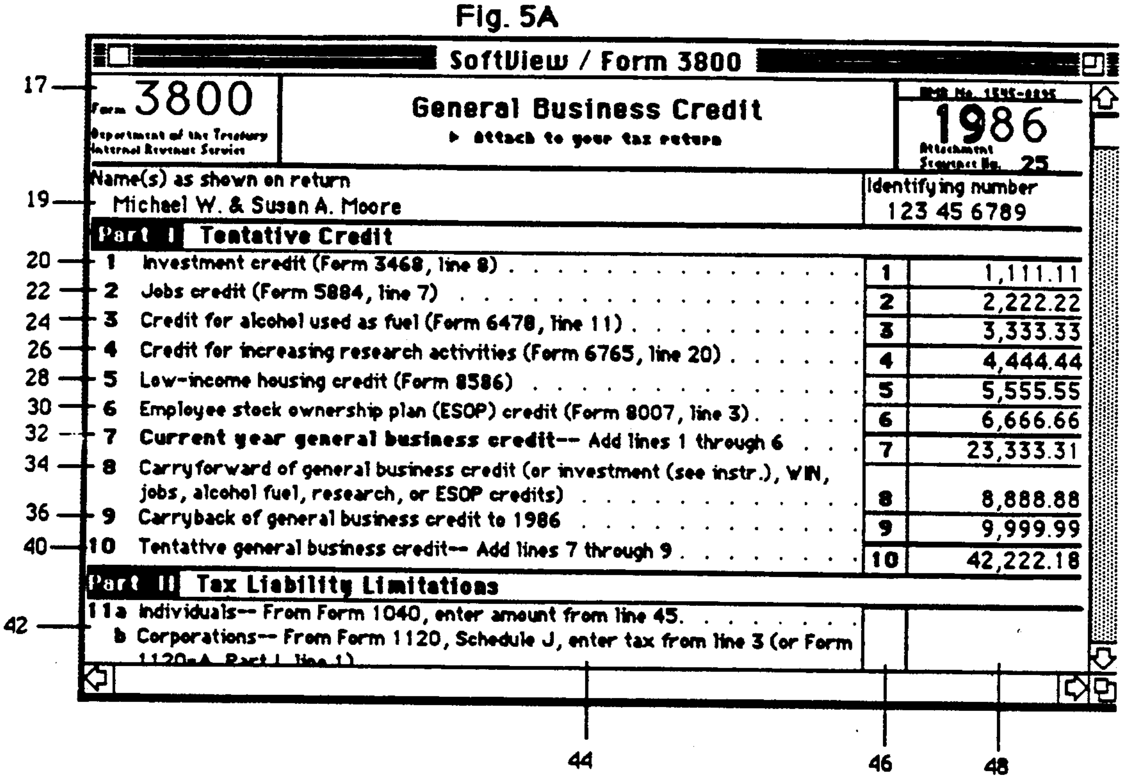
FIG. 5A depicts a typical form as displayed on the screen display means (5, FIG. 1) of the computer system 2 (FIG. 1)
Figure 5B:
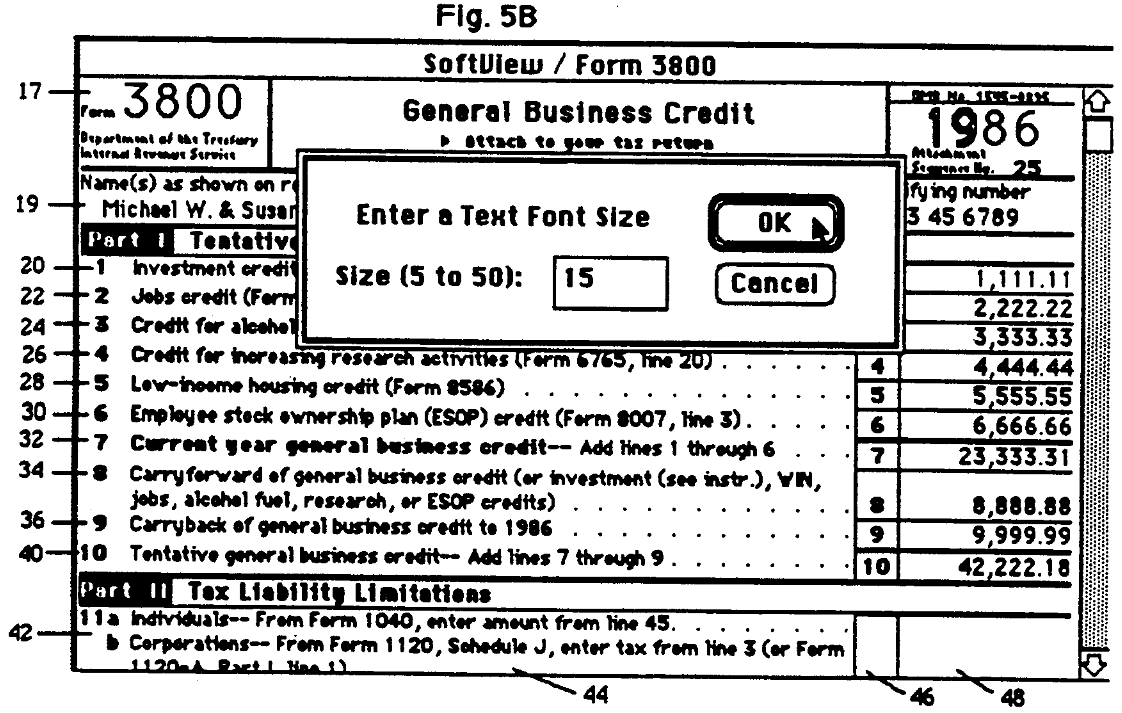
FIG. 5B depicts a menu item requested by a user of computer system 2 (FIG. 1) for changing font size of a portion of the form text (the "Caption Text" i.e., columns 44 and 46, FIG. 5A) from 9 points to 15 points.

FIG. 5A depicts a typical I. R. S. Form 3800. The form is displayed at normal width and text font size. Form 3800 is broken up into a series of rows and columns where each of the rows 17–42 provide particular information. Parts 1 and 2 of the form entitled "Tentative Credit" and "Tax Limitations" are broken into three columns, 44, 46 and 48. Column 44 includes text regarding questions and information, column 46 is a numbering field having numbers 1 through 10, and column 48 lists monetary figures. FIG. 5B depicts a menu item selected by a user of system 2 (FIG. 1) to change the font size of some of the form text (the "caption text" i.e. 44 and 46 (FIGS. 5A, 5B and 6A)) from 9 points to 15 points. FIG. 6A depicts Form 3800 where the font size has increased to 15 points. In this example, the form has been constrained horizontally so that it does not expand or scroll off to the right or left of the screen display 5. In this way the horizontal width of the form has been preserved and the larger font size forces the text to wrap to the next line where necessary. For example, referring to FIGS. 5A and 5B under Part 1, text lines 24, 26, 30 and 32 which only occupied one line, wrap to the following line as shown in FIG. 6A. The result is that the Form 3800 stretches in the vertical direction in order to accommodate for the changes in font size. In one sense, the form 3800 acts like a rubber sheet that can be pulled and tugged in the vertical direction.

Note that horizontal and vertical dimensions of a bordered area can be graphically manipulated independent of one another. In FIG. 6B the numbering field (column 46) has been moved to the left, forcing the text under part 1 (column 44) to further wrap and readjust to accommodate for the reduced horizontal space. Note in FIG. 6B that text lines either wrap for the first time (i.e., 20 and 28) or further wrapping occurs on lines 24, 26, 30 and 32. The vertical length of the form increases.

Referring to FIG. 7A, the right border of the numbering field in column 46 has been moved to the right, extending the horizontal width of the numbering field 46 and the numbers recenter themselves automatically to satisfy a centering constraint. Referring to FIG. 7B, the left border of the numbering field 46 is moved further to the right, causing the numbers in column 46 to move over and recentered, and the text in column 44 automatically unwraps to fill up the increased horizontal space in the column, causing the form to shrink vertically. Note that line 17 is now visible in FIG. 7B, whereas in FIG. 7A, line 17 scrolled off the top of screen.

Several observations can be made regarding the changes to IRS form 3800 in FIGS. 5A, 5B, 6A, 6B, 7A and 7B. Namely, changes made to bordered area size, text font, text size, placement, shape, etc., may cause all the other bordered areas to readjust, stretch, move over or realign to positionally accommodate the change while maintaining the overall integrity or basic look of the form. A preferred embodiment for fulfilling these operations is depicted in FIGS. 9 through 18D.

Additional observations include the following points. A bordered area containing text can have different widths by wrapping text. To make a bordered area narrower (or wider), the text is broken at certain points in order to allow it to fit inside the new specified region. To make a bordered area narrower requires more lines of text, causing the bordered area to stretch or become vertically taller. Alternatively, making a border wider requires fewer lines of text, causing the bordered area to shrink and become shorter.

A form can also have different widths by adjusting the boundaries of several bordered areas contained within the form. To make a form narrower or wider, the widths of one or more bordered areas containing text are reduced or increased in appropriate amounts. The appropriate amount for each bordered area may be calculated by determining the total amount the widths increases or decreases for each row of bordered areas of a form, and then apportioning the increase or decrease among each of the bordered areas in the same row. The text within the bordered area is wrapped to fit the new widths. The heights of all of the bordered areas are increased (or decreased) in appropriate amounts to include the wrapped text. Finally, the positions of all of the bordered area are adjusted so that no bordered areas overlap. In this way the height of the form as a whole will increase (or decrease).

Figure 8B:
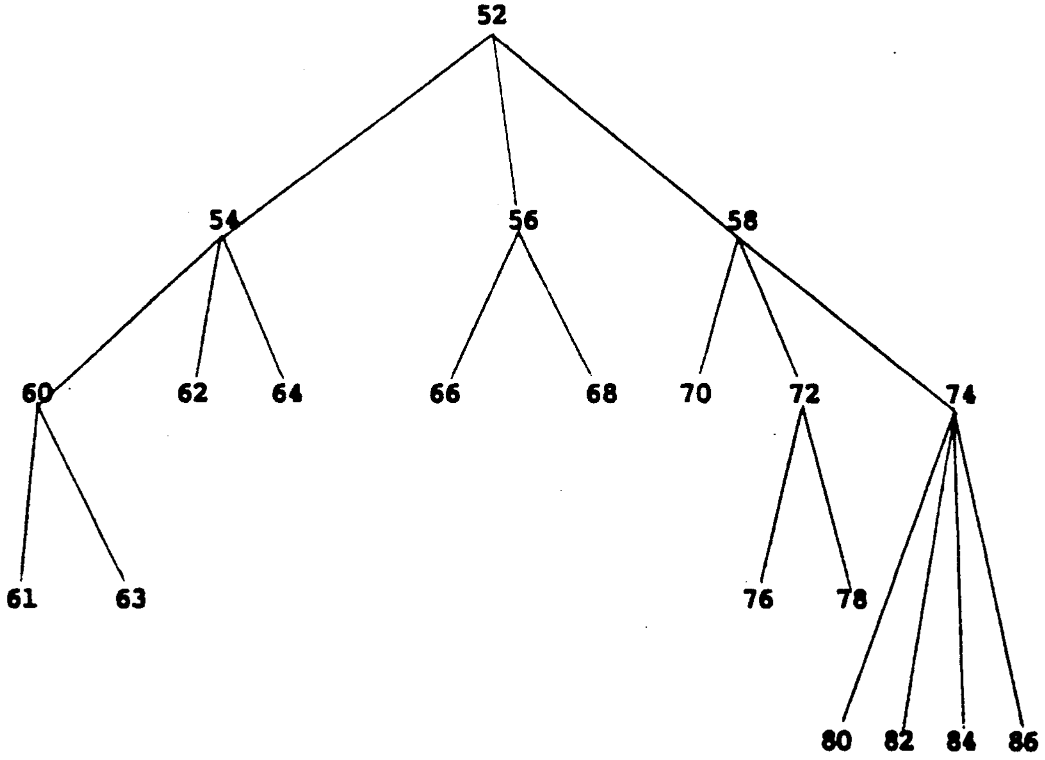
FIG. 8B shows a hierarchial tree structure representation of the top portion of the form as shown in FIG. 8A.

Referring to FIG. 8A, I. R. S. Form 3800 is shown further divided into rectangular bordered areas. Particularly, the top portion of the I. R. S. Form 3800 (52, FIG. 8A) is shown subdivided into several smaller bordered areas. The IRS form 3800 may be considered a hierarchical tree with the top level or highest node of the hierarchical tree representing the largest bordered area of the form and lower level nodes which branch from the top level representing smaller bordered areas which are included within the largest bordered area. The top level bordered area can be considered to be the "parent" to the lower level children bordered areas, "siblings." A sibling may also be a parent to lower level children as well. Eventually, all branches stemming from the top level bordered area end with a bordered area having text. For each level of siblings (children who have the same parent), the present invention assumes that none of the siblings overlap regardless of the content (i.e. descendant bordered areas or text) of each sibling bordered area. FIG. 8B shows the hierarchical tree structure representation of the top portion 52 of the form shown in FIG. 8A. The tree structure representation emphasizes which bordered areas are included in other bordered areas. FIG. 8C is a table representation of the form shown in FIGS. 8A and 8B. The table indicates whether the contents of each bordered area include children (horizontally or vertically arranged) or text; (i.e. whether the bordered area contains sibling bordered areas which are horizontally or vertically arranged with relation to one another or whether the contents include text.)

Referring to FIGS. 8A, 8B, and 8C, each bordered area 54, 56 and 58 is included within the larger bordered area 52. Each bordered area contains a plurality of smaller bordered areas or text; for example, border area 60 within bordered area 54 contains smaller bordered areas 61 and 63 and bordered area 62 also within bordered area 54 contains text, "Department of the Treasury". Referring to FIG. 8B, the largest bordered area or "parent" bordered area 52 is shown at the top or first level of the tree structure. The parent bordered area 52 is subdivided into "children" or "sibling" bordered areas 54, 56 and 58. Bordered areas 54, 56 and 58 are shown at the second level of the tree structure and they are arranged horizontally with relation to one another (as shown in FIG. 8A and are indicated in FIG. 8C) within the bordered area 52.

Each bordered area 54, 56 and 58 contains further smaller bordered areas and is, therefore, considered to be the parent of the smaller bordered areas. Specifically, bordered area 54 is the parent bordered area for the children bordered areas 60, 62 and 64. Likewise, bordered area 56 is the parent bordered area for children bordered areas 66 and 68. Bordered area 58 is the parent bordered area for the children bordered areas 70, 72 and 74. The children bordered areas of each bordered area 54, 56 and 58 are arranged vertically (as indicated FIG. 8B). At the third level of the tree structure, many of the bordered areas are bottom nodes 62, 64, 66, 68 and 70. Referring to FIG. 8A, note that all bottom nodes to the tree contain text. Looking to the fourth level of the tree structure, bordered area 60 is the parent for child bordered areas 61 and 63. Child bordered areas 61 and 63 are arranged horizontally to one another within bordered area 60. Because bordered areas 61 and 63 are bottom nodes, they contain text. Specifically, bordered area 61 contains the word "IRS No." and bordered area 63 contains the number "3800".

2) Bordered Area Record and Text Record

Each bordered area of the form is associated with a record of data which defines the characteristics of that bordered area. The total set of records defines the hierarchical tree structure of the form (as shown in FIGS. 8A and 8B). The records interlink each of the borders within the generic form. The system (FIG. 1) incorporating the invention provides the necessary information to the records associate with each of the bordered areas of the form. The computer record for each bordered area contains an indication of the larger (parent) bordered area, if any, which includes the bordered area. The record also indicates whether the bordered area contains a plurality of smaller bordered areas (children). For example the record associated with bordered area 60 would indicate that it contains a plurality of bordered areas (i.e. children bordered areas 61 and 63).

The record indicates whether the smaller included bordered areas (i.e. 61 of 63) are arranged vertically or horizontally within the bordered area 60. For example, the record for bordered area 52 would indicate that bordered areas 54, 56 and 58 are horizontally arranged within bordered area 52. However, the record for bordered area 54 would indicate that the bordered areas 60, 62 and 64 are vertically arranged within bordered area 54. Also, the record for bordered area 58 would indicate that bordered areas 70, 72 and 74 are vertically arranged within bordered area 58. The orientation of the bordered areas is important for enabling the preferred embodiment of the invention to properly accommodate changes to the generic form (to be discussed further shortly).

The record for the bordered area indicates which of any other bordered areas, are ordinarily adjacent (previous and next for horizontally arranged bordered areas, above and below for vertically arranged bordered areas) to the bordered area and are included within the same parent bordered area ("siblings"). For example, bordered area 56 is adjacent to both bordered areas 54 and 58. Additionally, bordered area 62 is adjacent to bordered areas 60 and 64, which are above and below bordered area 62. The record indicates the quantity of smaller bordered areas (children) contained in the bordered area. For example, bordered area 54 contains three bordered areas—60, 62 and 64. The record indicates the size of the bordered area by "width" and "height" of the bordered area. In the preferred embodiment width and height are measured in units of pixel elements.

In the preferred embodiment, the placement or location of the bordered area within the form is also indicated in the record associated with the bordered area. The location is represented by at least one pair of X, Y coordinates designated in units of pixel elements. When the bordered areas are rectangular in shape, each bordered area is defined by two pairs of coordinates; one of the pairs of coordinates identifies the location of the top left corner of the bordered area and the other pair of coordinates identifies the location of the bottom right corner of the bordered area. In this way only two pairs of coordinate values need to be stored in memory in order to identify the location of the bordered area. This representation of the bordered area is considered an encoded version of the bordered area. Alternatively, the rectangular area could also be identified by two pairs of coordinates which indicate the locations of the opposite corners of the bordered area. The record also indicates ordinal values of children bordered areas within the parent bordered area. For example, child bordered areas 54, 56 and 58 are included in the parent bordered area 52 and child bordered area 54 can be designated to be in the first ordinal position, child bordered area 56 in the second ordinal position, and bordered area 58 in the last ordinal position. The record may only contain a subset of this information. The ordinal positions of the child bordered areas enables the present invention to point to the children bordered areas one at a time for processing purposes.

Each bordered area within the generic form has a certain boundary defined by a border line (visible or invisible). The boundary defines the exterior limit of each bordered area of a particular form regardless of the shape of the bordered area. In the example shown in FIG. 8A, the borders for the bordered areas are shown as dotted lines. The border can have unlimited variety attributes which define its thickness, color, roundness, pattern (solid, dotted, dashed etc.), etc. The attributes associated with the border are also stored in the record associated with the bordered area.

In the preferred embodiment, each bordered area record is pointed to by another data structure called a record pointer. The record pointer contains the address to the data structure which contains the record data. If a bordered area does not contain child bordered areas, the record for the bordered area will contain a data structure called a text pointer. The text pointer contains the address of another data structure or text record which includes record information describing the characteristics of the text included within the bordered area.

To edit text in a bordered area the text editing capability of a computer needs to know where and how to display the text, where to store the text, etc. The display, storage and editing information is contained in the text record, which defines the complete editing environment. For example, in the Apple Macintosh environment, one prepares to edit text by specifying a "destination rectangle" in which to draw the text and a "view rectangle" in which the text will be visible. The text record contains both the destination rectangle and the view rectangle areas. Information in the text record also indicates the height of each line of characters which make up the text, the total number of characters which form the text, the number of lines of text within the bordered area, the character style, font type and font size. Each character can have a font independent of any other character. The font includes the font family (Helvetica, Courier etc.), stylistic variations (such as boldness and slant) and special effects (such as shadows). This information is critical for determining the vertical length a particular bordered area must have in order to accommodate the wrapping of the text within the horizontal width and the accumulated height of each line of text. Those skilled in art are familiar with various procedures for determining the wrapping requirements of text in a particular area.

In order to determine where the characters begin in each line of text, the position of the first character is stored in the text record. The record also contains an indicator indicating whether the text is justified to the right, left, top, bottom or center of the bordered area. For example, the words "General Business Credit" are justified to the center (vertically and horizontally) of the bordered area 66. Whereas the words "Tentative Credit" are justified to the left of the bordered area 80 (horizontally).

Figure 9:
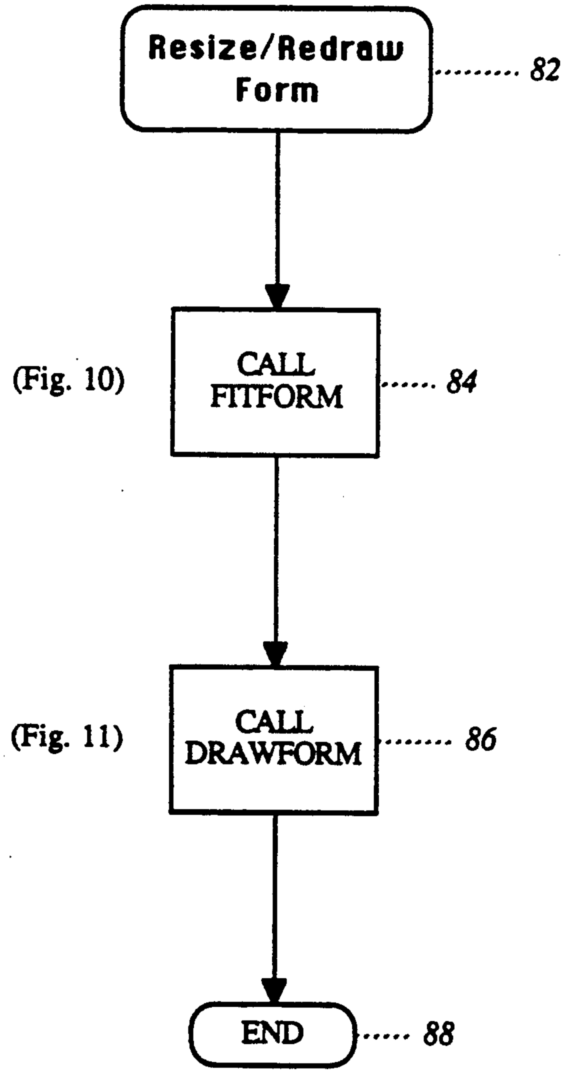
FIG. 9 depicts a flow block diagram of the RESIZE/REDRAW Routine performed by the computer system 2 (FIG. 1) for resizing and redrawing generic forms.

3) RESIZE/REFORM Routine (FIG. 9)

FIG. 9 is a flow diagram of the RESIZE/REFORM Routine for recomputing and drawing forms. Essentially this routine is the highest level program for calling other programs for sizing and drawing a particular form. Specifically, at block 84, the FITFORM (FIG. 10) is called for sizing the bordered areas within a form which may have just undergone modifications. Then at block 86, the DRAWFORM Routine (FIG. 11) is called to display the newly sized form on the display screen 5 (FIG. 1). Then during block 88 the routine completes its operation.

Figure 10:
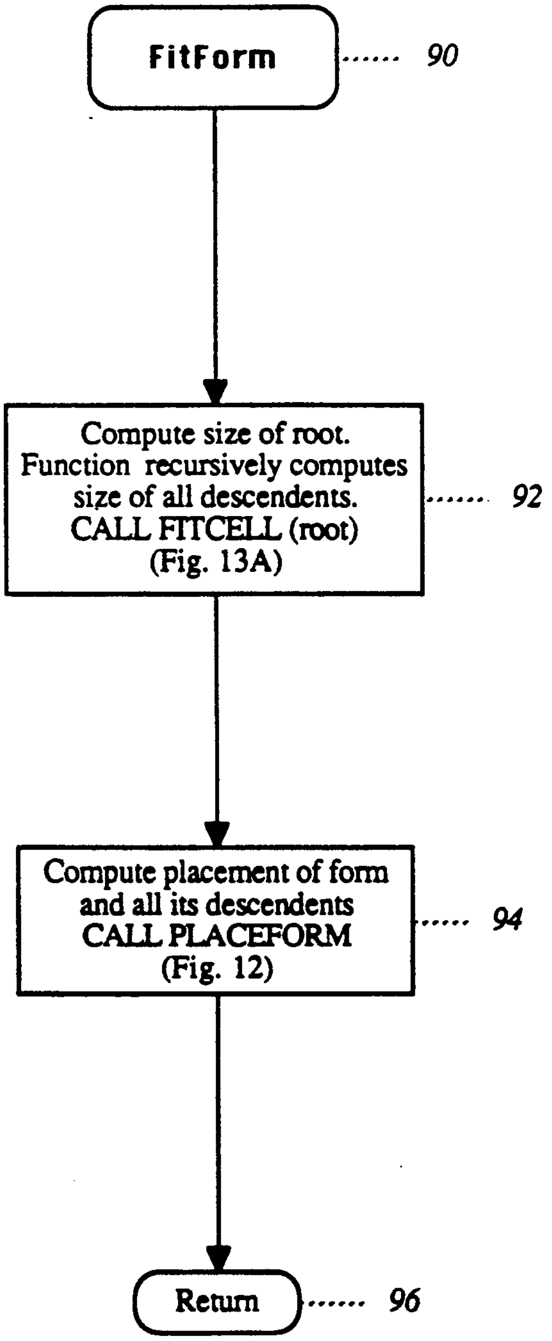
FIG. 10 depicts a flow block diagram of the FITFORM Routine referenced during the RESIZE/-REFORM Routine (FIG. 9) for determining the size and placement of the root bordered area of the form and all of its descendants.

4) FITFORM Routine (FIG. 10)

Referring now to FIG. 10, a more detailed discussion of the FITFORM Routine is now presented. At block 92 the FITCELL Routine Set (FIGS. 13A–E) is called for computing the size (i.e., width and height) of all of the bordered areas and their descendants (children) within a form which is modified. Widths are computed first and then heights according to the operation of the FITCELL Routine Set. The FITFORM Routine (FIG. 9) passes the width of the form to be sized, typically window display width of the largest bordered area of the forms called the root bordered area. It should be carefully noted that the FITCELL Routine Set (FIG. 13A-E) is a "recursive" return which sizes, the entire tree (all descendants of the currently processed bordered area). During block 94 the PLACEFORM Routine (FIG. 12) is called for computing the placement or location of the generic form and all of its descendant bordered areas on the bit map of the CRT. During block 96 processing returns to the RESIZE/REFORM Routine (FIG. 9) at Block 86.

Figure 11:
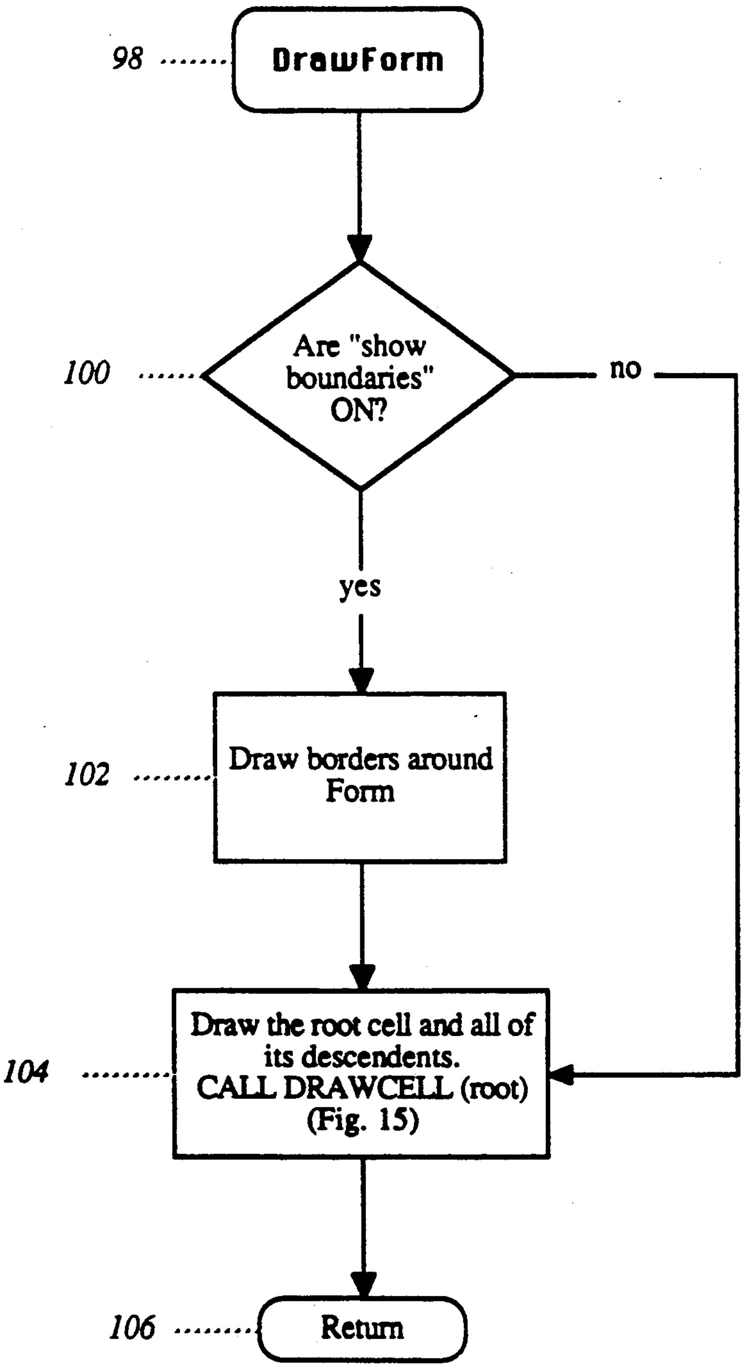
FIG. 11 is a flow block diagram of the DRAWFORM Routine referenced during the RESIZE/-REFORM Routine (FIG. 9) for displaying the resized form and all of its descendant bordered areas on display screen 5 (FIG. 1)

5) DRAWFORM Routine (FIG. 11)

Referring to FIG. 11, a flow chart depicting the DRAWFORM Routine is shown. The purpose of the DRAWFORM Routine is for displaying the resized form and all of its descendant bordered areas on display screen 5 according to the placement determined by the PLACEFORM Routine (FIG. 10). At block 100 a determination is made on whether the border of the form (root bordered area) are visible or invisible (not shown as to the display). If the borders of the form are invisible, processing continues at block 104 during which the routine DRAWCELL (FIGS. 18A) is called. The DRAWCELL Routine displays the boundaries and contents for each of bordered areas of the form. If the border of the form is determined to be visible then processing continues at block 102 during which the border surrounding the form is drawn. Then during block 104 the DRAWCELL Routine (FIG. 15A-E) is called for displaying the borders and contents of each of the bordered areas of the form. Then during block 106 processing returns to the RESIZE/REFORM Routine (FIG. 9) at block 88.

Figure 12:
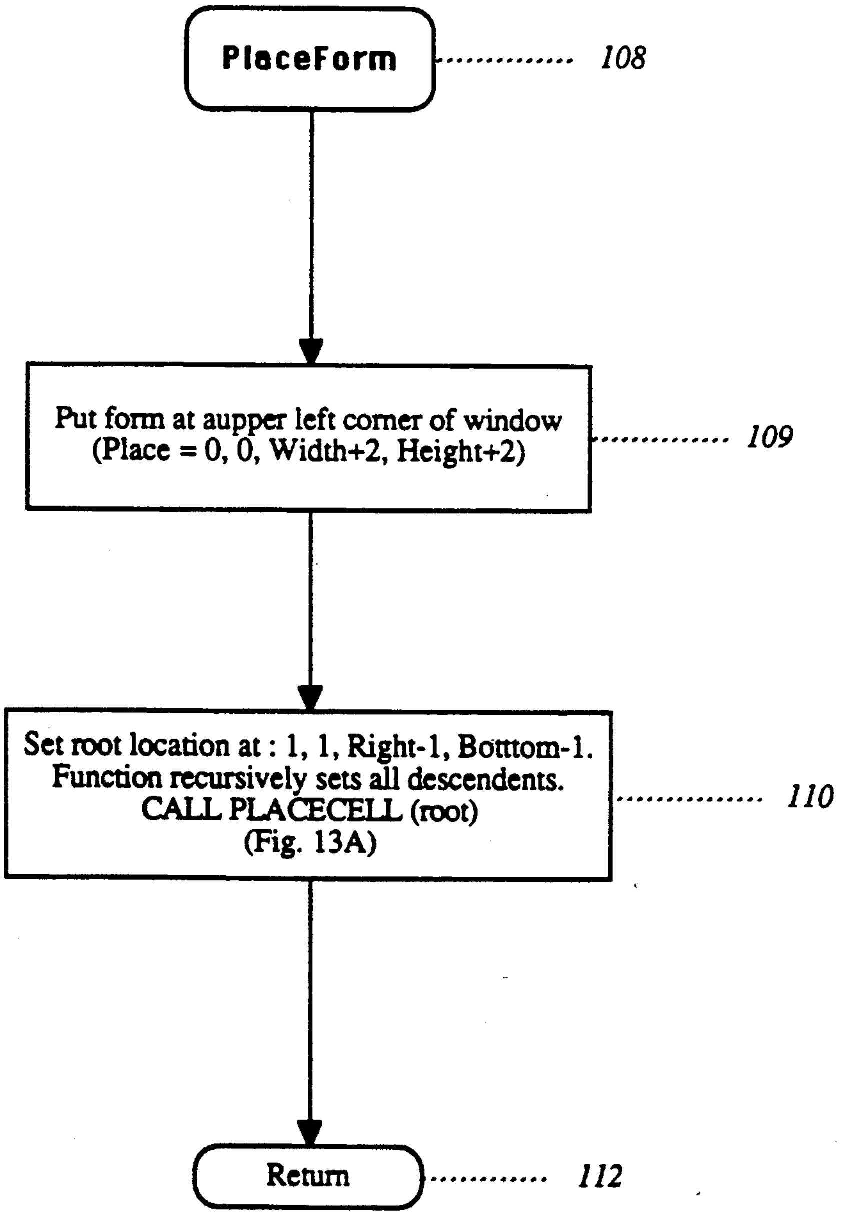
FIG. 12 is a flow block diagram of the PLACEFORM Routine referenced during the FITFORM Routine (FIG. 10) for determining the location or placement of the root bordered area of a form and all of its descendants.

6) PLACEFORM Routine (FIG. 12)

FIG. 12 is a flow diagram of the PLACE FORM Routine which determines the location or placement of the border surrounding the form (root bordered area). The root bordered area is typically the largest bordered area of a form and it has initial coordinate values of 0, 0 at the upper left corner of the display window. At block 110, the PLACECELL Routine Set (FIGS. 16A-F) is called for locating all of the descendant bordered area contained within the root bordered areas. Then during block 112 processing returns to the FITFORM Routine (FIG. 10) at block 96.

7) FITCELL Routine Set (FIGS. 13A-F)

FIGS. 13A, 13B, 13C, 13D and 13E are flow diagrams which depict the FITCELL Routine Set. The following discussion provides a summary of the operation and philosophy of the FITCELL Routine Set. For a detailed example of how the FITCELL Routine operates refer to Section 8). The purpose of the FITCELL Routine Set, as stated above, is for computing the size (i.e., width and height) of each bordered area of a form. The FITCELL Routine Set is the most important set of routines of the preferred embodiment because it determines the space requirements for each bordered area relative to one another in order to accommodate for changes in the form. The width of the root bordered area, which is typically constrained in the horizontal direction by the available horizontal window on the display screen, is initially passed to the FITCELL Routine Set (FIGS. 13A-13E) from the FITFORM Routine (FIG. 10). If the next level of child bordered areas within the root bordered area do not contain text, then the FITCELL Routine determines whether these children bordered areas are arranged horizontally or vertically. The actual determination of the height for the root border area will depend on the orientation of children bordered areas. However, regardless of the orientation of the children, the width of the first child bordered area within the root bordered area will be determined. Then the FITCELL Routine (FIG. 13A) calls itself "recursively", with the pointer to the first child and computes the width, determining the widths of the descendant bordered areas on the way down the structure to the bottom nodes.

When a bottom node (i.e., a bordered area containing text) is encountered, the height of the bordered area containing text is determined as a function of the number of lines of text and the height of each text line. Once the height of the bottom node bordered area is calculated, it is stored along with the width previously calculated in an associated record for the bordered area. The size for each of its siblings and their descendants, if any, associated with the bordered area are similarly computed and stored. When all of the children of a particular parent bordered area have been sized, the height of that parent bordered area can be computed. Both the height and width of the parent bordered area are then stored in a record associated with the parent bordered area. This recursive process continues down, back and across etc., until all bordered areas of the root or descendant bordered area have been computed. The last step is computing the height of the original root or descendant bordered area.

The height of a parent bordered area containing children is determined differently for children vertically arranged than for children horizontally arranged. For bordered areas containing vertically arranged children, the height of each child is accumulated, and the space between the children, and margins (interior blank space of the bordered area), and border are added as well. If the children are arranged horizontally, then the child having the maximum height (plus the margin and border) is determined to be the height of the parent. In this way, the parent bordered area is guaranteed to be able to fit around the children. The maximum height is also used for alignment purposes by the PLACECELL Routine to be discussed.

In the preferred embodiment, the width of a child which is vertically arranged with respect to its siblings is determined to be equal to the width of its parent less the boundary. On the other hand, the width of horizontally arranged children are determined by reapportioning (increasing or decreasing) the width of each child in the same proportion as its parent's bordered area's total width increased or decreased.

Figure 13A:
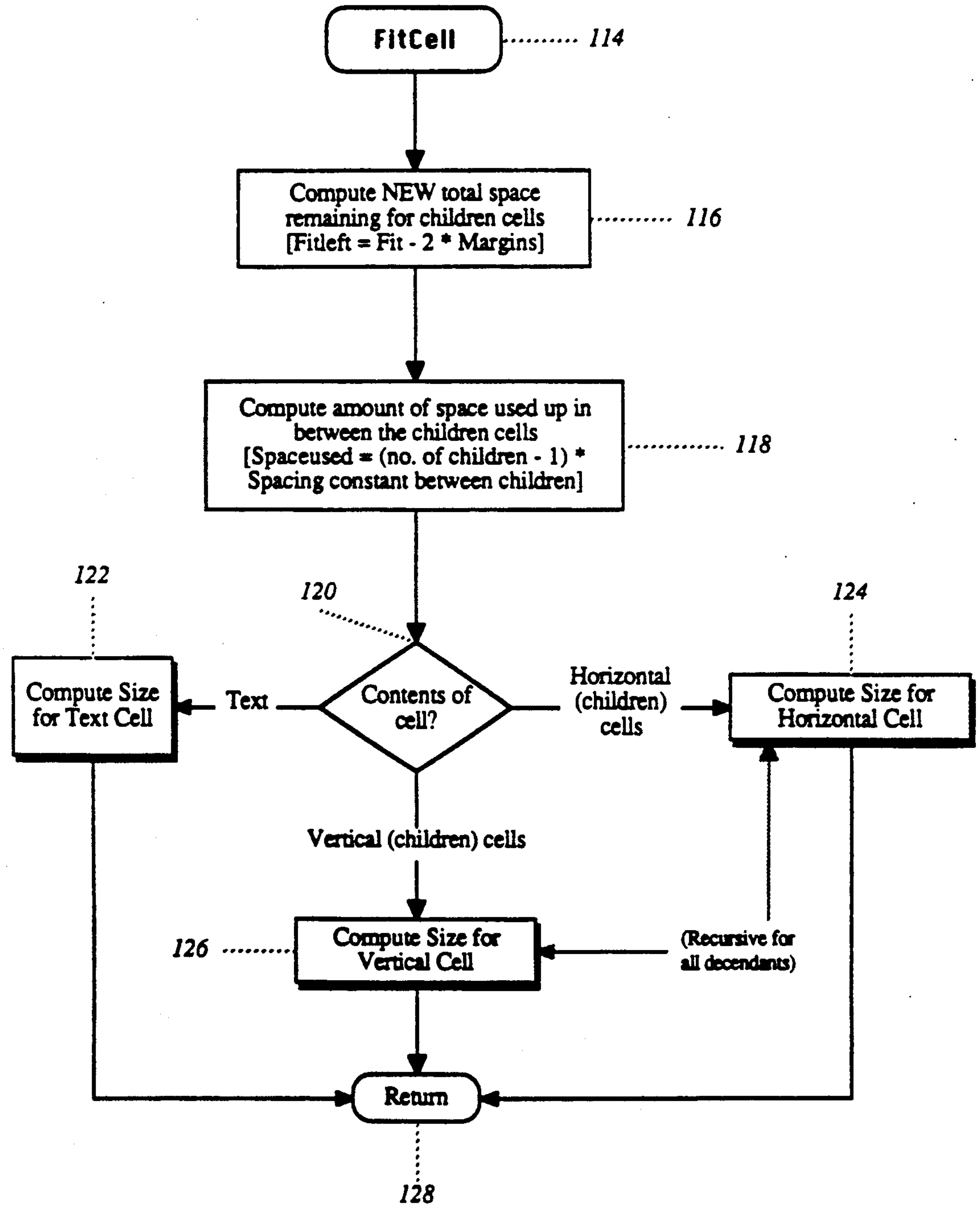
FIG. 13A is a flow block diagram of the FITCELL Routine referenced during the FITFORM Routine (FIG. 10) for resizing a bordered area of a form.

In sum, the width of each bordered area in any branch of the tree representation of the form is computed when the child bordered area is encountered on the way down the branch (i.e , before the bottom nodes of the branch are reached). The height of each bordered area, however, is computed on the way back up the branch (i.e., after the bottom nodes of the branch have been reached). Both height and width are stored in the record associated with the bordered area) when the height is computed.

a) FITCELL Routine (FIG. 13A)

Referring to FIGS. 13A, 13B, 13C, 13D, and 13E, a detailed discussion of the FITCELL Routine is now presented. Specifically FIG. 13A depicts the top level routine for processing the FITCELL Routine. Initially, a pointer to the root bordered area is passed to the FITCELL Routine (FIG. 13A). At block 116 (FIG. 13A) the total space remaining for the children in this root bordered area (or currently processed bordered area) is determined by subtracting two boundaries (i.e. 2× (border+margins)) (top and bottom boundaries for vertically arranged bordered areas or left and right boundaries for horizontally arranged bordered areas) inside the currently processed bordered area from the total width. Then during block 118 the total space between the children is determined by calculating the number of children less one, multiplied by a space constant between the children. As an example, the space constant is defined to be one-pixel wide. Then, during block 120 a determination is made on whether the contents of the bordered area include text or a plurality of child bordered areas. Assuming that the bordered area contains text, then during block 122 the routine COMPUTE SIZE OF TEXT CELL (FIG. 13B) is called. The size of the child containing text is determined by the COMPUTE SIZE OF TEXT CELL ROUTINE (FIG. 13B), and processing returns at block 128 to the FITFORM Routine (FIG. 10) at block 94 or processing returns to the location of the last recursive call to the FITCELL Routine (FIG. 13A) at either block 150 of the COMPUTE SIZE FOR VERTICAL CELL Routine (FIG. 13C) or at block 190 of the REAPPORTION CHILDREN'S WIDTH Routine (FIG. 13C).

Returning to block 120, if the determination of the contents of the bordered area results in a plurality of smaller included border areas, then a further determination is made as to whether the children are arranged horizontally or vertically. If the children are arranged vertically, then processing continues at block 126. During block 126, the routine COMPUTE SIZE OF VERTICAL CELL (FIG. 13C) is called. The COMPUTE SIZE OF VERTICAL CELL (FIG. 13C) determines the height of the currently processed bordered area and processing continues at block 128 and returns to the FITFORM Routine (FIG. 10) at block 94, or processing returns to the location of the last recursive call to the FITCELL Routine (FIG. 13A) at either block 150 of the COMPUTE SIZE FOR VERTICAL CELL Routine (FIG. 13C) or at block 190 of the REAPPORTION CHILDREN'S WIDTH Routine (FIG. 13E). Returning to block 120 (FIG. 13A), if the included children are determined to be horizontally arranged, then during block 124 the COMPUTE SIZE FOR HORIZONTAL CELL (FIG. 13D) is called. When the size of the bordered area is determined, processing returns at block 128 to the FITFORM Routine (FIG. 10) at block 94 or processing returns to the location of the recursive call to the FITCELL Routine (FIG. 13A) at either block 150 of the COMPUTE SIZE FOR VERTICAL CELL Routine (FIG. 13C) or at block 190 of the REAPPORTION CHILDREN'S WIDTH Routine (FIG. 13E).

b) COMPUTE SIZE FOR TEXT CELL (FIG. 13B) Routine

Figure 13B:
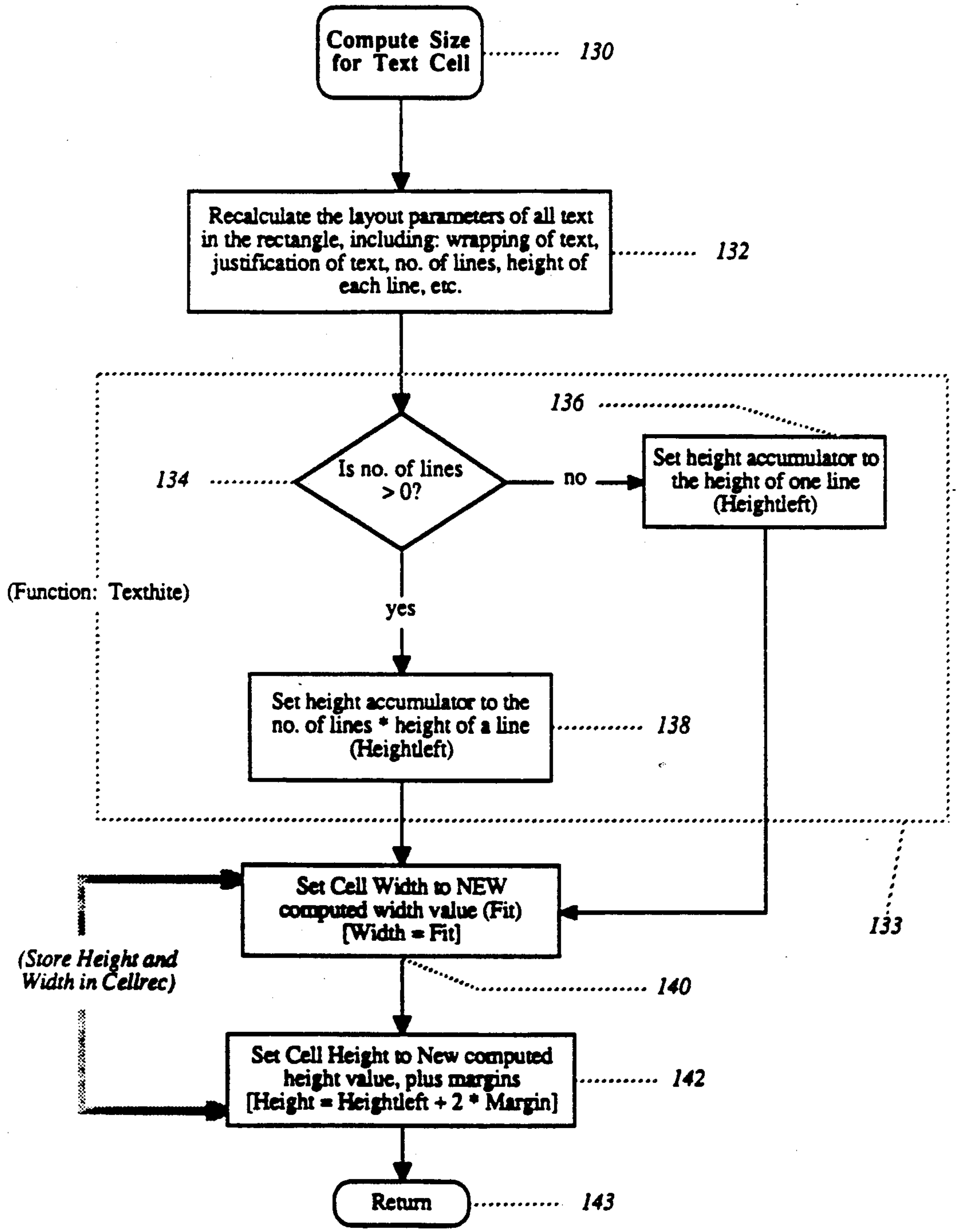
FIG. 13B is a flow block diagram of the COMPUTE SIZE FOR TEXT CELL Routine referenced during the FITCELL Routine (FIG. 13A) for calculating the size of a bordered area containing text.

Referring to FIG. 13B, the COMPUTE SIZE FOR TEXT CELL Routine is depicted. At block 132 a routine is called for calculating the layout parameters for the text. Such parameters include the location for wrapping of text, justification of text, the number of lines, and the height of each line, etc. An example of the wrapping of text is shown in connection with FIGS. 6A and 6B. "Wrapping" is considered to be a word processing capability typically provided with the operating system of standard computers or it could be specially designed by those skilled in the art. Recall that when the horizontal length of a text line decreased, the text was forced to wrap onto the next text line. The wrapping routine is designed such that the routine knows the beginning and end of each word of the text and the length of the text line. In the example shown, wrapping did not occur to split words in half; however, it could be designed such that hyphens could be added at the wrapping point. After the text parameters have been determined processing continues to the blocks at 133 ("TEXHITE" function) to determine the height of the text cell. During block 134 a determination is made on whether there are any lines of characters within the bordered area containing text. If there are no text lines in the bordered area, then processing continues at block 136 during which a height accumulator is set equal to the height of one line as a default. This procedure guarantees that the height of the empty bordered area will be at least one line tall.

Assuming that there are lines of text within the bordered area, processing continues at block 138, during which the height accumulator is set equal to the number of lines times the height of each line of text. In the preferred embodiment each line of text has the same constant height, however, in an alternate embodiment of the invention each line of text has a variable height and the heights are accumulated to determine the total height. Regardless of whether there is text or no text within a cell, processing continues at block 140. During block 140 the width of the bordered area is stored in the record associated with the bordered area, and then during block 142 the height of the bordered area is also stored in the record associated with the bordered area. In the preferred embodiment the included margins of the bordered area are also added to the computed height Processing continues at block 143 during which processing returns to the FITCELL Routine (FIG. 13A) at block 128.

c) COMPUTE SIZE FOR VERTICAL CELL Routine (FIG. 13C)

FIG. 13C depicts a flow diagram of the COMPUTE SIZE FOR VERTICAL CELL Routine The purpose of this routine is for determining the total height of a bordered area which contains vertically arranged children. Specifically, at block 146 a height accumulator is set equal to the space used between the children cells. Then during block 148 a pointer is set to the first child bordered area of the parent cell. Recall that the record associated with the parent bordered area contains a pointer of the ordinal positions of the children included within the parent bordered area. Then during block 150 a recursive call is made to the FITCELL Routine (FIG. 13A). The purpose of this recursive call is to determine the size of the first child bordered area. In the preferred embodiment a stack arrangement is maintained for temporarily storing a pointer to the currently processed bordered area for which the size is being determined. In addition, a pointer to the last call, before the FITCELL Routine is performed is stored on a LIFO (Last In First Out) stack.

Assuming that the size of the child bordered area (and all of its descendants, if any) has been determined by the FITCELL Routine called, processing continues at block 152. When processing returns to block 152, from the recursive call, the pointer to the currently processed bordered area is "popped off" the stack During block 152, the child's height calculated in block 150 is added to the height accumulator for the vertical bordered area. Then during block 154 the pointer is moved to the next ordinal position within the parent bordered area.

Figure 13D:
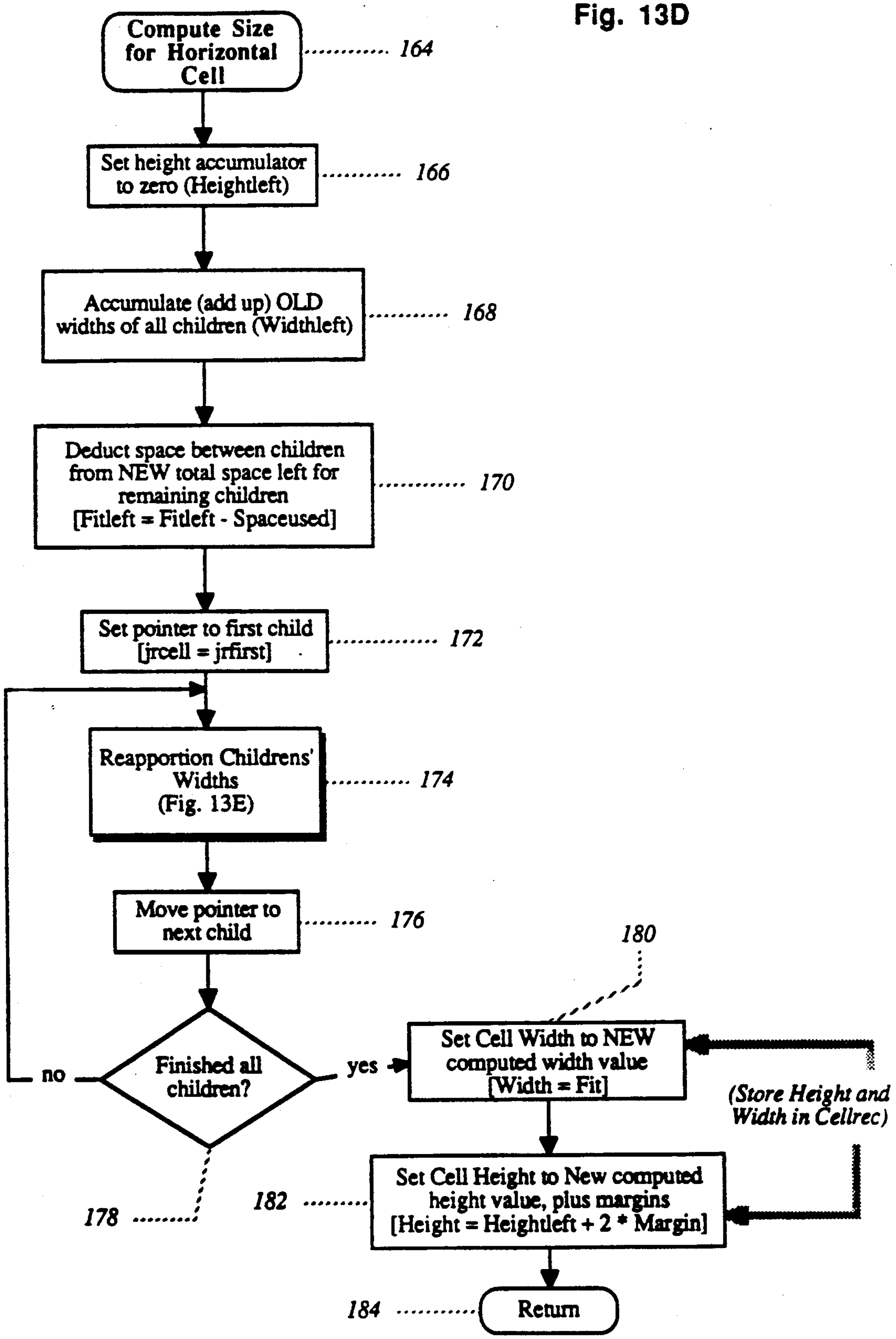
FIG. 13D is a flow block diagram of the COMPUTE SIZE FOR HORIZONTAL CELL Routine referenced during the FITCELL Routine (FIG. 13A) for determining the size of a bordered area which contains horizontally arranged descendants.
Figure 13E:
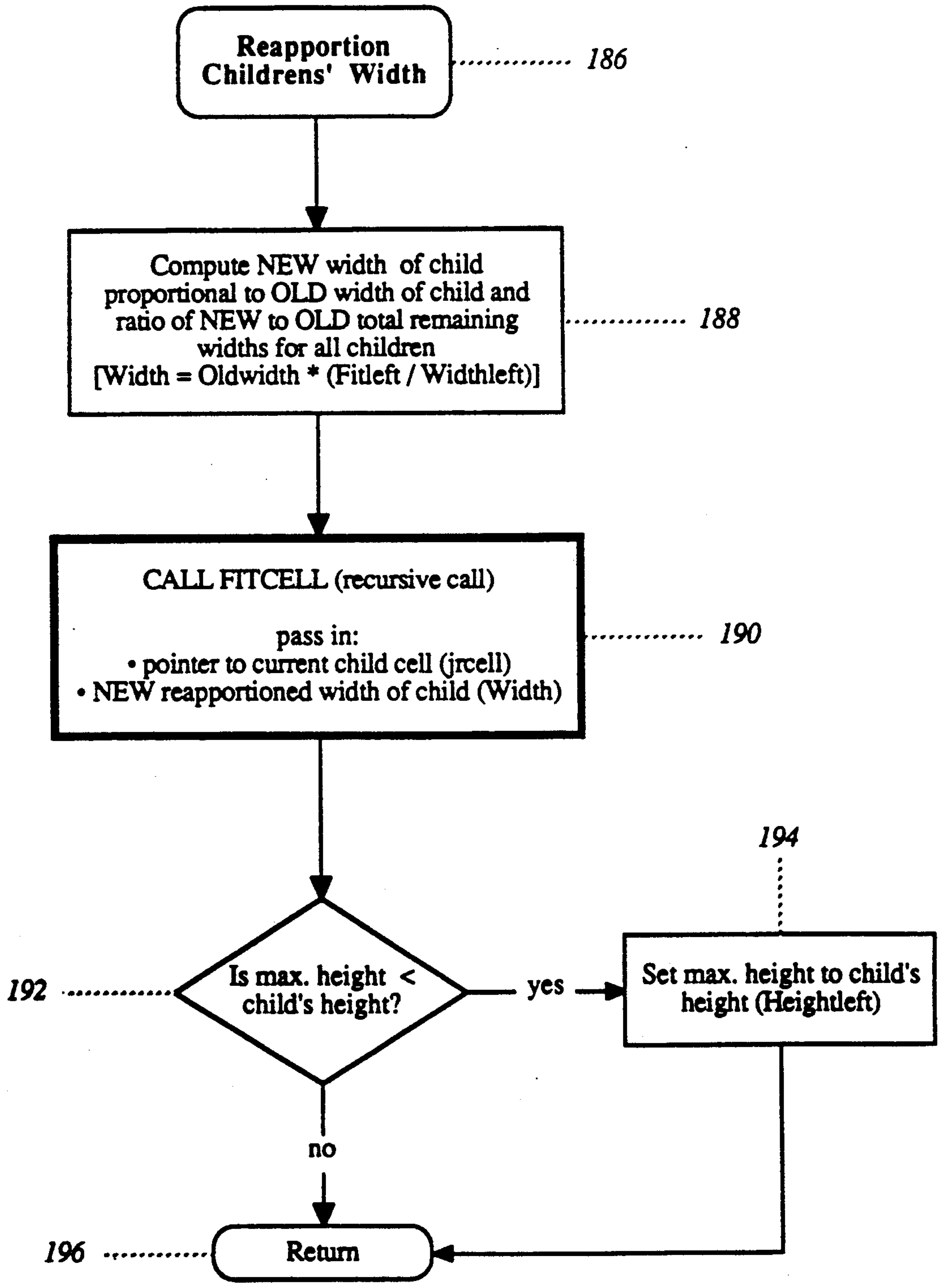
FIG. 13C is a flow block diagram of the COMPUTE SIZE FOR VERTICAL CELL Routine referenced during the FITCELL Routine (FIG. 13A) for determining the size of a bordered area which contains vertically arranged descendants.

During block 156, a determination is made as to whether all of the children of the parent bordered area have had their size determined. Assuming that not all of the children have had their size determined, processing continues during blocks 150, 152, 154 and 156 until the size for each of the children are determined. Assuming that the size of all the children have been determined, processing continues at block 158. During block 158 the width of the parent bordered area is stored in its associated record, and then during block 160 the newly calculated height of the parent bordered area is also stored in the associated record. In the preferred embodiment the margins included within the parent bordered area are added to the accumulated children's height and spacing between the children. Process returns during block 162 to the FITCELL Routine (FIG. 13A) at block 128.

d) COMPUTE SIZE FOR HORIZONTAL CELL Routine (FIG. 13D)

FIG. 13D depicts the COMPUTE SIZE FOR HORIZONTAL CELL Routine. The purpose of this routine is for determining the size of a parent bordered area which includes children arranged horizontally. Specifically, during block 166 the maximum height is set equal to zero. Then during block 168 the old widths for each of the children (before they have been resized) are accumulated and the accumulated (total) old width is stored. Then during block 170 the space between the children (calculated in FIG. 13A at block 118) is deducted from the total new space left for the children. Then, during block 172 a pointer is set equal to the first child bordered area within the parent bordered area and during block 174 the routine REAPPORTION CHILDREN'S WIDTHS (FIG. 13E) is called. The purpose of this routine is for apportioning the total new width among each of the individual children. Additionally, the routine REAPPORTION CHILDREN'S WIDTHS determines the size of all descendants of the currently processed child, and also determines which child has the greatest height.

Processing continues to block 176, during which the pointer is moved to the next child bordered area, and then during block 178 a determination is made as to whether there are any other children within the parent bordered area to be reapportioned. Assuming that there are still more children to reapportion, processing continues at blocks 174, 176 and 178 until all of the children have been reapportioned. Assuming that all of the children are reapportioned.

Processing continues at blocks 180 and 182. During block 180 the width of the parent bordered area is stored in the record corresponding to that bordered area, and in block 182, the height for the parent is also stored in the record for that bordered area. The height of the bordered area is calculated during the REAPPORTION CHILDREN'S WIDTH Routine (FIG. 13E) to be discussed. In the preferred embodiment, the height is also adjusted to include the margins within the parent bordered area. Processing returns during block 184 to the FITCELL Routine (FIG. 13A) at block 128.

e) REAPPORTIONED CHILDREN WIDTH Routine (FIG. 13E)

FIG. 13E depicts a flow chart for the REAPPORTIONED CHILDREN WIDTH Routine. As stated above, the purpose of this routine is for apportioning the total width available to all of the children (parent width less margins) among each of the individual children bordered areas. During block 188 the new width of the currently pointed to child bordered area is determined by multiplying the old width of the child bordered area by the ratio of the new total width of the parent bordered area, (as previously calculated at block 170 (FIG. 13D)), to the old total width of the parent bordered area (as previously calculated at block 168 (FIG. 13D). Then during block 190 the FITCELL Routine (FIG. 13A) is called to calculate size of all descendant children, and the height of the currently processed child bordered area. Then the call returns to the currently processed bordered area along with the location of the last instruction and this information is "popped off" the stack. Processing continues at block 192, during which a determination is made as to whether the currently processed child contains a larger height then all of the previous children within the parent bordered area which were processed at this time. Assuming that the currently processed child has a larger height, processing continues at block 194 during which the child's height (maximum height) is stored in place of previously determined maximum height. Processing continues to block 196, during which processing returns to the COMPUTE SIZE OF HORIZONTAL CELL Routine (FIG. 13D) at block 176. Returning to block 192 of the REAPPORTION CHILDRENS WIDTH Routine, if the new processed child does not have a larger height than the previous maximum, processing continues to block 196, during which processing returns to the COMPUTE SIZE FOR HORIZONTAL CELL Routine (FIG. 13D) at block 176.

8) Detailed Example of the FITCELL Routine Set (FIGS. 13A–E)

Figure 14A:
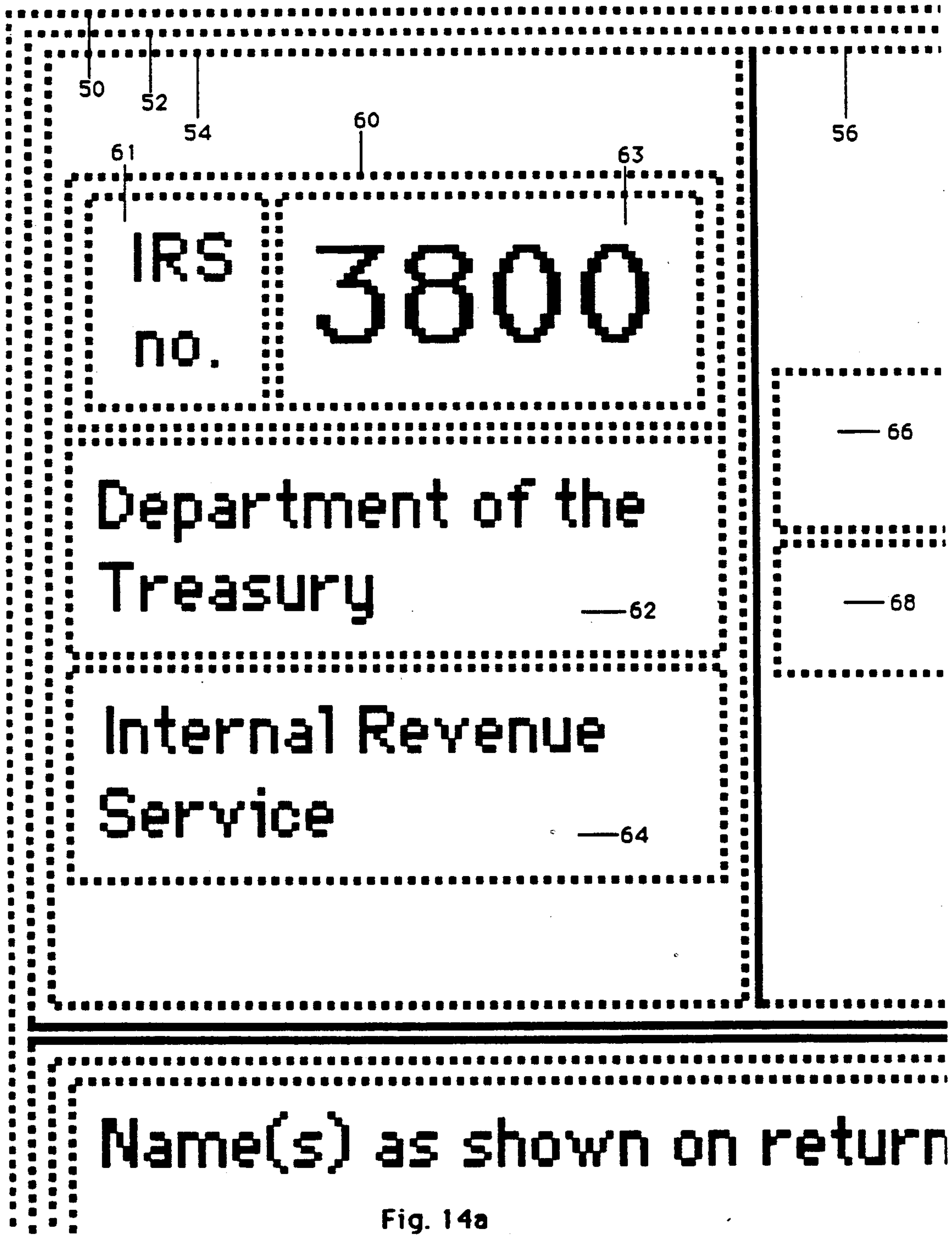
FIG. 14A depicts a "blown-up" version of the upper lefthand corner of the form shown in FIG. 8A.

Referring to FIGS. 13A, 13B, 13C, 13D, 13E, 14A, 14B, 15A, 15B, and 15C a detailed example of the FITCELL Routine operation is now disclosed. FIG. 14A depicts a "blown-up" version of the upper left hand corner of the form shown in FIG. 8A. The form of FIG. 8A is "blown up" in order to emphasize the picture elements shown in dotted lines which are representative of the borders of the bordered areas. Additionally, for purposes of this example, it is assumed that the form (FIG. 14A) has just increased slightly. Many of the included bordered areas have increased in size. This example will demonstrate the procedure for determining the sizes of the bordered areas according to the present invention.

FIG. 14B is a tabular representation of the form (FIG. 14A) along with old and new widths for each bordered area and the contents of each bordered area. All information is represented in units of picture elements or pixels. Boundaries for each bordered area contain a one pixel border plus a two pixel margin. The margin consists of a white space interior immediately adjacent to the border of each bordered area. FIGS. 15A, 15B and 15C depict a results table for tabulating the contents of the stack and the currently processed bordered area. Each row of the table represents a change in the currently processed bordered area and/or the contents of the stack. For this example, only, the size determinations for the bordered areas within bordered area 52 will be calculated. It is assumed the sizing for the rest of form 50 will be performed in the same fashion as discussed for bordered area 52

Before discussing the detailed example of the FITCELL Routine, the following paragraph is a summary describing the overall operation for calculating the size of each bordered area within the top portion of the form depicted in FIG. 14A is now discussed. Processing begins with determining the new width of the root bordered area 50 by the FITFORM Routine (FIG. 10). The width of bordered area 52 is then determined by the COMPUTE SIZE FOR VERTICAL CELL Routine (FIG. 13C). Then the width of bordered area 54 is determined by the COMPUTE SIZE FOR HORIZONTAL CELL Routine (FIG. 13D). Processing continues down the hierarchical tree structure shown in FIG. 8B to bordered area 60, whose width is determined by the COMPUTE SIZE FOR VERTICAL CELL Routine (FIG. 13C). Processing continues to the next level down the tree where the width of bordered area 61 is determined by the COMPUTE SIZE FOR HORIZONTAL CELL Routine (FIG. 13D) and then the height of bordered area 61 is determined and stored by the COMPUTE SIZE FOR TEXT CELL Routine (FIG. 13B). Processing continues for bordered area 63, for which the COMPUTE SIZE FOR HORIZONTAL CELL Routine (FIG. 13C) determines the width, and the height of bordered area 63 is determined by the COMPUTE SIZE FOR TEXT CELL Routine (FIG. 13B). Processing returns back to bordered area 60, for which the height is determined and stored by the COMPUTE SIZE FOR HORIZONTAL CELL Routine (FIG. 13D). The maximum heights among the bordered areas 61 and 63 is assigned as the height of the bordered area 60. The width of bordered area 62 is then determined by the COMPUTE SIZE FOR HORIZONTAL CELL Routine (FIG. 13D) and the height of bordered area 62 is determined by the COMPUTE SIZE FOR TEXT CELL Routine (FIG. 13B). Likewise, the width of bordered area 64 is determined by the COMPUTE SIZE FOR HORIZONTAL CELL Routine and the height for bordered area 64 is determined by the COMPUTE SIZE FOR TEXT CELL Routine (FIG. 13B). The height of bordered area 54 is determined by the COMPUTE SIZE FOR VERTICAL CELL Routine (FIG. 13C) which accumulates the heights for bordered areas 60, 62 and 64. Assuming the widths and heights of bordered areas 56 and 58 have been determined, the height of bordered area 52 is determined by the COMPUTE SIZE FOR HORIZONTAL CELL Routine (FIG. 13D) which determines which bordered area 54, 56 or 58 has the maximum height-bordered area 52 is assigned the maximum height. Lastly, assuming that the bordered areas 51, 52, 53, 55, 57, etc., height and width have been determined, the height of root bordered area 50 is determined by the COMPUTE SIZE FOR VERTICAL CELL Routine (FIG. 13C) which accumulated the heights for all of the bordered areas 51, 52, 53, 55, 57 etc. At this point, the entire format has been resized—-each of the bordered areas within the form have had their widths and heights recalculated The following is a more detailed description of this process.

Referring to the FITFORM Routine (FIG. 10), at block 92, the new width of the root bordered area (i.e., largest bordered area) of the form is determined. The width of the root bordered area is determined to be 520-pixels, the size of the window (199, FIG. 14B). Processing continues to the FITCELL Routine (FIG. 13A) at block 116. At block 116, the total width remaining for the children bordered areas 52, 51, 53, 55, 57, 59, 61, etc., within bordered area 50 is determined to be 514-pixels (200, FIG. 14B). During block 118, the space between each of the children bordered areas 54, 56 and 58 is calculated to be 11-pixels, which is the number of children (12), less one, multiplied by the space constant of 1-pixel. During block 120, it is determined that the contents of the bordered area 50 are arranged vertically Thus, processing continues at block 126. During block 126, the COMPUTE SIZE FOR VERTICAL CELL Routine (FIG. 13C) is called.

During block 146 (FIG. 13C), the height accumulator is set equal to the space between the children (11-pixels) as determined above. During block 148, the pointer is set equal to the first child bordered area of bordered area 50, namely bordered area 52 (220, FIG. 15A). Then during block 150, a recursive call is made to the FITCELL Routine (FIG. 13A). During this recursive call, the pointer to bordered area 52 and a pointer to the location of the recursive call (block 150 (FIG. 13C)) are pushed onto the stack (220, FIG. 15A). At this point, there is only one entry on the stack: (1) bordered area 52 (228, FIG. 15A).

Processing continues at the FITCELL Routine (FIG. 13A) at Block 116, during which the total width remaining for the children bordered areas within parent bordered area 52 is determined to be 508-pixels. Above, the new width for bordered area 52 was determined to be 514-pixels less the boundary on either side of the width which is 6-pixels ($2\times1$ (border)$+2\times2$ (margin)) picture elements (202, FIG. 14A). During block 118, the space between each of the children bordered areas 52, 56 and 58 is calculated to be 2-pixel, which is the number of children, less one, multiplied by the space constant which is 1-pixel. During block 120, it is determined that the contents of the bordered area 52 are arranged horizontally. Thus, processing continues at block 124, during which the COMPUTE SIZE FOR HORIZONTAL CELL Routine (FIG. 13D) is called.

At block 166 (FIG. 13D), the maximum height accumulator is set equal to zero. During block 168, the old widths for each of the children of bordered area 52 are accumulated. Specifically, the old width for bordered area 54 (99-pixels), the old width for bordered area 56 (280-pixel), and the old width for bordered area 58 (99-pixel) are added together A total accumulated old width for the children 54, 56 and 58 is 486-pixels. The old total width is stored in a variable-called WIDTHLEFT. Processing continues at block 170 during which the space between the children is subtracted from the total new width remaining for the children 54, 56 and 50 The space between the children is 2-pixels and thus the remaining total space left is 506-pixels. The total new width is stored in a variable called FITLEFT. During block 172 a pointer is set to the first child within the parent bordered area 52 (222, FIG. 15A). The first child is bordered area 54. Processing continues at block 174 during which the REAPPORTION CHILDRENS' WIDTHS Routine (FIG. 13E) is called.

Processing continues at block 188 (FIG. 13E) during which the new width for child 54 is calculated by the formula Old Width×(FITLEFT/WIDTHLEFT). As determined above, Old Width for bordered area 54 is 99-pixels, FITLEFT is 506-pixels, and WIDTHLEFT is 486-pixels The new width for bordered area 54 is 103-pixels (202, FIG. 14B). Processing continues at block 190 during which a recursive call to the FITCELL Routine (FIG. 13A) is made. The recursive call requires that a pointer directed to bordered area 54 be placed on the stack and a pointer to the recursive call for FITCELL Routine block 190 (FIG. 13C) (224, FIG. 15A).

Referring to FIG. 13A at block 116, the new total space remaining for the children cells within bordered area 54 is calculated by subtracting the boundary from the new width of bordered area 54. The new width of bordered area 54 is 103-pixels and the boundary is six picture elements Thus, the remaining width for the children is 97-pixels (204, FIG. 14B). Processing continues at block 118 during which the space between the children is calculated to be 2-pixels.

During block 120 the contents of bordered area 54 are determined to be vertically arranged; thus processing continues at block 126. During block 126 the COMPUTE SIZE FOR VERTICAL CELL Routine (FIG. 13C) is called. At block 146 (FIG. 13C) the height accumulator is set equal to the space between the children as determined above. During block 148 the pointer is set equal to the first child bordered area of bordered area 54 or bordered area 60 (226, FIG. 15A). Then, during block 150 a recursive call is made to the FITCELL Routine (FIG. 13A). During this recursive call the pointer to the bordered area 60 and a pointer to block 150 (FIG. 13C) are pushed onto the stack (228, FIG. 15A). At this point, there are three entries on the stack: 1) Bordered area 60, 2) Bordered area 54 and 3) Bordered area 52 (202, FIG. 15A).

Processing continues at block 116 (FIG. 13A) during which the total width remaining for the children of bordered area 60 is calculated by subtracting the boundary from the new total width. The new total width of bordered area 60 is 97-pixels and the boundary is 6-pixels, thus the remaining width available is 91-pixels wide. Then, during block 118, the space used up between the children is determined to be 1-pixel wide. The contents of the bordered area 60 are determined to be horizontally arranged during block 120. Processing continues at block 124, during which the routine COMPUTE SIZE FOR HORIZONTAL CELL (FIG. 13D) is called.

Processing continues at block 166 (FIG. 13D) during which the maximum height is set equal to zero. During block 168, the total old width for the children 61 and is determined 63. The old width for child 61 was 21-pixels (210, FIG. 14A) and the old width for child 63 was 49-pixels, thus, total old width is set equal to 70-pixels. Processing continues during block 170 during which the space between the children bordered areas 61 and 62 is subtracted from the total width available. The space used was calculated during block 118 of FIG. 13A to be 1-pixel and, thus, the total width remaining is 90-pixels. During block 172, the pointer is set equal to the child bordered area 61 (230, FIG. 15A). Then during block 174, the REAPPORTIONED CHILDREN'S WIDTHS Routine (FIG. 13E) is called.

During block 188 (FIG. 13E), the new width for bordered area 61 is determined to 27-pixels. Processing continues to block 190, during which a recursive call is made to the FITCELL Routine (FIG. 13A). At this time, the stack now has a fourth pointer placed on it which is the pointer to bordered area 61 and the recursive call location at block 190 (FIG. 13E) (232, FIG. 15A).

Processing continues to block 116 (FIG. 13A) of the FITCELL Routine. During block 116, the total space remaining for the contents of bordered area 61 is determined to be 22-pixels. Processing continues at block 118, however for bordered areas having text the space used calculation is meaningless and the number calculated is never used. During block 122, the contents are determined to be text and the routine COMPUTE SIZE FOR TEXT CELL (FIG. 13B) is called.

Processing continues to block 132 (FIG. 13B) during which layout parameters for the text within the bordered area are calculated. During block 134, it is determined that text does exist within the bordered area 61; "For —". Processing continues at block 138, during which the height of each line multiplied by the number of lines. The height of each line is 13-pixels and the number of lines is 2. The total height for bordered area 61 is calculated to be 26-pixels. Processing continues to block 140, during which the new width (passed in) 27-pixels for the bordered area 61 is stored in the record associated with bordered area 61. At block 142, the boundary of bordered area 61 is added to the height calculated during block 138. The boundary includes 6-pixels and, thus, the total height is set equal to 32-pixels. The value for the height is stored in the record associated with bordered area 61. During block 143, processing returns to block 128 of the FITCELL routine (FIG. 13A). Recall that the FITCELL routine was called during a recursive call, so the last pointer pushed onto the stack must be popped off to determine where processing ended when the recursive call was made (232, FIG. 15A). The last pointer pushed onto the stack was the FITCELL recursive call at block 190 of the REAPPORTIONED CHILDRENS WIDTH routine (FIG. 13E) (234, FIG. 15B). Processing returns to the REAPPORTION CHILDREN WIDTH Routine and continues at block 192, during which a determination is made that the height calculated for bordered area 61 is now the maximum height determined. Thus, processing continues at block 194, during which the maximum height variable is set equal to 32-pixels. Processing continues at block 196, during which processing returns to block 176 of a COMPUTE SIZE FOR HORIZONTAL CELL Routine (FIG. 13D).

During block 176, the pointer is moved to the next child bordered area 63 within the bordered area 60 (236, FIG. 15B). At block 178, it is determined that not all of the children of bordered area 60 have been reapportioned and, thus, processing continues at block 174. During block 174, the REAPPORTIONED CHILDRENS WIDTH routine (FIG. 13E) is called.

During block 188, the new width for bordered area 63 is determined by calculating the old width multiplied by the ratio of the total new to old widths remaining for the children. Recall that the new total width remaining is 90-pixels and the old width remaining 70-pixels. Thus, the old width for bordered area 63 (49-pixels) is multiplied by the ratio of the total new width to the total old width (90/70) for bordered area 63 resulting in 64-pixels (212, FIG. 14B). Processing continues to block 190, during which the FITCELL routine is recursively called. A pointer to bordered area 63 and the location of the FITCELL Routine call at block 190 (FIG. 13E) are pushed onto the stack (238, FIG. 15B). Processing continues at block 116 of the FITCELL routine (FIG. 13A). During block 116, the space remaining for the contents of bordered area 63 is calculated to be 63-pixels less the 6-pixels for the bordered area. Then, during block 118, it is determined that there are no children in bordered areas 63. The contents of the bordered area 63 is determined to be text during block 120. At block 122, the COMPUTE SIZE FOR TEXT CELL routine (FIG. 13B) is called.

Processing continues at block 132 (FIG. 13B), during which the layout parameters for the text in bordered area 63 are determined. Then, during block 134, it is determined that there is one line of text within the bordered area 63. Processing continues at block 138, during which the height of the one line of text, 26-pixels, is multiplied by the number of lines, one. Thus, the height is determined to be 26-pixels. Then, during block 140, the new width of 63-pixels calculated for bordered area 63 is stored in the record associated with bordered area 63. At block 142, the boundary of six picture elements is added to the height determined in block 138 and, thus, the height is 32 picture elements (212, FIG. 14B). Processing returns during block 143 to block 128 of the FITCELL routine (FIG. 13A). The FITCELL routine (FIG. 13A) was called recursively and, thus, the most recent pointer pushed on the stack is popped off (240, FIG. 150). The last pointer on the stack was for the bordered area 63 and the recursive call was made at block 190 of the REAPPORTIONED CHILDRENS WIDTHS routine (FIG. 13E) (238, FIG. 15B).

Processing continues in the REAPPORTION CHILDRENS WIDTHS Routine (FIG. 13E), at block 192. During block 192, the height of bordered area 63 is compared with the maximum height stored to determine whether the height for bordered area 63 is larger than the maximum height. The maximum height 32-pixels is equal to the height of bordered area 63 and thus processing continues at block 196. Processing returns during block 196 to block 176 of the COMPUTE SIZE OF HORIZONTAL CELL Routine (FIG. 13D). During block 176 the pointer is moved to the next child within the bordered area 60. At block 178 it is determined that there are no more children within bordered area 60 to perform processing, and thus processing continues at block 180. During block 180 the new width 97-pixels calculated for bordered area 60 is stored in the record associated with bordered area 60 (206, FIG. 14B). At block 182, 6-pixels are added to the height in order to account for the boundary of the bordered area 60. Thus, the total height for bordered area 60 is 38-pixels. The height for bordered area 60 is stored in the record associated with bordered area 60. Processing returns during block 180 to the FITCELL Routine of block 128. Once again, the FITCELL Routine was called by a recursive call and thus the return is a recursive one. The next pointer left on the stack is popped and this pointer is a pointer to bordered area 60 and the FITCELL Routine call at block 150 in the COMPUTE SIZE FOR VERTICAL CELL Routine (FIG. 13C) (240, FIG. 15B).

Processing returns to the COMPUTE SIZE FOR VERTICAL CELL Routine (FIG. 13C) and continues at block 152 during which the height of bordered area 60 is added to the height accumulator (which was set to space used; i.e. 2-pixels). Then during block 154 the pointer within bordered area 54 is moved to the next child bordered area within bordered area 54. The next child bordered area is bordered area 62 (242, FIG. 15C). During block 156 a determination is made that there are still children bordered areas left for processing and thus processing continues at block 150. During block 150 a recursive call is made to the FITCELL Routine (FIG. 13A). At this time, the pointer to bordered area 62 is placed upon the stack along with a pointer to the location of the recursive call (244, FIG. 15C). Processing continues at block 116 (FIG. 13A) during which the total space remaining for the contents of bordered area 62 is determined by subtracting from the total width of 98-pixels a boundary of 6-pixels. During block 118 it is determined that there are no included children in bordered areas 62. The contents of the bordered area 62 is determined to be text at block 120. Processing continues at block 122 during which the COMPUTE SIZE FOR TEXT CELL Routine (FIG. 13B) is called.

During block 132 (FIG. 13B) the parameters for the text are recalculated and during block 134, it is determined that there is at least one line of text in the bordered area 62. Processing continues at block 138 during which the height of the text is determined to be 26-pixels; each line of text is 13-pixels, and there are two lines of text (206, FIG. 14B). Processing continues at block 140 during which the newly calculated width for bordered area 62 is stored in the record associated with bordered area 62 and at block 142, 6-pixels accounting for the boundary for bordered area 62 are added to the 26-pixels for the height The total height for bordered area 62 is 32-pixels (206, FIG. 14B). Processing returns during block 143 to block 128 of the FITCELL Routine (FIG. 13A). The FITCELL Routine (FIG. 13A) was called during a recursive call and the last pointer on stack indicates that the FITCELL recursive call was at block 150 of FIG. 13C made for bordered area 62 (244, FIG. 15C). This entry is popped off the stack (246, FIG. 15C). Processing continues at block 152 during which the height of bordered area 62 is added to the height accumulator. The height accumulator now has 72-pixels (space used = 2-pixels, bordered area 60 = 38-pixels, and bordered area 62 = 32-pixels). At block 154 the pointer moves to the next vertical child bordered area within bordered area 54 (248, FIG. 15C). During block 156 it is determined that there is still one bordered area left for processing, namely bordered area 64. Processing continues at block 150 during which a recursive call is made to the FITCELL Routine (FIG. 13A). The pointer to the bordered area 64 and the pointer to this recursive call are pushed into the stack (250, FIG. 15C). Processing continues at block 116 during which the remaining width available for the contents of bordered area 64 is determined to be 97-pixels. At block 118 the amount of space used between further included children bordered areas is determined to be zero and at block 120 the contents of bordered area 64 is determined to be text. Processing continues at block 122 during which a call is made to the COMPUTE SIZE FOR TEXT CELL Routine (FIG. 13B).

At block 132 (FIG. 13B) the layout parameters for the text within bordered area 64 are recalculated. At block 134 it is determined that there is at least one line of text and at block 138 the height of the text is determined to be 26-pixels. There are two lines of text, and the height of each line is 13-pixels. At block 140 the new width of 97-pixels is stored in the record for bordered area 64, (208, FIG. 14A). At block 142 the boundary of 6-pixels is added to the height of 26-pixels for a total of 32-pixels (208, FIG. 14A) and stored. Processing returns during block 143 to block 128 of the FITCELL Routine (FIG. 13A). This Routine was called during a recursive call and thus the last pointer on the stack is popped (250, FIG. 15C). The last pointer on the stack points to the FITCELL recursive call at block 150 of the COMPUTE SIZE OF VERTICAL CELL Routine and at bordered area 64 (248, FIG. 15C). Processing continues at block 152 of the COMPUTE SIZE OF VERTICAL CELL Routine (FIG. 13C), during which the height of bordered area 64 is added to the accumulated height. The total accumulated height is 104-pixels (spaced used = 2-pixels, bordered area 60 = 38-pixels, bordered area 62 = 32-pixels and bordered area 64 = 32-pixels). At block 154 the pointer is moved to the next vertical child and at block 156 it is determined that there are no more children within the bordered area 54.

Processing continues at block 154 during which the new width of 103-pixels for bordered area 54 is stored in the record associated with bordered area 54 (202, FIG. 14B). At block 160 the accumulated height which includes the space between the children bordered areas is added to the six pixel boundary within the bordered area. The total height for bordered area 154 is 110-pixels. Processing returns during block 162 to block 128 of the FITCELL Routine (FIG. 13A). The FITCELL Routine was recursively called and thus the next pointer on the stack is popped (252, FIG. 15C). The pointer on the stack is for the bordered area 54 and the last instruction referenced was the recursive call at block 190 during the REAPPORTIONED CHILDRENS' WIDTH Routine (FIG. 13E) (250, FIG. 15C). Processing continues to block 192 during which the maximum height is set equal to 110-pixels for the bordered area 54. At block 196 processing returns to block 176 of the COMPUTE SIZE OF HORIZONTAL CELL Routine (FIG. 13D). During block 176 the pointer moves to the next child bordered area within bordered area 52 (254, FIG. 15C). The next child bordered area is bordered area 56. Essentially, this process continues until the widths and heights of both bordered areas 56 and 58 have been determined. To summarize, the width of bordered area 56 will be calculated to be 300-pixels and the width of bordered area 58 will be 103-pixels. The maximum height for the bordered areas 54, 56 and 58 is 140-pixels calculated for bordered area 58. Thus, the new width of bordered area 52 is 514-pixels and the height is 146-pixels (140-pixels plus the 6-pixel boundary) (200, FIG. 14B).

9) PLACECELL Routine Set (FIGS. 16A–F)

Referring to FIGS. 16A, 16B, 16C, 16D, 16E and 16F, the PLACECELL Routine Set is now discussed. The following is a summary of the theory and the philosophy behind the PLACECELL Routine Set. The purpose of the PLACECELL Routine Set is for determining the location (in X, Y coordinates) of each bordered area of a form being resized and redrawn by the present invention. Recall that the size of the bordered areas were determined during the FITFORM Routine (FIG. 10) and the FITCELL Routine Set (FIG. 13A–E). The PLACEFORM Routine (FIG. 12) points to the root bordered area (largest bordered area of the form) and its boundary locations are determined and passes them to the PLACECELL Routine Set (FIGS. 16A–F). The PLACECELL Routine (FIG. 16A) stores the boundary locations for the root bordered area and then computes the boundary locations for all of the descendants within the root bordered area. This process occurs in a top down approach all the way down the hierarchical tree structure of the form. At each level, a determination is made on whether the contents of the bordered area contain text or children. If the bordered area contains children, a further determination is made as to whether the children are arranged vertically or horizontally.

If the children are arranged horizontally, then the locations for the top and bottom borders of each of the horizontally arranged children are set equal within the parent, at a location just within the parents' boundaries. Top border location for each of the children are set equal to the location of the parent's top borderless the border width and inside margin. The location of the bottom border for each of the children is equal to the location of the parent's bottom border less the width of the border less the margin. The border locations of the horizontally arranged children are purposely aligned with one another, just inside the top and bottom parent borders so that the bordered areas of the children give the appearance of stretching down and up, just inside the bottom and top borders of the parent. Referring to FIG. 8A, note that the top and bottom borders of horizontally arranged children 54, 56 and 58 are aligned with one another to create continuous top and bottom borders.

Note that the vertical length (length in pixels from the top and bottom borders) of the bordered areas 54, 56 and 58 (as shown in FIG. 8A) is different than the heights of these bordered areas. Recall that the height determined for bordered area 54 is 110-pixels (202, FIG. 14B), the height for bordered areas 56 is 44-pixels (214, FIG. 14B) and the height for bordered area 58 is 140-pixels (216, FIG. 14B). To ensure that the top and bottom borders are continuously aligned with one another, the locations of these borders must be chosen so that they can include the sibling bordered area with the greatest height. Bordered area 58 has the greatest height (140-pixels) and thus, the vertical length for the bordered areas 54, 56 and 58 must be at least 140-pixels. This causes empty space to appear in bordered areas 54 and 56 because the heights of their contents are less than 140-pixels vertical length For example, bordered area 54 contains vertically arranged children 60, 62 and 64 which together have an accumulated height of 110-pixels. A total of 30-pixels of extra space is apportioned in a given manner above and below the children (FIG. 8A) based on whether the contents are aligned with the top, bottom or middle of the bordered area.

The determination of the placement of bordered areas arranged vertically starts by determining the alignment of the children within the parent. The children may be aligned to the top, bottom or middle of the parent. The alignment will effect whether the extra free space (if any) within the bordered area is allocated above, below, or in between the bordered areas.

Figure 16A:
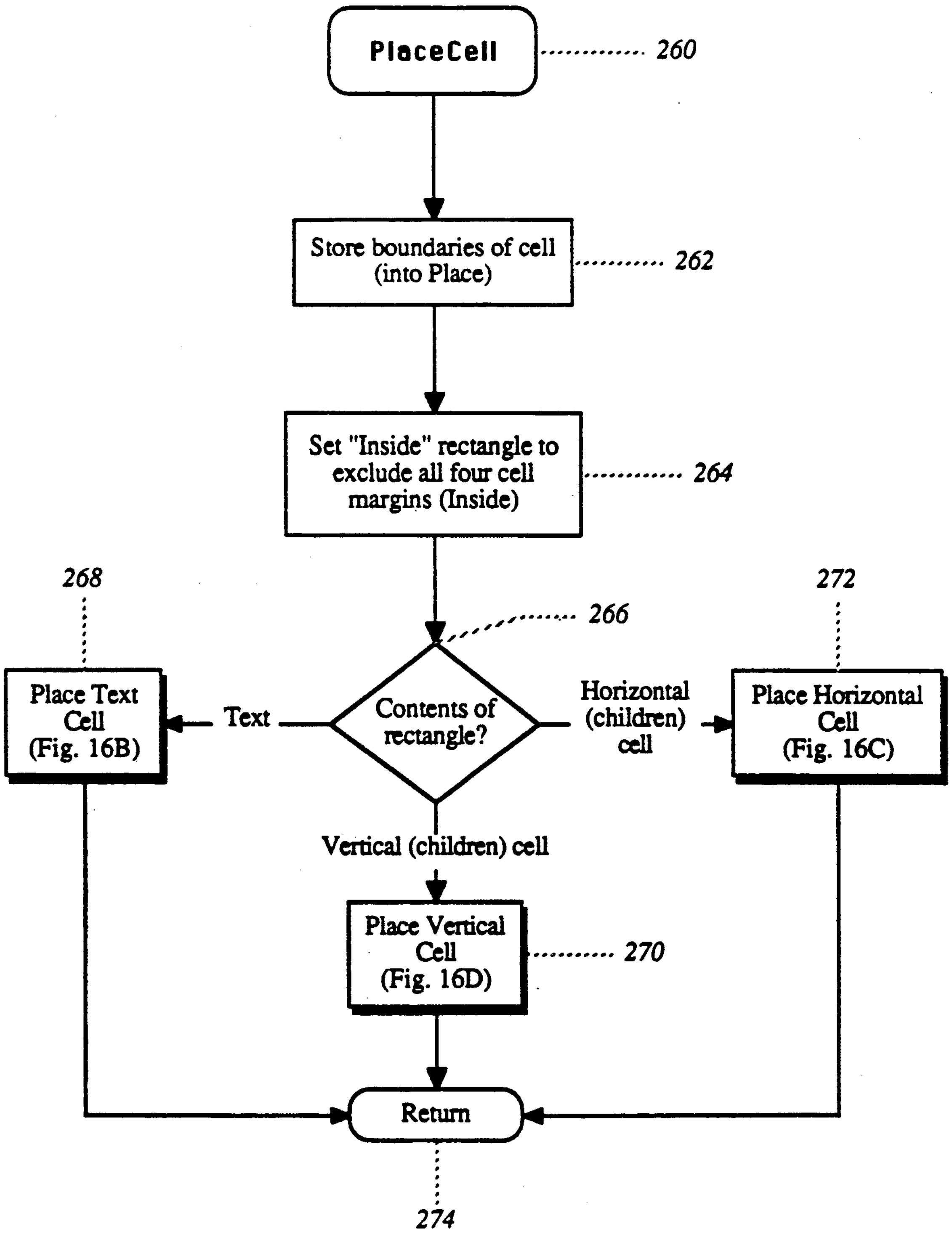
FIG. 16A is a flow block diagram of the PLACECELL Routine referenced by the PLACEFORM Routine (FIG. 12) for calculating the boundary locations for the contents of the bordered area currently processed.

As stated earlier, the boundary locations of the bordered areas of the form are determined in a top down approach At the bottom nodes (boundary areas containing text) the displayable area and text drawing area are computed and stored. The drawing area is a rectangular area in which the text is drawn. The displayable area is a rectangle within which the text is actually visible. The sides of the drawing area determine the beginning and end of each line of text, and its top determines the position of the first line of text. Typically, at the right border of the drawing area, the text wraps around to the next line. In the preferred embodiment, the wrap around only occurs at each word which ensures that no word is every split between lines unless it's too long to fit entirely on one line. The determination of the displayable area and text drawing area are dependent on how the text within the bordered area is aligned to the top, bottom or middle of the bordered area.

a) PLACECELL Routine (FIG. 16A)

Figure 16B:
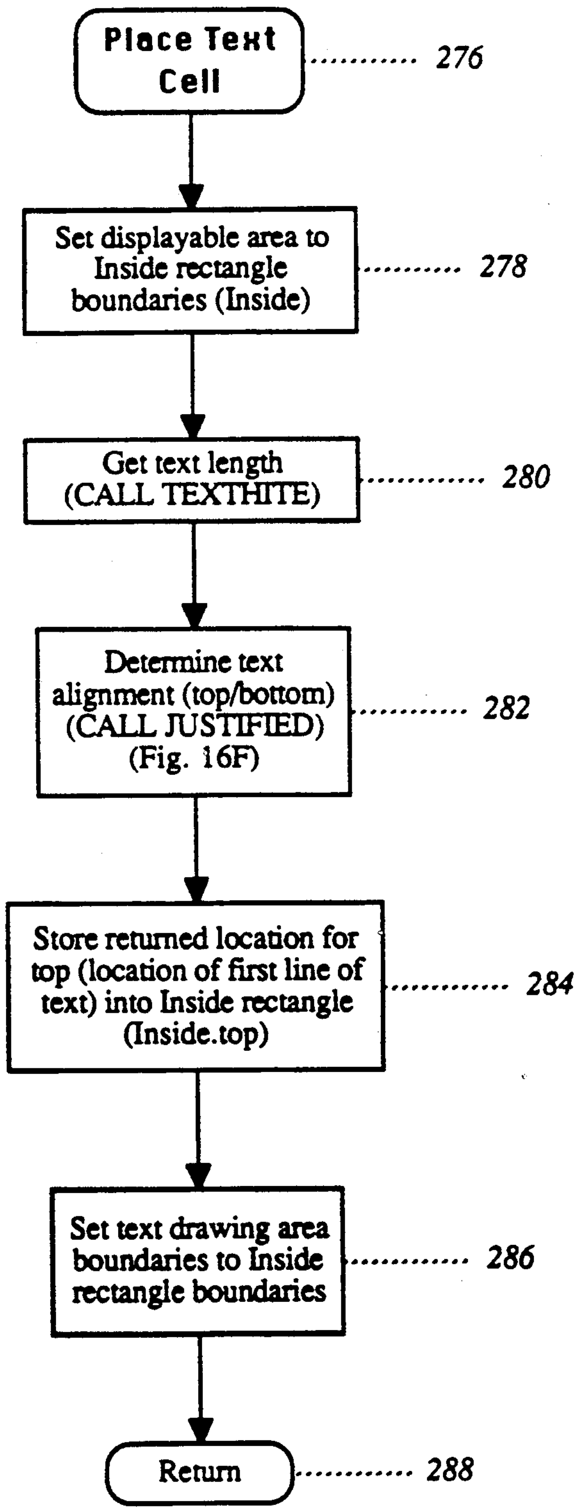
FIG. 16B is a flow block diagram of the PLACE TEXT CELL Routine referenced during the PLACECELL Routine (FIG. 16A) for determining the displayable area and the text drawing area for the text of the currently processed bordered area.

A more detailed discussion of the placement routines (FIGS. 16A, 16B, 16C, 16D, 16E and 16F) is now presented. Referring to FIG. 16A, the flow diagram of the PLACECELL Routine is shown. At block 262, the boundary locations for the bordered area currently being processed are passed in and stored in the record associated with the bordered area. Then, during block 264 the boundaries of the currently processed bordered area are removed and the coordinates for the resulting area are determined. More particularly, the boundary portion of the bordered area, (i.e. the border itself and the empty space margins) which cannot be written into, is stripped from the bordered area, resulting in an "inside rectangle" within which children or text may be written into. Processing continues at block 266 during which the contents of the bordered area are determined. If the contents of the bordered area include text, then processing continues at block 268 during which the PLACE TEXT CELL Routine (FIG. 16B) is called to determine the drawing area and the displayable area for the text as described above. Processing returns during block 274 to the calling routine (i.e. the PLACEFORM Routine or the location of a recursive call to PLACECELL from either block 294 of the PLACE HORIZONTAL CELL Routine (FIG. 16C) or block 310 of the PLACE VERTICAL CELL Routine (FIG. 16D)). However, if the contents of the bordered area include vertically arranged children, then processing continues at block 270, during which the PLACE VERTICAL CELL Routine (FIG. 16D) is called. The PLACE VERTICAL CELL Routine (FIG. 16D) determines the location of each vertical child associated within the vertical parent. Processing continues at block 274 during which processing returns to the calling routine (i.e. PLACEFORM Routine or returns to either block 294 of the PLACE HORIZONTAL CELL Routine (FIG. 16C) or block 310 of the PLACE VERTICAL CELL Routine (FIG. 16D)). Returning to block 266, if the contents of the bordered area include horizontally arranged children, then processing continues at block 272 during which the PLACE HORIZONTAL CELL Routine (FIG. 16C) is called. The PLACE HORIZONTAL CELL Routine (FIG. 16C) uses the "inside rectangle" for the top and bottom boundaries for each of the children, and then determines the left and right boundaries for each of the children associated within the parent. Processing continues at block 274 during which processing returns to the calling program (i.e. PLACEFORM Routine or returns to either block 294 of the PLACE HORIZONTAL CELL Routine (FIG. 16C) or block 310 of the PLACE VERTICAL CELL Routine (FIG. 16D).

b) PLACE TEXT CELL Routine (FIG. 16B)

Figure 16C:
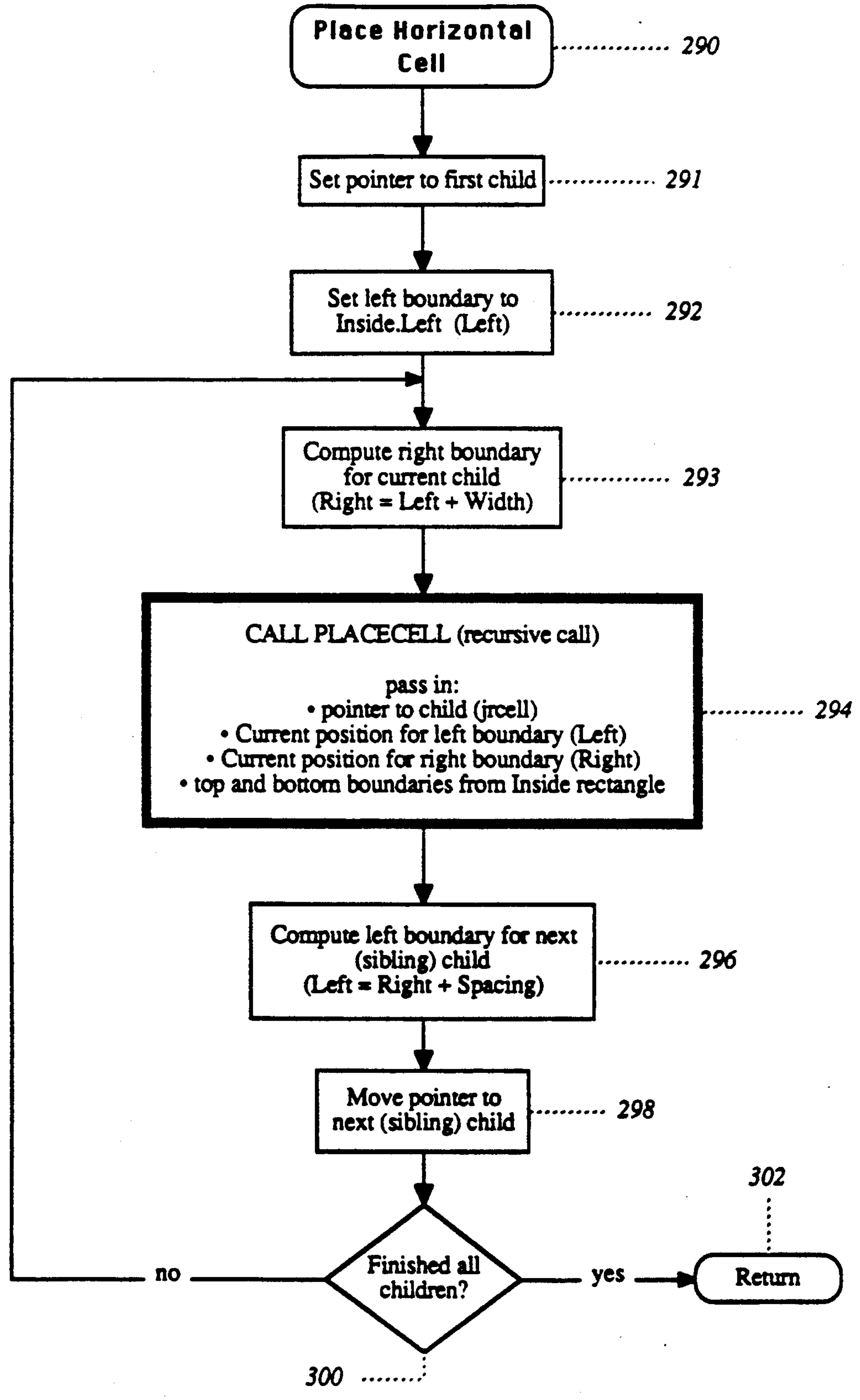
FIG. 16C is a flow block diagram of the PLACE HORIZONTAL CELL Routine referenced during the PLACECELL ROUTINE (FIG. 16A) for determining the left and right boundary locations for each of the horizontally arranged children associated with the currently processed bordered area.
Figure 16D:
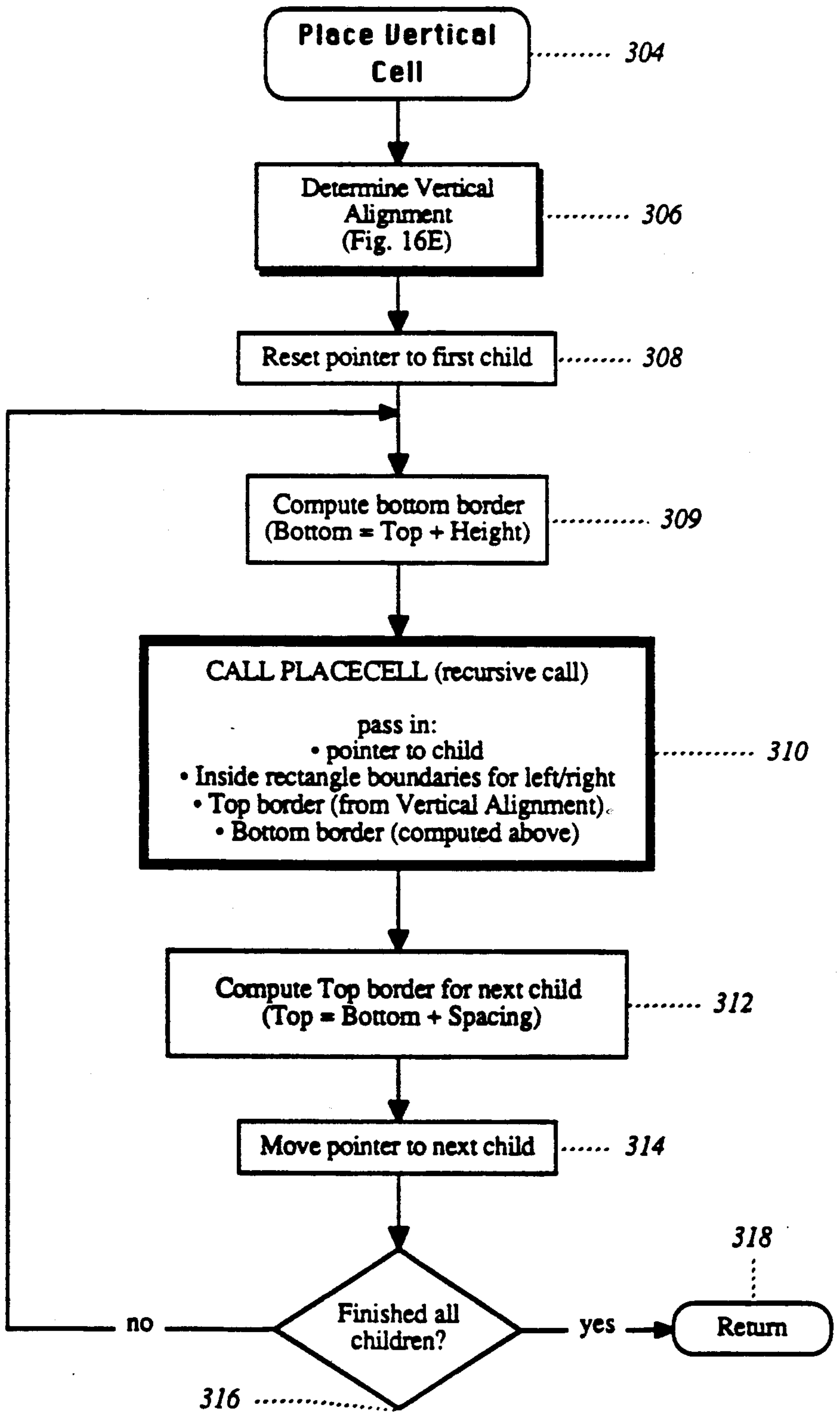
FIG. 16D is a flow block diagram of the PLACE VERTICAL CELL Routine referenced during the PLACECELL ROUTINE (FIG. 16A) for determining the top and bottom locations for each vertically arranged child within the currently processed bordered area.

Referring now to FIG. 16B, a flow diagram of the PLACE TEXT CELL Routine is shown. At block 278 the displayable area is set equal to the inside rectangle determined earlier at block 264 of the PLACECELL Routine (FIG. 16A). Then during block 280, the accumulated height for the text within the bordered area is determined by the TEXTHITE Routine as shown in area 133 of the COMPUTE SIZE FOR TEXT CELL Routine (FIG. 13B). The number of lines is multiplied by a height constant in order to determine the accumulated height of text within the bordered area. Then, during block 282, the JUSTIFIED Routine (FIG. 16F) is called to check whether the text is aligned with the top, middle or bottom of the parent bordered area the JUSTIFIED Routine (FIG. 16F) returns the location of the top-most line of text (i.e. where to start drawing the first line of text in the drawing area). The location of the top-most line of text within the parent bordered area is stored as the new top inside border of the rectangle during block 284. Then, at block 286, the drawing area of the bordered area is determined to be equal to the inside rectangle of the parent bordered area. Processing returns during block 288 to block 274 of the PLACECELL Routine (FIG. 16A).

c) PLACE HORIZONTAL CELL Routine (FIG. 16C)

Referring now to FIG. 16C, a flow diagram of the PLACE HORIZONTAL CELL Routine is shown. As stated above, the PLACE HORIZONTAL CELL Routine (FIG. 16C) determines the locations of the left and right boundaries for each of the horizontally arranged sibling bordered areas within the currently processed bordered area. At block 291, a pointer is set to the first child within the bordered area. At block 292, the left boundary for the first child within the currently processed bordered area is set equal to the left boundary of the inside rectangle. Then, during block 293, the right boundary of the first child is determined by adding the width of the child (determined during FITCELL Routine Set (FIG. 16A–E)) to the location of the left boundary of the bordered area. At block 294, a recursive call is made to the PLACECELL Routine (FIG. 16A) in order to determine the placement of the contents within the first child. The pointer to the first child and recursive call to the PLACECELL Routine (294, FIG. 16C) are placed on a LIFO stack identical to the stack. The recursive call passes to the PLACECELL Routine (FIG. 16A), the locations of the left, right, top, and bottom boundaries for the currently processed child. The left, top and bottom boundaries of the child are set equal to the inside rectangle of the parent which were determined earlier at block 264 of the PLACECELL Routine (FIG. 16A) and the right boundary was calculated during block 293. Assuming that the contents (i.e. all descendant bordered areas and text) of the child have all been placed, processing continues to block 296 during which the left boundary for the next sibling within the currently processed parent is determined. The left boundary of the next child is determined by adding the location of the right boundary (right boundary=left boundary+width) of the previously processed child, plus the spacing constant between the children. Then, during block 298, the pointer is moved to the next child whose left border was just determined. Then, during block 300, a determination as to whether all of the children have been placed is made. Assuming that not all of the children have been placed, processing continues at blocks 293, 294, 296, 298 and 300 until the locations for all of the sibling children and all of their descendants are determined. Assuming that the boundary locations for all of the children and their descendants have been determined, processing continues at block 302. During block 302, processing returns to the PLACECELL Routine (FIG. 16A) at block 274.

d) PLACE VERTICAL CELL Routine (FIG. 16D)

Referring to FIG. 16D, a detailed flow diagram of the PLACE VERTICAL CELL Routine is shown. At block 306, the DETERMINE VERTICAL ALIGNMENT Routine (FIG. 16E) is called to check on whether the top child within the currently processed bordered area is aligned with the top, bottom or middle, of the currently processed bordered area. Assuming that the child is aligned with either the top, bottom or middle of the bordered area, the location of the top border is returned and processing continues at block 308 during which a pointer is reset to the first child of the parent. Then during block 309, the bottom border of the child is determined by adding the height of the child (as determined by the FITCELL Routine Set (FIG. 13A–E) to the location of the top boundary location of the child at block 310 and a recursive call is made to the PLACECELL Routine (FIG. 16A) to determine the location of the contents (i.e. all descendants and text) of the currently processed child. The pointer to the currently processed child is placed on the stack along with the location of the recursive call (310, FIG. 13D). The left, right, top and bottom boundary locations for the child are passed to the PLACECELL Routine (FIG. 16A). The left and right boundary locations for the child are determined to be equal to the inside rectangle calculated at block 264 during the PLACECELL Routine (FIG. 16A). The top border location was determined by the VERTICAL ALIGNMENT Routine (FIG. 16E) at block 328 and the bottom border location was determined at block 309 (FIG. 16D).

Figure 16E:
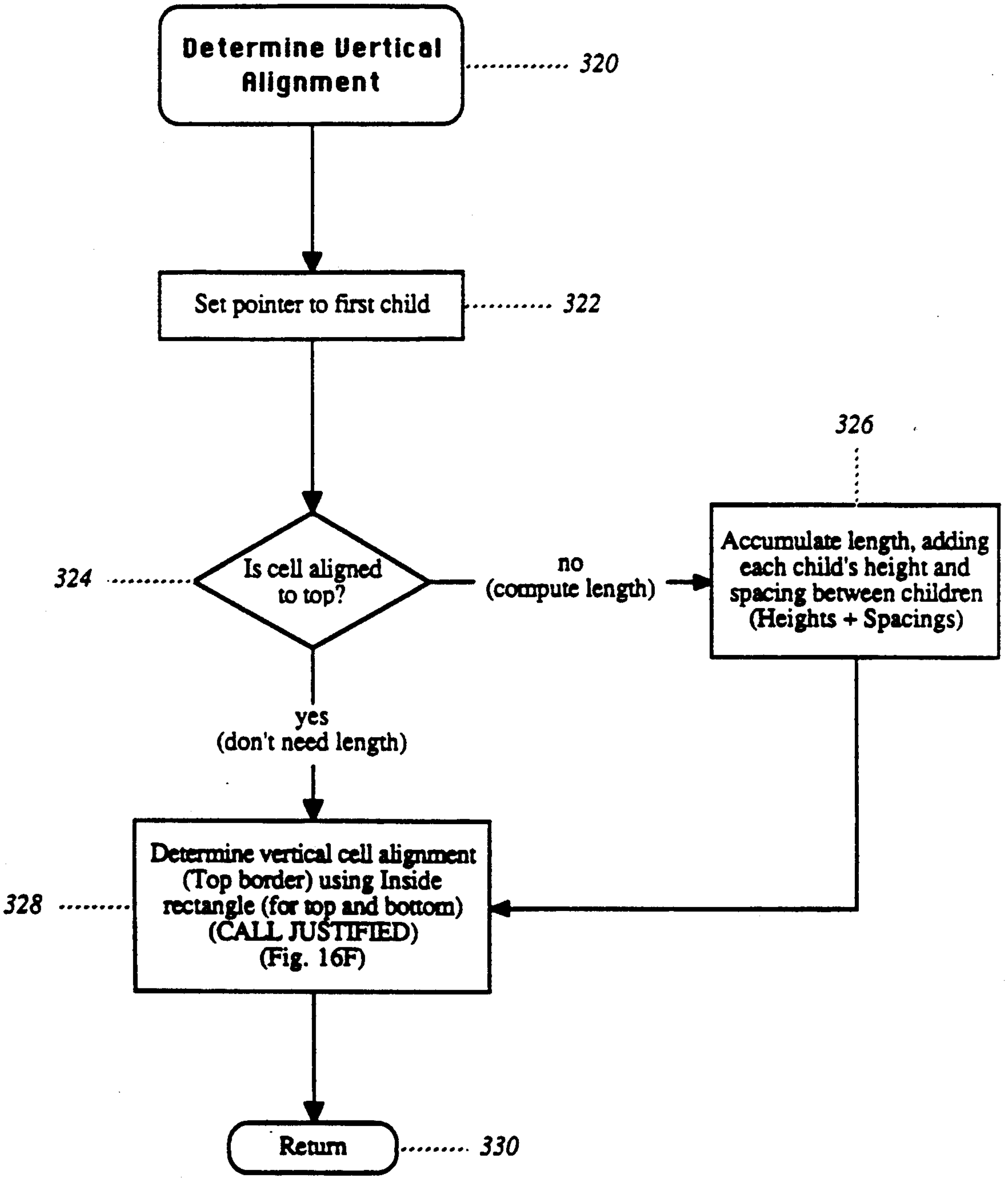
FIG. 16E is a flow block diagram of the DETERMINE VERTICAL ALIGNMENT Routine referenced during the PLACE VERTICAL CELL Routine (FIG. 16E) for determining the vertical location of the top-most border of the first vertically arranged child within the currently processed bordered area.

Assuming that all of the contents (i.e. bordered areas and text) of the child have been placed and the locations for the contents have been stored, processing returns to block 312 (FIG. 16D). During block 312, the top border for the next child within the vertical bordered area is determined by adding the spacing constant to the location of the bottom border of the previously processed child. Then during block 314 the pointer is set to the next child for which the top border was just calculated. At block 316, a determination of whether any more children need to be placed is determined. Assuming that there are still more children and their descendants to be processed, then processing continues at blocks 209, 310, 312, 314 and 316 until the boundary locations for all of the children and their descendants have been determined. Assuming that all of the boundary locations have been determined for each of the children and all of their descendants, then processing continues at block 318 during which processing returns to the PLACECELL Routine (FIG. 16A) at block 274. Assuming that the processed bordered area contains children, the top borders of each child will be computed as a function of the height of each child and the spacing in between the children.

e) DETERMINE VERTICAL ALIGNMENT Routine (FIG. 16E)

Figure 16F:
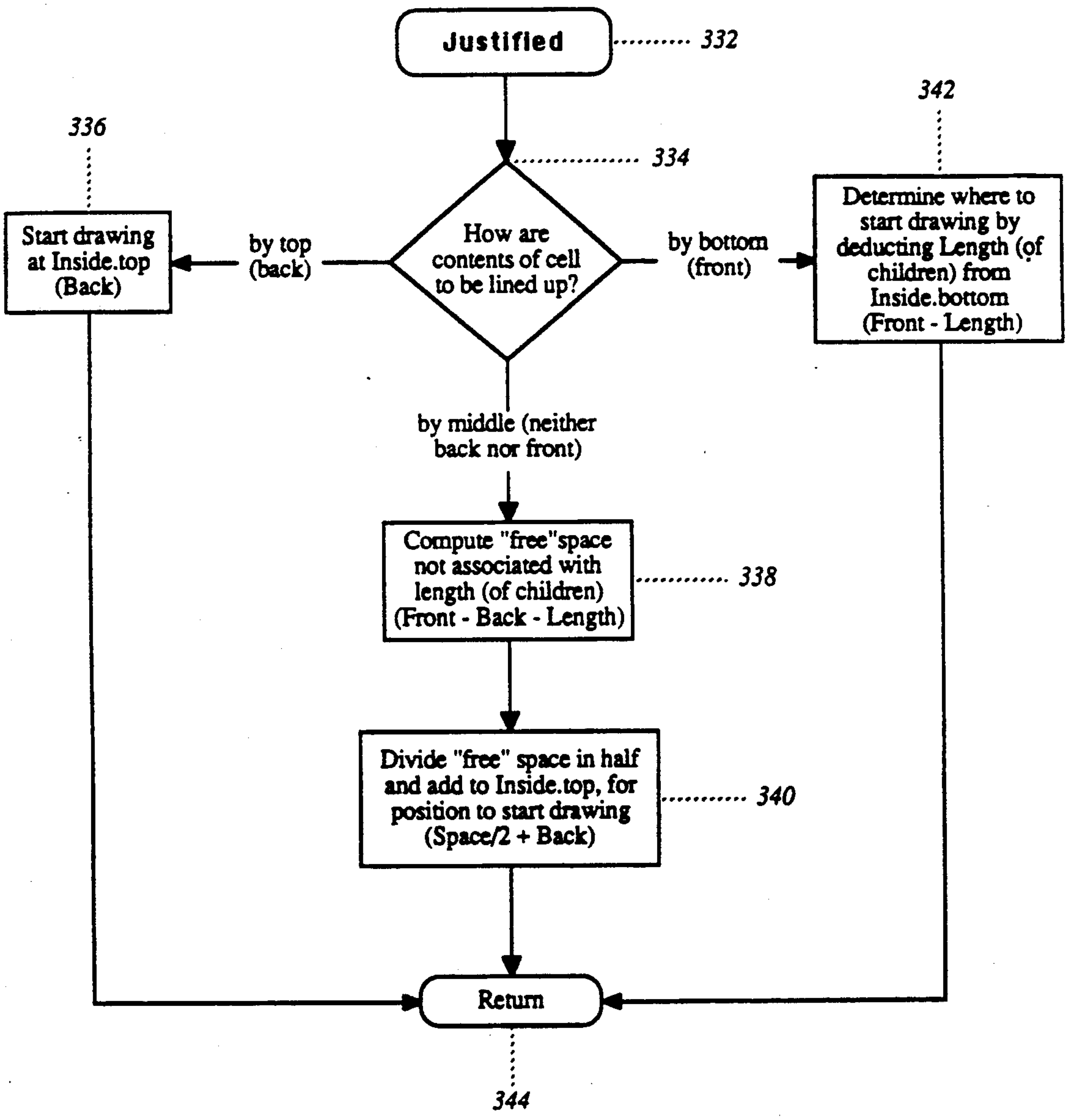
FIG. 16F is a flow block diagram of the JUSTIFIED Routine referenced during the DETERMINE VERTICAL ALIGNMENT Routine (FIG. 16E) and the PLACE TEXT CELL Routine (FIG. 16B) for calculating the starting location of the content (i.e., border of first descendant for the DETERMINE VERTICAL ALIGNMENT Routine (FIG. 16E), or the first line of text, for the PLACE TEXT CELL Routine (FIG. 16B) within a particular bordered area.

Referring to FIG. 16E, a detailed block diagram of the DETERMINE VERTICAL ALIGNMENT Routine (called during the PLACE VERTICAL CELL Routine (FIG. 16D)) is shown. As stated above, the purpose for this routine is for determining the location of the top most border of all of the vertically arranged children within the currently processed bordered area. At block 322, a pointer is set to the first child within the bordered area. Then during block 324 a verification is made as to whether the top border of the first child is aligned to, the top border of the parent. Assuming that the child is aligned with the top border of the parent, processing continues at block 328. During block 328, the JUSTIFIED Routine (FIG. 16F) is called to determine the location of the top border. Returning to block 324, if the top border is not aligned to the top border of the parent, then processing continues at block 326, during which the height of each child and the spacing between the children are accumulated ("used space"). Processing continues at block 328 during which the JUSTIFIED Routine (FIG. 16F) is called for determining the location of the top most border. Processing returns at block 330 to the PLACE VERTICAL CELL Routine (FIG. 16D) at block 308.

f) JUSTIFIED Routine (FIG. 16F)

Referring to FIG. 16F, a detailed block diagram of the JUSTIFIED Routine (called during the DETERMINE VERTICAL ALIGNMENT Routine (FIG. 16E)) is shown. The purpose of this routine is for determining the location of the top of the contents (i.e. VERTICAL children (DETERMINE VERTICAL ALIGNMENT Routine (FIG. 16E)) or text (PLACE TEXT CELL Routine (FIG. 16B)) within a parent bordered area. The routine first determines whether the top location of the contents are aligned to the top, bottom or middle of the parent In the preferred embodiment, only the bordered areas having vertically arranged children or text require the JUSTIFIED Routine (FIG. 16F) for determining the location of the top border (of vertical children) or the first line of text (if there are no sibbing boardered areas).

Referring to block 334, a determination is made as to whether the required alignment is to the top, bottom or middle (neither top nor bottom) of the parent bordered area. Assuming that the contents are to be aligned to the top of the parent, then the location of the top line or border is determined to be at the inside rectangle top border Recall that the inside rectangle defines the area within the parent where the contents can reside. Thus, the top dimension is determined to be the location of the top border of the parent plus the margin and border of the parent. Any extra space will appear below the bottom border or line of the contents.

Returning to block 334, if the contents are determined to be aligned to the bottom border of the parent, then processing continues at block 342. During block 342, the location of the top border or line is determined by deducting the vertical length of the children (height of children plus spacing as computed in block 326) or text (as computed in block 280) from the inside rectangle bottom border of the parent. The inside rectangle bottom border is determined to be the location of the bottom border of the parent less the margin plus border width of the parent. Any empty free space will appear at the top of the parent, before the contents begins.

Returning to block 334, if the contents are determined to be aligned to neither top nor bottom (i.e. the middle) of the parent, then processing continues to block 338. During block 338, the extra space not associated with the vertical length of the children or text is determined. The extra space is determined by calculating the difference between the inside bottom border location and the inside top border location of the parent less the vertical length of the text or children. The resulting amount will be the unused or extra space within the parent. Then, during block 340, the extra space is divided in half. In the preferred embodiment, one half of the extra space is added to the inside top border location of the parent to obtain the top most border or starting point of text within the parent. Regardless of whether the alignment is determined to be with the top, middle or bottom of the parent, processing continues at block 344, during which processing returns to the DETERMINE VERTICAL ALIGNMENT Routine (FIG. 16E) at block 330.

In an alternate embodiment of the JUSTIFIED Routine (FIG. 16F) the extra space can provide the spacing in between the children in any portion. In this way, the spacing between the children will change depending upon the amount of extra space calculated. The first child could still be aligned to the top border at the inside rectangle top border of the parent and the last child could also be aligned to the inside rectangle bottom border of the parent, and the extra space would fill the space in between the children.

10. DETAILED EXAMPLE OF THE PLACECELL Routine Set (FIGS. 16A-F)

Referring to FIGS. 14A, 16A-F and FIG. 17A, 17B, 17C and 17D, a detailed example for determining the boundary locations for the bordered areas is now discussed. FIG. 14A shows the X,Y coordinate pairs for each of the bordered areas after they have been calculated by the PLACECELL Routine Set (FIGS. 16A-F). The X, Y coordinate pair for a bordered area is assumed to be the upper left corner location and the lower right corner location (left, top and right, bottom). FIGS. 17A, 17B, 17C and 17D are various results tables which maintain "snapshot views" on the contents of the stack and the pointer to the currently processed bordered area. The 0, 0 coordinate value is assumed to be in the upper left hand corner of the form as shown in FIG. 14A. The 0, 0 coordinate pair is also the upper left hand corner for the root bordered area 50 of the form. Additionally, a "boundary" of each bordered area is assumed to consist of a 1-pixel border and a 2-pixel white space margin.

Referring to block 262 of the PLACECELL Routine (FIG. 16A), the border locations for the root bordered area 50, which were passed in from the PLACEFORM Routine (FIG. 12), are stored in the record associated with bordered area 50 (0, 0, 520, −) (199, FIG. 14B). The PLACEFORM Routine (FIG. 12) passes these boundary locations to the PLACECELL Routine (FIG. 16A). Then during block 284, the inside rectangle of the root bordered area 50 are determined (3, 3, 517, −). During block 266, a determination is made as to whether the contents of bordered area 50 includes text, vertically arranged children or horizontally arranged children. The contents of bordered area 50 includes vertically arranged children (51, 52, 53, 55, 57, 59, 51, 63, 65, 67, 69, 71, 73, etc. (FIG. 8A)). Processing continues at block 270 during which the PLACE VERTICAL CELL Routine (FIG. 16D) is called.

At block 306 (FIG. 16D) the DETERMINE VERTICAL ALIGNMENT Routine is called. At block 322 (FIG. 16E) as the DETERMINE VERTICAL ALIGNMENT Routine a pointer is set to the first child bordered area (bordered area 52) of the vertically arranged children. Processing continues to block 324 during which it is determined that the bordered area 52 is aligned to the top border of the root bordered area 50. Processing continues at block 328 during which the JUSTIFIED Routine (FIG. 16F) is called.

At block 334 (FIG. 16F as the JUSTIFIED Routine), the contents of bordered area 52 are determined to be aligned to the top border of the root bordered area 50. Processing continues at block 336, during which the location of top-most border of bordered area 52 is determined to be the inside rectangle top border location of bordered area 50 (3). Processing returns at block 344 to block 330 of the DETERMINE VERTICAL ALIGNMENT Routine (FIG. 16E). At block 330, processing returns to block 308 of PLACE VERTICAL CELL Routine (FIG. 16D).

At block 308 (FIG. 16D) the pointer is reset to the first child, or bordered area 52 within the root bordered area 50 (346, FIG. 17A). Then, during block 309, the bottom boundary location of child 52 is determined by adding the height of child 52 to the location of the top boundary of child 52. The height of child 52 was determined to be 146-pixels (200, FIG. 14B) by the FITCELL Routines (FIG. 13A) (3+146=149). At block 310, a recursive call is made to the PLACECELL Routine (FIG. 16A) to determine the boundary locations for the contents (i.e. descendants and text) of bordered area 52. A pointer to bordered area 52 is placed on the stack and the location of the recursive call at block 310 of the PLACE VERTICAL CELL Routine (FIG. 16D) is also placed on the stack (348, FIG. 17A). The left and right boundary locations of child 52 are passed in and they are equal to the inside rectangle left and right borders which were determined for bordered area 50 at block 264 of the PLACECELL Routine (FIG. 16A) (3−, 517, −). The top boundary location (3) determined during the JUSTIFIED Routine (FIG. 16F) at block 336 is passed in and the bottom boundary location (149) determined at block 309 (FIG. 14A) is passed in. Thus, the boundary locations for bordered area 52 are 3, 3, 517, 149(200, FIG. 14B).

The boundary locations for the bordered area 52 (FIG. 14A) are passed to the PLACECELL Routine (FIG. 16A) (3, 3, 517, 149). Referring to block 262 of the PLACECELL Routine (FIG. 16A) the boundary locations for bordered area 52 are stored in the record associated with bordered area 52. At block 264, the inside rectangle of bordered area 52 are determined (6, 6, 514, 146) and, during block 266, a determination is made as to whether the contents of bordered area 52 includes text, vertically arranged children or horizontally arranged children Bordered area 52 includes horizontally arranged children, namely bordered areas 54, 56 and 58. Therefore, processing continues at block 272 during which the PLACE HORIZONTAL CELL Routine (FIG. 16C) is called.

At block 291 (FIG. 16C), a pointer is set to the first child (bordered area 54) within bordered area 52 (350, FIG. 17A). At block 292, the left boundary of the first child is set equal to the inside rectangle left border location of bordered area 52. Then, during block 293, the right boundary is determined by adding the location of the left inside boundary (6) of bordered area 54 plus the width of bordered area 54 (103) determined during the FITCELL Routine (FIG. 13A) (6+103=110). At block 294, a recursive call is made to the PLACECELL Routine (FIG. 16A) to determine the boundary locations for the contents of bordered area 54. A pointer to bordered area 54 is placed on the stack and the location of the recursive call at block 294 of the PLACE HORIZONTAL CELL Routine (FIG. 16C) is also placed on the stack (352, FIG. 17A). The left, top and bottom boundaries of bordered area 54 are set equal to the inside rectangles left, top and bottom border locations determined at block 264 of the PLACECELL Routine (FIG. 16A). The right boundary was determined at block 293, thus, the bordered area location is (6, 6, 109, 146) (202, FIG. 148). Processing continues to the PLACECELL Routine at block 262, during which the newly calculated borders (6, 6, 109, 146) are stored in the record associated with the bordered area 54. Then, during block 264, the inside rectangle of bordered area 54 are determined to be (9, 9, 106, 143). The bordered area 54 is determined to have children vertically arranged during block 266 and processing continues at block 270, during which the PLACE VERTICAL CELL Routine (FIG. 16D) is called.

At block 306 (FIG. 16D) the DETERMINE VERTICAL ALIGNMENT Routine is called. At block 322 (FIG. 16E), the pointer is set to the first child 60 within bordered area 54. Processing continues to block 324 during which it is determined that the content of bordered area 54 are not aligned to the top of the bordered area 54. Thus, processing continues at block 326 during which the vertical length is accumulated by adding the (spacing and the accumulated height for all of the children within bordered area 54) is determined. The accumulated height for bordered areas 60, 62 and 64 is (38+32+32=102-pixels). The spacing between the children is equal to 2-pixels. Thus, the accumulated height plus spacing for the children is equal to 104-pixels Processing continues at block 328 during which the JUSTIFIED Routine (FIG. 16F) is called.

The contents of parent 54 are determined to be aligned to the middle of bordered area 54 at block 334 (FIG. 16F). During block 338, the amount of extra space not associated with the vertical length (height plus spacing of the children) is determined. Specifically, the extra space is determined by determining the difference between the inside top and bottom locations of bordered area 54 less the vertical length (accumulated height plus spacing of the children) (143−9−104=30). Processing continues to block 340 during which the extra space is divided in half (30/2=15). The location of the top border of the child bordered area 60 is equal to the location of the top of inside rectangle plus one half of the extra space (9+15=24). Processing continues at block 344, during which processing returns to block 330 of the DETERMINE VERTICAL ALIGNMENT Routine (FIG. 16E). During block 330, processing returns to block 308 of the PLACE VERTICAL CELL Routine (FIG. 16D).

During block 308 (FIG. 16D), the pointer is reset to the first child within bordered area 54—bordered area 60 (354, FIG. 17A). At block 309, the bottom boundary of bordered area 60 is calculated by adding the location of the top boundary to the height of bordered area 60 (24+38=62). Then, during block 310, a recursive call is made to the PLACECELL Routine (FIG. 16A). A pointer to bordered area 60 is placed on the stack and a pointer to the location of the recursive call (310, FIG. 16D) is also placed on the stack (356, FIG. 17A). Additionally, the boundary locations for the left and right borders for bordered area 60 are set equal to the inside left and right dimensions calculated for parent bordered area 54 (9, —, 109, —). Recall that the left inside border or location for bordered area 54 was determined to be (9) and the right inside boundary for bordered area 54 was determined to be (106). The top boundary for bordered area 60 was determined during the JUSTIFIED Routine (FIG. 16F) at block 340 to be (24) and the bottom boundary of bordered area 60 was calculated to be (62) at block 309. Thus, the coordinates for bordered area 60 are (9, 24, 106, 62) (204, FIG. 14B). Processing continues at block 262 of the PLACECELL Routine (FIG. 16A) during which the boundary locations (9, 24, 106, 62) for bordered area 60 are stored. Then, during block 264, the inside rectangle of bordered area 60 are determined to be (12, 27, 103, 59).

During block 266, bordered area 60 is determined to have a plurality of children arranged in a horizontal fashion. Processing continues to block 272 during which the PLACE HORIZONTAL CELL Routine (FIG. 16C) is called. At block 292 the pointer is set equal to bordered area 61, the first child within bordered area 60 (358, FIG. 17A). At block 292, the left boundary for the first child (bordered area 61) within bordered area 60 is set equal to the left boundary of the inside rectangle. During block 293, the right boundary for bordered area 61 is determined to be equal to the left boundary location plus the width of bordered area 61 (12+27=39). At block 294, a recursive call is made to the PLACECELL Routine (FIG. 16A). A pointer to bordered area 61 and a pointer to the location of the recursive call at block 294 (FIG. 16C) are placed on the stack (360, FIG. 17B). In addition, the left, top, right and bottom locations are passed to the PLACECELL Routine (FIG. 16A). The left, top and bottom boundary locations for bordered area 61 are set equal to the inside left, top and bottom boundaries calculated for bordered area 60 (12, 27, 13 , 59). The right boundary was determined to be (34) at block 309. Therefore, the boundary locations for bordered area 61 are (12, 27, 39, 59) (210, FIG. 14B). Processing continues at block 262 of the PLACECELL Routine (FIG. 16A) during which the boundary locations for bordered area 61 are stored in the record associated with bordered area 61. Then during block 264, the inside rectangle locations for the bordered area 61 are determined to be (15, 30, 36, 56). At block 266, the contents of the bordered area 61 are determined to be text. Processing continues at block 268 during which the PLACE TEXT CELL Routine (FIG. 16B) is called.

At block 278 (FIG. 16B) the displayable area for bordered area 61 is set equal to the inside rectangle's left and right borders of bordered area 61. Then, during block 280, the TEXTHITE Routine (133, FIG. 13B) is called to determine the accumulated height for all of the lines of text inside bordered area 61. The accumulated height for the text is determined to be 26-pixels, (2 (lines)×13-pixels). Then, during block 262, the JUSTIFIED Routine (FIG. 16F) is called. At block 334 (FIG. 16F) the text is determined to be aligned with the top border of bordered area 61. The location of the starting point of the text is set equal to the inside top dimension for bordered area 61 or (30).

Processing returns to block 284 of the PLACE TEXT CELL Routine (FIG. 16B) during which the start location for the first line of text is stored (30). Then during block 286, the text drawing area is set equal to the inside rectangle of bordered area 61 with the top location set equal to the new inside rectangle top border location (30) and then the text drawing area is stored. At block 288, processing returns to block 274 of the PLACECELL Routine (FIG. 16A). Recall that the PLACECELL Routine was called recursively at block 294 of the PLACE HORIZONTAL CELL Routine (FIG. 16C) with reference to determining the placement of the contents of bordered area 61. The pointer to bordered area 61 and the location to the recursive call - block 294 (FIG. 16C) are "popped" from the stack (362, FIG. 17B) and processing continues at block 296. During block 296, the left boundary location for the next horizontally arranged sibling in the bordered area 60 is determined. Specifically, the right boundary for bordered area 61 is added to the spacing constant of 1-pixel (39+1=40). Thus, the left border location for bordered area 63 is set equal to (40). At block 298, the pointer is moved to bordered area 63 (364, FIG. 17B). Processing continues at block 300 during which it is determined that bordered area 63 still needs to be placed. Processing continues at block 293 during which, the right boundary for bordered area 63 is determined by adding the width of bordered area 63 to the location of the left boundary of bordered area 63 (40+63=103). The left boundary location is (40) and the width of bordered area 63 is 63-pixels. Thus, the location of the right boundary is equal to (103).

Then at block 294, a recursive call to the PLACECELL Routine (FIG. 16A) is made. A pointer to bordered area 63 and the location of the recursive call (294, FIG. 16C) are stored on the stack (366, FIG. 17B). The left, top, right and bottom locations are passed to the PLACECELL Routine (FIG. 16A). The top and bottom boundaries for bordered area 63 are the same as the top and bottom boundaries for bordered area 61. The left and right boundaries were calculated at block 293 and 296. Therefore, at block 262, the location (40, 27, 103, 59) (212, FIG. 14B) for bordered area 63 is stored in the record associated with bordered area 63. At block 264, the inside dimensions for bordered area 63 are determined to be (43, 30, 100, 56). Processing continues at block 266 during which the contents of bordered area 63 are determined to be text. At block 268 the PLACE TEXT Routine (FIG. 16B) is called.

At block 278 (FIG. 16B) the displayable area is set equal to the inside dimensions of bordered area 63. At block 280, the TEXTHITE Routine (133, FIG. 13B) is called to determine the height of the text. There is any one line of text within bordered area 63 ("3800", FIG. 14A) and it is determined to be 26-pixels tall (1 (Line)×26-pixel (Height/Line)). Processing continues at block 282 during which the JUSTIFIED Routine (FIG. 16F) is called.

At block 334 (FIG. 16F), the contents of bordered area 63 are determined to be aligned to the top of bordered area 63. Processing continues at block 336 during which the start location for the text is determined to be (30); the top inside border location of bordered area 63. At block 344, processing returns to the PLACECELL Routine at block 284 of the PLACE TEXT CELL Routine (FIG. 16B). Processing continues at block 284, during which the start location for the first line of text is stored (30). Then during block 286, the drawing area location is set equal to the internal dimensions of bordered area 63 with the top location set equal to the new inside dimension (30) and then stored. At block 288, processing returns to block 274 of the PLACECELL Routine (FIG. 16A). Recall that the PLACECELL Routine (FIG. 16A) was recursively called at block 294 (FIG. 16C) while processing the contents of bordered area 63 (366, FIG. 17B). A recursive return is made to block 294 (FIG. 16C) and the same information within the top location of the stack is "popped" (368, FIG. 17B).

Processing continues at block 296 (FIG. 16C) of the PLACE HORIZONTAL CELL Routine during which the left boundary location of the next child in bordered area 60 is determined. At block 298, the pointer is moved to next bordered area (368, FIG. 17B). All of the children of bordered area 60 have been placed, and thus, processing continues to block 302, during which processing returns to the PLACECELL Routine (FIG. 16A) at block 274. The PLACECELL Routine was recursively called and therefore processing recursively returns to the top location on the stack (310, FIG. 16D). The information in the top location of the stack is "popped" (pointer to bordered area 60 and location to block 310 (FIG. 16D)) (370, FIG. 17C) and processing continues at block 312 of the PLACE VERTICAL CELL Routine At this stage of processing, the locations of bordered areas 52, 54, 60, 61 and 63 have been determined. The placement for the remaining vertically arranged children 62 and 64 within bordered area 54 needs to be determined.

At block 312, the top border of the next child (bordered area 62) within bordered area 54 is determined. Specifically, the top border is determined by adding the spacing between the children to the location of the bottom border of bordered area 60. The location of the bottom border for bordered area 60 is (62) and the spacing is 1-pixel (62+1=63). Thus, the top bordered location for child 62 is (63). The pointer is moved to bordered area 62 and processing continues at block 316 during which it is determined that there are still more children to process. Processing continues at block 309, during which the location of the bottom border for bordered area 62 is determined by adding the height of bordered area 62 to the location of the top border (63+32=95). At block 310, the PLACECELL Routine (FIG. 16A) is recursively called. A pointer to bordered area 62 and the location of the recursive call (310, FIG. 16D) are placed on the stack (374, FIG. 17C). The left, top, right and bottom border locations are passed to the PLACECELL Routine (FIG. 16A). The left and right boundaries for bordered area 62 are set equal to the inside left and right dimensions for bordered area 54 (9, –, 106, –). The top boundary to bordered area 62 was determined to be (63) at block 314 and the bottom border location was determined at block 309 (9, 63, 106, 95) (206, FIG. 14B). Processing continues at block 262 of the PLACECELL Routine (FIG. 16A) during which the boundary locations for bordered area 62 are stored (9, 63, 106, 95) (FIG. 14A). During block 264, the inside dimensions for bordered area 62 are determined to be (12, 66, 103, 92). At block 266, the contents of bordered area 62 are determined to be text and thus processing continues at block 268 during which the PLACE TEXT CELL Routine (FIG. 16B) is called.

At block 278, the displayable area within bordered area 62 is set equal to the inside rectangle of bordered area 62 and stored at block 280. The TEXTHITE Routine (133, FIG. 13B) is called at block 282. The height of each line of text is 13-pixels and there are 2 lines, thus, the total height of text is 26-pixels. At block 282, the JUSTIFIED Routine (FIG. 16F) is called. During block 334 (FIG. 16F), the contents are determined to be aligned to the top border of bordered area 62 and processing continues at block 336 during which the starting point for the text is determined to be at the top inside dimension for bordered area 62 or (66) (FIG. 14A). Processing returns at block 344 to block 284 of the PLACE TEXT CELL Routine (FIG. 16B) during which the top location (66) is stored in the record associated with the text. At block 286, the drawing area for bordered area 62 is set equal to the inside rectangle of bordered area 62 with inside top location as (66). At block 288, processing returns to block 274 of the PLACECELL Routine (FIG. 16A). The PLACECELL Routine was originally called recursively. The information stored at the top of the stack includes a pointer to bordered area 62 and the location of the recursive call was at 310, FIG. 16D. The contents at the top of the stack are "popped" (376, FIG. 17C) and processing continues at block 312 of the PLACE VERTICAL CELL Routine (FIG. 16D).

During block 312 (FIG. 16D), the top border for the next child (bordered area 64) is determined. The top border of bordered area 64 is determined by adding the spacing constant to the location of the bottom border of bordered area 62 (95+1=96). Processing continues at block 314, during which the pointer is moved to bordered area 64 (378, FIG. 17C). Then during block 316, a determination is made that there is still one bordered area to process, namely bordered area 64.

Processing continues at block 309 during which the bottom border location is determined by adding the height of bordered area 64 to the location of the top border. The location of the top border is (96) and the height of bordered area 64 is 32-pixels (96+32=128). At the block 310, a recursive call is made to the PLACECELL Routine (FIG. 16A). The pointer to bordered area 64 is placed on the stack along with the location of the recursive call (310, FIG. 16D) (280, FIG. 17C). The left, top, right and bottom border locations are passed to the PLACECELL Routine (FIG. 16A). The left and right border locations for bordered areas 63 are set equal to the inside left and right borders for bordered area 54. The top border for bordered area 64 was calculated at block 312. At block 262, the boundary locations for bordered area 64 are stored (9, 96, 106, 128) (208, FIG. 14B). Processing continues at block 264, during which the inside dimensions for bordered area 64 are determined. At block 266, the contents of bordered area 64 are determined to be text and thus processing continues at block 268 during which the PLACE TEXT CELL Routine (FIG. 16B) is called.

At block 278 (FIG. 16B) the displayable area for bordered area 64 is set equal to the inside dimensions of bordered area 64. At block 280, the TEXTHITE Routine (133, FIG. 13B) is called. The height of each line of text is 13-pixels and there are two lines of text. Thus the height of the text is 26-pixels. Processing continues at block 282 during which the JUSTIFIED Routine (FIG. 16F) is called. At block 334 (FIG. 16F) it is determined that the contents of bordered area 64 are aligned with the top border of bordered area 64. Therefore, during block 336, the starting point of the text is determined to be (99), the inside rectangle top border location. Processing returns at block 344 to the PLACE TEXT CELL Routine at block 284. During block 284, the new inside rectangle top border location is stored and at block 286 the new inside rectangle dimensions are set equal to the drawing area. Processing returns from block 288 to block 274 of the PLACECELL Routine (FIG. 16A). Recall that the PLACECELL Routine (FIG. 16A) was called recursively. The top location of the stack contains a pointer to bordered area 64 and the location block 310 (FIG. 16D) which are "popped" (382, FIG. 17D) and processing continues at block 312 of the PLACE VERTICAL CELL Routine (FIG. 16D).

At block 312, the top border of the next child is determined and at block 314 the pointer is moved to the next child (384, FIG. 17D) within bordered area 54. At this time there are no more children which need placement and, thus, at block 316 it is determined that processing of the contents of bordered area 54 is complete. Processing returns at block 318 to the PLACECELL Routine (at block 274). A recursive return is made to block 294 of the PLACE HORIZONTAL CELL Routine (FIG. 16C). The pointer to bordered area 54 and the location 294, FIG. 16C are "popped" from the stack (386, FIG. 17D) and processing continues at block 296. During block 296, the left boundary location for the next horizontal child within bordered area 52 is determined. The pointer moves to bordered area 56 at block 298 (888, FIG. 17D). A process, similar to the one described above continues until bordered areas 56 and 58 and their contents (i.e. descendants and text) have been placed. Then, the remaining vertical bordered areas 51, 55, 57, 59, 61, 63, etc., within root bordered area 50 are placed which concludes the detailed example of the PLACECELL Routine Set (FIGS. 16A–F).

11. DRAWCELL Routine Set (FIGS. 18A–D)

Referring to FIGS. 18A, 18B, 18C and 18D, a detailed description of the DRAWCELL Routine Set is now discussed. The purpose of the DRAWCELL Routine Set is for displaying the bordered areas of a form and their descendants. To start, the drawing area is passed into the DRAWCELL Routine Set from the DRAWFORM Routine (FIG. 11). The drawing area may be bigger than the bordered area, smaller than the bordered area or, in fact, it may not even overlap the bordered area. If it is determined that there is no overlapping of the bordered area to the drawing area, then there is nothing to draw. If part of the draw area lies outside the bordered area, then only the part which overlaps the bordered area will be drawn. Stated differently, only the intersection of the draw area and the bordered area will be drawn. Generally, the operation of the DRAWCELL Routine Set is as follows, if the bordered area to be drawn does not contain text, then the bordered area's borders will be drawn first, then the descendants of the bordered area will be drawn and, lastly, text at the bottom level bordered areas will be drawn. Stated differently, the drawing occurs on the way down the hierarchical tree structure, drawing the borders first and then eventually the text.

a) DRAWCELL Routine (FIG. 18A)

Referring to FIG. 18A, a flow diagram of the DRAWCELL Routine is shown. During block 402, for the particular bordered area currently being drawn, a determination is made as to whether there is an intersection (amount in pixels) between the draw area and the bordered area. Then during block 404, an additional determination is made as to whether the intersection is greater than zero. Assuming that the intersection is not greater than zero, then processing returns to the calling program at block 410. However, assuming that the intersection is greater than zero, processing continues at block 406, during which the DRAW BORDERS Routine (FIG. 18B) is called. The purpose of the DRAW BORDERS Routine is for displaying "printable" and/or "nonprintable" (to be discussed) sides of the bordered area designated to be visible or "on". Processing continues at block 408 during which the DRAW CONTENTS Routine (FIG. 18C) is called. The purpose of the DRAW CONTENTS Routine is for displaying the contents (i.e. all descendant bordered areas, or text) of the bordered area currently being processed. Processing returns at block 410 to the calling program (DRAWFORM Routine (FIG. 11).

b) DRAW BORDERS Routine (FIG. 18B)

Referring to FIG. 18B, a detailed block diagram of the DRAW BORDERS Routine is shown. At block 414, a determination is made as to whether the borders of the currently processed bordered area are to be displayed on the screen display 5 (FIG. 1) as nonprintable tracing lines. Nonprintable tracing lines, if they are being displayed, are typically shown in dotted form and they only appear on the screen display 5 for indicating to the user where a bordered area's outer limits extend, in order to enable the user to locate and move these borders to affect changes in width and/or height or bordered areas. If the user wants a nonprintable tracing line to be printed, then the tracing line is converted into a printable line by user command. On the screen display 5, in the preferred embodiment, the printable line will appear to be a solid line. If the nonprintable tracing lines for the bordered areas are to be displayed on the screen display 5 (FIG. 1), then processing continues at block 416. At block 416, the tracing lines are displayed on the screen display 5 (FIG. 1) in the form of dotted lines (however, the line could have any style) and processing continues to block 420. However, assuming that the tracing lines for the bordered areas are not to be displayed on the screen display 5, then processing continues at block 420. During block 420, a determination is made as to whether the top border of the currently processed bordered area is designated as a printable line (i.e. so that the border is displayed as a solid line and printed visibly). Assuming that the top border is to be printed (e.g. as a solid line), then processing continues at block 422 during which a solid line is drawn from the location of the top left corner of the bordered area to the location of the top right corner of the bordered area. Note that in alternative embodiments the border may be of any designated width as provided by the user and of any particular style, i.e. dotted, black solid, etc.

Returning to block 422, regardless of whether the top border is to be displayed solid and printed or not, processing continues at block 424 during which a determination is made as to whether the right border is to be printed. Assuming that the right border is designated to be printed, then processing continues at block 426 during which a solid line from the top right corner location of the bordered area to the bottom right corner location is drawn. Returning to block 424, regardless of whether the border is designated to be printed or not, processing continues at block 428. During block 428, a determination is made on whether the bottom border of the bordered area is to be printed. Assuming that the bottom border is designated to be printed, processing continues at block 430 during which a solid line is drawn from the bottom right location of the bordered area to the bottom left location of the bordered area. Regardless of whether the bottom border is to be printed or not, processing continues at block 432. During block 432, a determination is made as to whether the left border is to be printed. Assuming that the left border is designated to be printed, then processing continues at block 430 during which a solid line is drawn from the bottom left corner location of the bordered area to the top left corner location of the bordered area. Again, regardless of whether the left border is indicated to be printed or not, processing continues at block 436. During block 436, processing returns to the DRAWCELL Routine (FIG. 18A) at block 408.

c) DRAW CONTENTS Routine (FIG. 18C)

Referring now to FIG. 18C, a detailed diagram of the DRAW CONTENTS Routine is shown. At block 440, a determination as to whether the bordered area contains text is made. Assuming that the bordered area contains text, then block 442 is called to draw the text in the intersection area between the draw area and the bordered area. Typically the operating system provides the capability for drawing the text in the specified region. This is especially true for the more recent graphical environments. Operating system routines are callable by the application, are provided by computer manufactures (i.e. IBM, Apple, etc.) and system developers (Microsoft etc.) for drawing the actual text in the specified region. Assuming that the text has been drawn, processing returns at block 444 to the DRAWCELL Routine (FIG. 18A) at block 410. Returning to block 440, assuming that there is no text within the bordered area, processing continues at block 446. When there is no text within the bordered area, the bordered area must contain descendant bordered areas. Thus, at block 446 a pointer to the first child within the bordered area is set. Then during block 448, a recursive call to the DRAWCELL Routine (FIG. 18A) is made to have the first child and its contents (i.e. descendants or text) drawn. Once the first child bordered area and its contents have been drawn, then processing continues at block 450 during which the pointer is moved to the next child within the parent currently being processed. Processing continues at block 452, during which a determination is made as to whether any more children (and their descendants or text) need to be drawn. Assuming that there are still more children within the bordered area to be drawn, processing continues at block 448, 450 and 452 until all the children, including their descendants and text, have been drawn. However, if all of the children, including their descendants and text, have been drawn, processing returns at block 444 to the DRAWCELL Routine (FIG. 18A) to block 410.

This invention has been described in an exemplary and preferred embodiment, but it is not limited thereto. Those skilled in the art will recognize that a number of additional modifications and improvements can be made to the invention without departure from the essential spirit and scope. For example, as mentioned earlier, a number of different programming techniques and any number of different programming languages will be suitable for implementing the disclosed invention. The scope of the invention as described herein should not be limited by the previous disclosure but instead by the following claims.

I claim:

1. A method in a computer system for dynamically placing contents within a bordered area of a generic form, said generic form characterized as a two-dimensional space partitioned into a plurality of said bordered areas, each of said bordered areas having top, bottom, left, and right boundary locations, each of said bordered areas included in a nonoverlapping manner within a larger bordered area of said generic form, if any, and said contents of each of said bordered areas comprising one or more nonoverlapping smaller bordered areas or text, said text comprising none, one, or more lines of characters, whereby a hierarchial structure of said bordered areas of said generic form is established by said computer system, said method for dynamically placing said contents of said bordered area comprising the steps of:

obtaining said locations of said top, bottom, left, and right boundaries of said bordered area, determining whether said contents of said bordered area includes said one or more smaller bordered areas or said text, if said contents of said bordered area includes said text, determining whether said text is aligned to said top or said bottom boundary of said bordered area, and placing said text within said bordered area taking into account whether said text is aligned to said top or said bottom boundary of said bordered area, if said contents of said bordered area includes said smaller bordered areas, determining whether said included smaller bordered areas are arranged wtihin said bordered area horizontally or vertically, if said included smaller bordered areas are horizontally arranged, determining the location of said left and right boundaries for each of said included smaller bordered areas and placing said left and said right boundaries of said included smaller bordered areas at said determined locations, placing said top boundary for each of said included smaller bordered areas so as to be aligned to said top boundary of said bordered area and placing said bottom boundary for each of said included smaller bordered areas so as to be aligned to said bottom boundary of said bordered area, if said included smaller bordered areas are vertically arranged, determining the location of said top and said bottom boundaries for each of said included smaller bordered areas and placing said top and said bottom boundaries of said included smaller bordered areas at said determined locations, placing said left boundary of each of said included smaller bordered areas so as to be aligned to said left boundary of said bordered area and placing said right boundary of each of said included smaller bordered areas so as to be aligned to said right boundary of said bordered area.

2. The method of claim 1 wherein said generic form is represented by a plurality of pixels which are selectively enabled or disabled on a display, each of said pixels identified by a X, Y coordinate address, each of said bordered areas within said generic form being rectangular in shape, and each of said bordered areas represented by two pairs of said X, Y coordinate addresses, one of said pairs of said X, Y coordinate addresses representing the location of one corner of said rectangular bordered area and the other one of said pairs of said X, Y coordinate addresses representing the opposite corner of said rectangular bordered area, said method further comprising the step of:

for each said bordered area of said generic form, assigning said locations of said bordered areas of said generic form their corresponding X, Y coordinate addresses, whereby said locations of said top, bottom, left and right boundaries are defined.

3. The method of claim 2 wherein each of said boundaries of said bordered area comprise a margin and a border, said border defining the exterior limit of said bordered area and said margin directly adjacent to said border and within said bordered area, said margin and said border defining an area within said bordered area for which each of the corresponding pixels are disabled, and said method further including the step of determining said aligned location to be directly adjacent to said margin of said bordered area.

4. The method of claim 1 or 3 wherein one or more of said included smaller bordered areas further comprises a plurality of smaller bordered areas or text, and said method including the step of performing one or more of said prior recited steps of said method to determine the location of said further included smaller bordered areas or said text.

5. The method of claim 1 or 3 wherein one or more of said included smaller bordered areas further comprises a plurality of smaller bordered areas or text, said method including the step of:

for each of said included smaller bordered areas, determining whether said contents of said included smaller bordered area includes said further plurality of smaller bordered areas or said text.

6. The method of claim 5 further including the step of:

if said contents of said included smaller bordered area includes said text, determining whether said text is aligned with said top boundary or said bottom boundary of said bordered area, and placing said text within said bordered area taking into account whether said text is aligned to said top or said bottom boundary of said bordered area.

7. The method of claim 5 further including the step of:

if said contents of said included smaller bordered area further includes said further plurality of smaller bordered areas, determining whether said further included plurality of smaller bordered areas are arranged within said bordered area horizontally or vertically.

8. The method of claim 7 further including the step of:

if said further included smaller bordered areas are horizontally arranged, determining the location of said left and said right boundaries for each of said further included smaller bordered areas and placing said left and said right boundaries of said further included smaller bordered areas at said determined locations, placing said top boundary for each of said further included smaller bordered areas so as to be aligned to said top boundary of said included bordered area, and placing said bottom boundary for each of said further included smaller bordered areas so as to be aligned to said bottom boundary of said included bordered area.

9. The method of claim 7 further including the step of:

if said further included smaller bordered areas are vertically arranged, determining the location of said top and said bottom boundaries for each of said further included smaller bordered areas and placing said top and said bottom boundaries of said further included smaller bordered areas at said determined locations, placing said left boundaries of each of said further included smaller bordered areas so as to be aligned to said left boundary of said included smaller bordered area, and placing said right boundaries of each of said further included smaller bordered areas so as to be aligned to said right boundary of said included smaller bordered area.

10. The method of claim 9 further including the steps of:

for each included smaller bordered areas which is not left-most within said bordered area, determining the location of said left boundary of said not left-most smaller bordered area as the location of the right boundary of another one of said included smaller bordered areas plus a spacing constant.

11. The method of claim 1 or 3 wherein said included plurality of smaller bordered areas are horizontally arranged and each of said included smaller bordered areas having a predetermined width, and said step for determining the location of said left and right boundaries for each of said included smaller bordered areas further includes the steps of:

for said included smaller bordered area located left-most within said bordered area, assigning the location of said left boundary of said left-most included smaller bordered area as the location directly adjacent said left boundary of said bordered area, and assigning the location of the right boundary of said left-most included smaller bordered area as the location of said assigned left boundary of said left-most included smaller bordered area plus said predetermined width of said left-most included smaller bordered area.

12. The method of claim 1 or 3 wherein said included plurality of smaller bordered areas are vertically arranged and each of said bordered areas having a predetermined height, and said step for determining the location of said top and bottom boundaries for each of said included smaller bordered areas further including the steps of:

determining whether the top-most boundary of all of said included plurality of smaller bordered areas is aligned to said top boundary of said bordered area, and determining whether the bottom-most boundary of all of said included plurality of smaller bordered areas is aligned to said bottom boundary of said bordered area.

13. The method of claim 12 wherein said top-most boundary of all of said included plurality of smaller bordered areas is determined to be aligned to said top boundary of said bordered area, said method further including the step of assigning the location of said top-most boundary as the location aligned to said top boundary of said bordered area.

14. The method of claim 12 wherein said bottom-most boundary of all of said included plurality of smaller bordered areas is determined to be aligned said bottom boundary of said bordered area, said method further including the step of assigning the location of said bottom-most boundary as the location aligned to said bottom boundary of said bordered area.

15. The method of claim 14 further including the step of determining the location of the top-most boundary of said included smaller bordered areas.

16. The method of claim 15 wherein said step of determining the location of the top-most boundary of said included smaller bordered areas further including the steps of:

accumulating the height for each of said included smaller bordered areas, and determining the amount of unused space available within said bordered area, said step including the step of subtracting said accumulated height for said included smaller bordered areas from said height of said bordered area.

17. The method of claim 16 further including the step of dividing up said unused space within said bordered area and determining the location of said top-most boundary of said included smaller bordered areas by allocating said unused space between said bordered areas.

18. The method of claim 7 wherein said step of determining the location of the top-most and bottom-most boundaries of said included smaller bordered areas further including the steps of:

accumulating the height for each of said included smaller bordered areas, and determining the amount of free space available within said bordered area, said step including the step of subtracting said accumulated height for said included smaller bordered areas from said height of said bordered area.

19. The method of claim 12 wherein said top-most and bottom-most boundaries of said included smaller bordered areas are not aligned to said top and bottom boundaries of said bordered area and said method further including the step of determining the locations of the top-most and the bottom-most boundaries of said included smaller bordered area.

20. The method of claim 19 further including the steps of:

dividing said free space into portions, allocating said portions of free space within said bordered area to determine the location of said top-most and said bottom-most boundaries of said included smaller bordered areas.

21. The method of claim 1 wherein said computer has an associated output means, said output means including a display means, said output means for displaying said generic form stored within said computer and each of said top, bottom, left and right boundary locations defines the location of a nonprintable border side of said bordered area for assisting a user in locating and moving said borders to affect changes in the location of said borders, and each of said nonprintable border sides defines the exterior limit of sid bordered area, each of said border sides being displayed or not displayed on said display means and said method further comprising the step of, for each of said bordered areas, determining whether one or more of said nonprintable border sides of sid bordered area are displayed or not displayed.

22. The method of claim 21 wherein said output means further includes a printer means and each of said top, bottom, left and right boundary location is further defined as a printable border side of said bordered area, and each of said printable border sides defines the exterior limit of said bordered area, each of said printable border sides being displayed or not displayed on sid display means, and when said printable border is displayed, said border will be printed by said printer means and said method further comprising the step of, for each of said bordered areas, determining whether one or more of said printable border sides of said bordered area are displayed or not displayed.

23. The method of claim 22 further including the step of, operative when said one or more of said border sides of said bordered area are to be displayed and printed, displaying and printing said one or more border sides on said output means.

24. The method of claim 23 further including the step of determining whether said contents of said bordered area includes said plurality of said included smaller bordered areas or said text.

25. The method of claim 24 further including the step of, if said contents of said bordered area includes said text, displaying said text within said corresponding bordered area.

26. The method of claim 25 further including the steps of:

if said contents of said bordered area include said plurality of smaller bordered areas, for each of said included smaller bordered areas, iteratively performing one or more of said above steps.

27. An apparatus in a computer system for dynamically placing contents within a bordered area of a generic form, said generic form characterized as a two-dimensional space partitioned into a plurality of bordered areas, said bordered area having top, bottom, left, and right boundary locations, each of said bordered areas included in a nonoverlapping manner within a larger bordered area of said generic form, if any, and said contents of each of said bordered area comprising one or more nonoverlapping smaller bordered areas or text, said text comprising none, one, or more lines of characters, whereby a hierarchial structure of said bordered areas of said generic form is established by said computer system, said apparatus for dynamically placing said contents of said bordered area comprising:

means for obtaining said locations of said top, bottom, left, and right boundaries of said bordered area, means for determining whether said contents of said bordered area includes said one or more smaller bordered areas or said text, if said contents of said bordered area includes said text, means for determining whether said text is aligned to said top or said bottom boundary of said bordered area, and means for placing said text within said bordered area taking into account whether said text is aligned to said top or said bottom boundary of said bordered area, if said contents of said bordered area includes said smaller bordered areas, means for determining whether said included smaller bordered areas are arranged within said bordered area horizontally or vertically, means for determining the location of said left and said right boundaries for each of sid included smaller bordered areas and for placing said left and said right boundaries of said included smaller bordered area at said determined locations, means for placing said top boundary for each of sid included smaller bordered areas so as to be aligned to said top boundary of said bordered area and means for placing said bottom boundary for each of said included smaller bordered areas so as to be aligned to said bottom boundary of said bordered area, means for determining the location of said top and said bottom boundaries for each of said included smaller bordered areas and means for placing said top and said bottom boundaries of sid included smaller bordered area at said determined location, means for placing said left boundary of each of said included smaller bordered areas so as to be aligned to said left boundary of said bordered area and means for placing said right boundary of each of said included smaller bordered areas so as to be aligned to said right boundary of said bordered area.

28. The apparatus of claim 27 wherein said generic form is represented by as plurality of pixels which are selectively enabled or disabled on a display, each of said pixels identified by a X, Y coordinate address, each of said bordered areas within said generic form being rectangular in shape, and each of said bordered areas represented by two pairs of said X, Y coordinate addresses, one of said pairs of sid X, Y coordinate addresses representing the location of one corner of said rectangular bordered area and the other one of said pairs of said X, Y coordinate addresses representing the opposite corner of said rectangular bordered area, said apparatus further comprising:

for each said bordered area of said generic form, means for assigning said locations of said bordered areas of said generic form their corresponding X, Y coordinate addresses, whereby said locations of said top, bottom, left and right boundaries are defined.

29. The apparatus of claim 28 wherein each of said boundaries of said of said bordered area comprise a margin and a border, said border defining the exterior limit of said bordered area and said margin directly adjacent to said border and within said bordered area, said margin and said border defining an area within said bordered area for which each of the corresponding pixels are disabled, and said apparatus further including means for determining said aligned location to be directly adjacent to said margin of said bordered area.

30. The apparatus of claim 27 or 29 wherein one or more of said included smaller bordered areas further comprises a plurality of smaller bordered areas or text, and said apparatus including means for iteratively determining the location of said further included smaller bordered areas or text.

31. The apparatus of claim 27 or 29 wherein one or more of said included smaller bordered areas further comprises a plurality of smaller bordered areas or text, said apparatus including:

for each of said included smaller bordered areas, means for determining whether said contents of said included smaller bordered area includes said further plurality of smaller bordered areas or said text.

32. The apparatus of claim 31 further including:

means for determining whether said text is aligned with said top or said bottom boundary of said bordered area, and means for placing said text within said bordered area taking into account whether said text is aligned to sid top or said bottom boundary of said bordered area.

33. The apparatus of claim 31 further including:

means for determining whether said included plurality of smaller bordered areas are arranged within said bordered area horizontally or vertically.

34. The apparatus of claim 33 further including:

means for determining the location of said left and right boundaries for each of said further included smaller bordered areas and means for placing said left and said right boundaries of sid further included smaller bordered area of said determined locations, means for placing said top boundary for each of said further included smaller bordered areas so as to be aligned to said top boundary of said included bordered area, and means for placing said bottom boundary for each of said further included smaller bordered areas so as to be aligned to said bottom boundary of said included bordered area.

35. The apparatus of claim 33 further including:

means for determining the location of said top and said bottom boundaries for each of said further included smaller bordered areas and means for placing said top and said bottom boundaries of said further included smaller bordered areas at said determined locations, means for placing said left boundaries of each of said further included smaller bordered areas so as to be aligned to said left boundary of said included smaller bordered area, and means for placing said right boundaries of each of said further included smaller bordered areas so as to be aligned to said right boundary of said included smaller bordered area.

36. The apparatus of claim 35 further including:

for each included smaller bordered areas which is not left-most within said bordered area, means for determining the location of said left boundary of said not left-most smaller bordered area as the location of right boundary of another one of said included smaller bordered areas plus a spacing constant.

37. The apparatus of claim 27 or 29 wherein said included plurality of smaller bordered areas are horizontally arranged and each of said included smaller bordered areas having a predetermined width, and said means for determining the location of said left and right boundaries for each of said included smaller bordered areas further includes:

for said included smaller bordered area located left-most within said bordered area, means for assigning the location of said left boundary of said left-most included smaller bordered area as the location directly aligned said left boundary of said bordered area, and means for assigning the location of the right boundary of said left-most included smaller bordered area as the location of said assigned left boundary of said left-most included smaller bordered area plus said predetermined width of said left-most included smaller bordered area.

38. The apparatus of claim 27 or 29 wherein said included plurality of smaller bordered areas are vertically arranged and each of said bordered areas having a predetermined height, and said means for determining the location of said top and bottom boundaries for each of said included smaller bordered areas further including:

means for determining whether the top-most boundary of all of said included plurality of smaller bordered areas is aligned to said top boundary of said bordered area, and means for determining whether the bottom-most boundary of all of said included plurality of smaller bordered areas is aligned to said bottom boundary of said bordered area.

39. The apparatus of claim 38 wherein said top-most boundary of all of said included plurality of smaller bordered areas is determined to be aligned to said top boundary of said bordered area, said apparatus further including means for assigning the location of said top-most boundary as the location aligned to said top boundary of said bordered area.

40. The apparatus of claim 38 wherein said bottom-most boundary of all of said included plurality of smaller bordered areas is determined to be aligned to said bottom boundary of said bordered area, said apparatus further including means for assigning the location of said bottom-most boundary as the location aligned to said bottom boundary of said bordered area.

41. The apparatus of claim 40 further including means for determining the location of the top-most boundary of said included smaller bordered areas.

42. The apparatus of claim 41 wherein said means for determining the location of the top-most boundary of said included smaller bordered area further including:

means for accumulating the height for each of said included smaller bordered areas, and means for determining the amount of unused space available within sid bordered area, said means including means for subtracting said accumulated height for said included smaller bordered areas from said height of said bordered area.

43. The apparatus of claim 42 further including means for allocating said unused space within said bordered area to determine the location of said top-most boundary of said included smaller bordered areas.

44. The apparatus of claim 43 wherein said means for determining the location of the top-most and bottom-most boundaries of said included smaller bordered areas further including:

means for accumulating the height for each of said included smaller bordered areas, and means for determining the amount of free space available within said bordered area, said means including means for subtracting said accumulated height for said included smaller bordered areas from said height of said bordered area.

45. The apparatus of claim 38 wherein said top-most and bottom-most boundaries of said included smaller bordered areas are not aligned to said top and bottom boundaries of said bordered area and said apparatus further including means for determining the locations of the top-most and the bottom-most boundaries of said included smaller bordered area.

46. The apparatus of claim 45 further including:

means for dividing said free space into two portions, means for allocating said portions of free space within said bordered area to determine the location of said top-most and said bottom-most boundaries of said included smaller bordered areas.

47. The apparatus of claim 27 wherein said computer has an associated output means, said output means including a display means, said output means for displaying sid generic form stored within said computer and each of said top, bottom, left and right boundary locations defines the location of a nonprintable border side of said bordered area for assisting a user in locating and moving said borders to affect changes in the locations of said borders and each of said nonprintable border sides defines the exterior limit of said bordered area, each of said border sides being displayed or not displayed on said display means and said apparatus further comprising, for each of said bordered areas, means for determining whether one or more of said nonprintable border sides of said bordered area are displayed or not displayed.

48. The apparatus of claim 47 wherein said output means further includes a printer means and each of said top, bottom, left and right boundary locations further defines as a printable border side of said bordered area, and each of said printable border sides defines the exterior limit of said bordered area, each of said printable border sides being displayed or not displayed on said display means, and when said printable border is displayed, said border will be printed by said printer means and said apparatus further comprising, for each of said bordered areas, means for determining whether one or more of said printable border sides of said bordered area are displayed or not displayed.

49. The apparatus of claim 48 further including means for displaying and printing said one or more border sides on said output means.

50. The apparatus of claim 49 further including means for determining whether said contents of said bordered area includes said plurality of said included smaller bordered areas or said text.

51. The apparatus of claim 50 further including means for displaying said text within said corresponding bordered area.

52. The apparatus of claim 51 further including:

for each of said included smaller bordered areas, means for iteratively performing one or more of said above steps.

53. A method in a computer system for dynamically adjusting locations of contents within a bordered area of a generic form, said generic form characterized as a two-dimensional space partitioned into a plurality of said bordered areas, each of said bordered areas having top, bottom, left, and right boundary locations, and said contents within each of said bordered areas comprising one or more smaller bordered areas or text, said text comprising none, one, or more lines of characters, said method comprising the steps of:

(1) establishing a hierarchial structure including a top level bordered area and one or more lower level bordered areas, each of said one or more lower level bordered areas being one of said smaller bordered areas associated with a higher level bordered area, (2) one by one, from said top level bordered area through said one or more lower level bordered areas of said hierarchial structure, obtaining said locations of said top, bottom, left, and right boundaries of each of said bordered areas, (3) determining said locations of said contents of each of said bordered areas whose boundary locations have just been obtained, (4) placing said contents of each of said bordered areas in accordance to said determined locations of said contents, and (5) repeat steps (2) through (4) until said locations of all of said smaller bordered areas and texts are adjusted.

54. The method of claim 53, wherein said steps (3) and (4) further includes sub-steps of:

determining whether said contents of said bordered area includes either said smaller bordered areas or said text, when said location of said boundaries of a bordered area is obtained, if said contents of said bordered area including said text, determining whether said text is aligned to said top or said bottom boundary of said bordered area, and placing said text within said bordered area taking into account whether said text is aligned to said top or said bottom boundary of said bordered area, if said contents of said bordered area including said smaller bordered areas, determining whether said included smaller bordered areas are arranged within said bordered area horizontally or vertically, if said included smaller bordered areas are horizontally arranged, determining the location of said left and right boundaries for each of said included smaller bordered areas and placing said left and said right boundaries of said included smaller bordered areas at said determined locations, placing said top boundary for each of said included smaller bordered.

55. The method of claim 53, wherein said establishing step further includes a step of recording a relationship between each of said higher level bordered areas and its said lower level bordered areas, if any.

56. An apparatus in a computer system for dynamically placing contents within a bordered area of a generic form, said generic form characterized as a two-dimensional space partitioned into a plurality of said bordered areas, each of said bordered areas having top, bottom, left, and right boundary locations, and said contents within each of said bordered areas comprising one or more smaller bordered areas or text, said text comprising none, one, or more lines of characters, said apparatus comprising:

means for establishing a predetermined relationship between said plurality of said bordered areas such that said computer system can establish a sequence to search each of said bordered areas in accordance with said predetermined relationship, means for obtaining said locations of said top, bottom, left, and right boundaries of each of said bordered areas in said sequence, means for determining said locations of said contents of said bordered area whose boundary locations have been obtained, means for placing said contents of said bordered area according to said determined locations of said contents.

57. The apparatus of claim 56 further comprising means for storing records associated with each of said bordered areas.

58. A method in a computer system for dynamically adjusting locations of contents within a bordered area of a generic form in response to changes of said generic form, said generic form characterized as a two-dimensional space partitioned into a plurality of said bordered areas, each of said bordered areas having top, bottom, left, and right boundary locations, and said contents within each of said bordered areas comprising one or more smaller bordered areas or text, said text comprising none, one, or more lines of characters, said method comprising the steps of:

(1) establishing a hierarchial structure of said form, said hierarchial structure including a top level bordered area and one or more lower levels bordered areas, each of said one or more lower level bordered areas being one of said smaller bordered areas associated with a higher level bordered area, (2) one by one, from said top level bordered area through said one or more lower level bordered areas of said hierarchial structure, obtaining, automatically, said locations of said top, bottom, left, and right boundaries of each of said bordered areas, (3) determining whether said contents of said bordered area including said smaller bordered areas or said text, if said location of said boundaries of a bordered area is obtained, (4) if said contents of said bordered area including said text, determining whether said text is aligned to said top or said bottom boundary of said bordered area, and placing said text within said bordered area taking into account whether said text is aligned to said top or said bottom boundary of said bordered area, (5) if said contents of said bordered area including said smaller bordered areas, determining whether said included smaller bordered areas are arranged within said bordered area horizontally or vertically, (6) if said included smaller bordered areas are horizontally arranged, determining the location of said left and right boundaries for each of said included smaller border areas and placing said left and said right boundaries of said included smaller bordered areas at said determined locations, placing said top boundary for each of said included smaller bordered areas so as to be aligned to said to boundary of said bordered area and placing said bottom boundary of said bordered area and placing said bottom boundary for each of said included smaller bordered areas so as to be aligned to said bottom boundary of said bordered area, (7) if said included smaller bordered areas are vertically arranged, determine the location of said top and said bottom boundaries for each of said included smaller bordered areas and placing said top and said bottom boundaries of said included smaller bordered areas at said determined locations, placing said left boundary of each of said included smaller bordered areas so as to be aligned to said left boundary of said bordered area and placing said right boundary of each of said included smaller bordered area so as to be aligned to said right boundary of sid bordered area, and (8) repeat steps (2) through (7) until said locations of all of said smaller bordered areas and texts are adjusted.

* * * * *

UNITED STATES PATENT AND TRADEMARK OFFICE
CERTIFICATE OF CORRECTION

PATENT NO. : 5,148,520
DATED : September 15, 1992
INVENTOR(S) : Michael Morgan

It is certified that error appears in the above-identified patent and that said Letters Patent is hereby corrected as shown below:

Column 1, line 1, cancel "LOCATIONS" and insert --LOCATION--
Column 1, line 25, after "transactions" insert --.--
Column 1, line 27, after "everywhere" insert --.--
Column 1, line 31, after "forms" insert --.--
Column 1, line 35, after "one" insert --.--
Column 1, line 385, after "storage" insert --.--
Column 2, line 42, cancel "TM understand TM" and insert --"understand"--.
Column 2, line 63, after "for" and before "incorporating" insert --using a computer for--.
Column 2, line 65, cancel "display" and insert --displaying--
Column 3, line 57, after "thereto" insert --.--
Column 7, line 45, cancel "content" and insert --contents--.
Column 7, line 48, after "16B)" and insert --)--.
Column 9, line 9, cancel "Howver" and insert --However--
Column 10, line 13, cancel "O, O" and insert --0, 0--
Column 10, line 15, cancel "O, O" and insert --0, 0 --
Column 14, line 18, after "sury". insert a paragraph.
Column 14, line 54, after "The" and before "system" insert --computer--
Column 14, line 56, cancel "associate" and insert --associated--

UNITED STATES PATENT AND TRADEMARK OFFICE

CERTIFICATE OF CORRECTION

PATENT NO. : 5,148,520

DATED : September 15, 1992

INVENTOR(S) : Michael Morgan

It is certified that error appears in the above-indentified patent and that said Letters Patent is hereby corrected as shown below:

Column 14, line 57, cancel "computer"

Column 15, line 21, after "The" and before "record" insert --computer--

Column 16, line 64, cancel "bordered areas" and insert --form--

Column 17, line 4, after "sizes" cancel ","

Column 17, line 19, cancel "on" and insert --as to--.

Column 21, line 47, after "reapportioned." insert a paragraph.

Column 21, line 48, after "reapportioned." cancel "." and insert --,-- and cancel the paragraph.

Column 22, line 6, after "13D)" insert --)--

Column 24, line 44, after "50" insert --.--

Column 30, line 42, after "approach" insert --.--

Column 30, line 53, cancel "every" and insert --ever--

Column 34, line 2, cancel "VERTICAL" and insert --vertical--

Column 35, line 53, after "of" and before "top" insert --the--

Column 36, line 53, cancel "148" and insert --14B--

Column 42, line 4, cancel "18A-D" and insert --18A-C--

Column 42, line 5, after 18B cancel ", 18C and 18D" and insert --and 18C--

UNITED STATES PATENT AND TRADEMARK OFFICE

CERTIFICATE OF CORRECTION

PATENT NO. : 5,148,520

DATED : September 15, 1992

INVENTOR(S) : Michael Morgan

It is certified that error appears in the above-indentified patent and that said Letters Patent is hereby corrected as shown below:

Column 42, line 53, after "11)" insert --)--

Column 43, line 33, cancel "on" and insert --as to--

Column 44, line 65, cancel "wtihin" and insert --within--

Column 47, claim 18, line 54, cancel "7" and insert --17--

Column 48, claim 21, line 20, cancel "sid" and insert --said--

Column 48, claim 21, line 25, cancel "sid" and insert --said--

Column 48, claim 22, line 32, cancel "sid" and insert --said--

UNITED STATES PATENT AND TRADEMARK OFFICE

CERTIFICATE OF CORRECTION

PATENT NO. : 5,148,520

DATED : September 15, 1992

INVENTOR(S) : Michael Morgan

It is certified that error appears in the above-indentified patent and that said Letters Patent is hereby corrected as shown below:

Column 49, claim 27, line 23, cancel "sid" and insert --said--

Column 49, claim 27, line 27, cancel "sid" and insert --said--

Column 49, claim 27, line 36, cancel "sid" and insert --said--

Column 49, claim 28, line 52, cancel "sid" and insert --said--

Column 50, claim 32, line 26, cancel "sid" and insert --said--

Column 50, claim 34, line 36, cancel "sid" and insert --said--

Column 51, claim 42, line 57, cancel "sid" and insert --said--

Column 52, claim 47, line 24, cancel "sid" and insert --said--

Signed and Sealed this

Nineteenth Day of October, 1993

Attest:

Bruce Lehman

BRUCE LEHMAN

*Attesting Officer*

*Commissioner of Patents and Trademarks*